US006530284B1

United States Patent
Tambo et al.

(10) Patent No.: US 6,530,284 B1
(45) Date of Patent: Mar. 11, 2003

(54) GEOGRAPHICAL DISPLACEMENT SENSING UNIT AND MONITORING APPARATUS USING THE SAME

(75) Inventors: Eitarou Tambo, Fujisawa (JP); Takaaki Ikeda, Ageo (JP); Takashi Oogawara, Yokohama (JP)

(73) Assignees: Mitsui Bussan Plant & Project Corporation, Tokyo (JP); Toshiba Engineering Corporation, Kawasaki (JP)

( * ) Notice: Subject to any disclaimer, the term of this patent is extended or adjusted under 35 U.S.C. 154(b) by 0 days.

(21) Appl. No.: 09/605,350

(22) Filed: Jun. 28, 2000

Related U.S. Application Data

(62) Division of application No. 09/251,241, filed on Feb. 16, 1999, now Pat. No. 6,119,535.

(30) Foreign Application Priority Data

| Feb. 17, 1998 | (JP) | 10-034926 |
| Jul. 16, 1998 | (JP) | 10-201997 |
| Sep. 30, 1998 | (JP) | 10-278469 |
| Dec. 17, 1998 | (JP) | 10-359061 |

(51) Int. Cl.$^7$ .............................. G01V 1/16
(52) U.S. Cl. ........................ 73/784; 340/690
(58) Field of Search ............... 73/784; 340/690, 340/669, 870.01, 870.02, 870.09

(56) References Cited

U.S. PATENT DOCUMENTS

| 4,903,530 A | | 2/1990 | Hull | |
| 5,027,655 A | | 7/1991 | Sweet | |
| 5,177,471 A | | 1/1993 | Horibata | 340/690 |
| 5,420,380 A | * | 5/1995 | Harben et al. | |
| 5,423,214 A | | 6/1995 | Lee | 324/665 |
| 5,614,893 A | * | 3/1997 | Ahmad et al. | |
| 5,661,464 A | | 8/1997 | Bilak | 340/690 |
| 5,675,088 A | * | 10/1997 | Serata | 73/784 |
| 5,866,827 A | * | 2/1999 | Stewart et al. | 73/784 |
| 5,910,763 A | * | 6/1999 | Flanagan | |

FOREIGN PATENT DOCUMENTS

| CA | 2 104 204 A | 2/1995 | |
| CH | 628 748 A | 3/1982 | |
| DE | 43 11 822 A | 10/1994 | |
| GB | 2 183 038 | 5/1987 | |
| SU | 1283366 | 1/1987 | 73/290 R |

OTHER PUBLICATIONS

XP–000949986 Geophysical Research Letters vol. 8, No. 3, pp. 225–228, Mar. 1981 Possible Tilt Phenomena Observed as . . . .

XP–000949982 Journal of Geophysical Research vol. 96, No. B3, pp. 4269–4278, Mar. 10, 1991; Tidal Responses and Earthquake–Related Changes in the Water Level . . . .

* cited by examiner

*Primary Examiner*—Robert Raevis
(74) *Attorney, Agent, or Firm*—Lackenbach Siegel LLP

(57) ABSTRACT

A plurality of sensing units are buried at suitable intervals in an area of ground or a snow accumulation section to be observed. Each of the sensing units includes a gyro-sensor for, when external force acts on it as a result of the displacement of the ground or the snow accumulation section, sensing impulsive acceleration from the magnitude and direction of the displacement and the inclination of the sensing unit itself, and a transmission section for transmitting the sense data by radio. A base station acquires the sense data transferred from the sensing units, processes the sense data for each measuring point in real time, determines the movement of the ground and/or the snow accumulation section, and judges a state of the ground and/or the snow accumulation section on the basis of the movement.

9 Claims, 40 Drawing Sheets

INSTALLATION STATE

WHEN RAINWATER HAS PENETRATED

WHEN LANDSLIDE STARTS TO OCCUR

INSTALLATION
STATE

WHEN SNOW ACCUMULATION
LAYER IS MOVING

WHEN SENSOR HAS RETURNED
TO THE ORIGINAL POSITION
AFTER SNOW HAS MELTED

US 6,530,284 B1

GEOGRAPHICAL DISPLACEMENT SENSING UNIT AND MONITORING APPARATUS USING THE SAME

This application is a Divisional application of Ser. No. 09/251,241, filed Feb. 16, 1999, now U.S. Pat. No. 6,119,535.

BACKGROUND OF THE INVENTION

The present invention relates to a sensing unit for sensing geographical displacement such as the displacement of the ground, a snow accumulation section, an underground water level or the like, and a monitoring apparatus for monitoring a landslide, a snowslide or the like using the sensing units.

There has been a pressing need for the development of a system capable of predicting the occurrence of disaster, such as a landslide caused by a heavy rain or a snowslide in a snowy area.

One conventional means for sensing the softening of the ground is such as to sense whether any of the previously stretched wires on the ground have been broken by the movement of the ground. With this type of sensing unit, however, wires have to be stretched over a wide area, which needs not only a lot of time and labor but also has the difficulty in determining the place and direction in which the ground has been displaced, resulting in a problem that it is impossible to estimate the degree of displacement.

To overcome the problems, ground sensing units using various measuring instruments have recently developed. One of them is such as to estimate the displacement of the ground, the depth of the landslide surface, and the amount of slide by use of a servo inclinometer where a weight is supported horizontally by a case via springs, or by use of a pipe strain gauge.

In the case of a ground sensing unit using the servo inclinometer, pipes are put in the holes bored in the ground and servo inclinometers are inserted into the pipes stepwise in such a manner that they can be hoisted. As the servo inclinometers are hoisted, the tilt angles are measured automatically on the basis of the displacements of the springs. By measuring the side displacement, the displacement of the ground or a continuous underground wall, i.e., a landslide can be measured.

In the case of a ground sensing unit using a pipe strain gauge, a large number of vinyl chloride pipes are inserted vertically into holes bored in the ground, while being connected to one another with intermediate pipes. Strain gauges have been stuck to suitable portions of the pipes. The resulting assemblies are fixed in place by filling the space around them with sand. By measuring the amount of bending strain while changing the strain gauge on the vinyl chloride pipe from one depth to another, the magnitude and depth of a slide can be estimated.

Such ground sensing units, however, require a large number of measuring instruments to be installed in a place where a landslide collapse may take place. Therefore, the installation work needs a lot of time and labor. The ground sensing units installed in the different positions must be connected to each other with a power cable and a communication cable.

Because the ground sensing unit using a servo inclinometer needs a moving section, it requires a large space as a whole. In the case of the ground sensing unit using pipe strain gauges, vinyl chloride pipes must be inserted vertically, while being connected to each other with intermediate pipes, and the space around the pipes must be filled with sand. Therefore, it is difficult to install a large number of pipes over a wide area in a mountainous region.

Furthermore, in the case of the ground sensing unit using the servo inclinometer or pipe strain gauge, because the side displacement of and the amount of bending strain of the ground can be measured but the position of each ground sensing unit buried in the ground cannot be sensed, they cannot be measured when all the ground has been displaced.

With this backdrop, there have been demands for a monitoring apparatus which is easy to bury in the ground and can predict the occurrence of disaster, such as a mudslide in the ground or a snowslide in a snowy region, by use of sensing units capable of sensing the displacement exactly even when the whole of the ground or the snow accumulation section has been displaced, and for a sensing unit to be used in the apparatus.

Moreover, there has been demands for a ground monitoring apparatus which is capable of sensing the displacement of the ground, regardless of the places of installed sensing units, and of predicting the occurrence of disaster, such as a mudslide in the ground, and for a sensing unit to be used in the apparatus.

As a means of predicting the occurrence of disaster, such as a mudslide in the ground, there is an underground water level sensing unit which measures the penetrating water level of rainfall in, for example, a mountainous region or a slope area or measures the position of a water vein in the ground and the state of the infiltration from the water vein. An example of the configuration of such an underground water level sensing unit is shown in FIG. 1.

In FIG. 1, numeral 21 indicates foundation concrete laid in the ground. In the foundation concrete 21, a through hole that extends from the surface of the earth into the ground is made. Numeral 22 is a cylindrical member buried in the ground in such a manner that the member is inserted into the through hole in the foundation concrete 21. The cylindrical member 22 can be adjusted so as to have a suitable length according to how deep the cylindrical member is buried. Holes that penetrate through the member are arranged in the direction of its axis.

Numeral 23 is a case placed on the foundation concrete 21, with the cylindrical member 22 in the center of the case. In the upper part of the case 23, a float driving unit 24 is provided. The float driving unit 24 holds a wire 26 in such a manner that the wire can move vertically in the cylindrical member 22. A float 25 is attached to the tip of the wire 26. The float driving unit 24 rolls up or down the wire 26 as the float 25 moves up or down according to the level of the water accumulated at the bottom of the cylindrical member 22.

In the lower part of the case 23, a measuring instrument 27 and a transmitter 29 are provided. The measuring instrument 27 measures the level of the water accumulated at the bottom of the cylindrical member 22 from the movement of the wire 26 rolled up or down by the float driving unit 24. The transmitter 29 transmits the data measured at the measuring instrument 27 to a base station (not shown) via an output cable 28 laid in the ground.

In the underground water level sensing unit constructed as described above, when rainwater has permeated into the ground, the water passes through the holes arranged in the direction of the axis of the cylindrical member 22 and collects at the bottom of the cylindrical member 22. The level of the water accumulated at the bottom of the cylindrical member 22 is measured by the measuring instrument 27 from the movement of the wire 26 rolled up or down according to the up-and-down movement of the float 25.

Such an underground water level sensing unit, however, can measure only the water accumulated at the bottom of the cylindrical member 22 but cannot judge how much the water has come from how depths of the stratums.

In a landslide danger zone, such as a slope area, it is important to measure how much rainwater has permeated into the ground and judge whether the rainwater has reached a stratum that is liable to cause a landslide. According to the conventional float-type water level sensing unit, however, the water which has come from all of an upper stratum, an intermediate stratum and a lower stratum is accumulated at the bottom, so that it is impossible to judge how much the water has come from how depths of the stratums, which prevents effective prediction of a landslide.

The float-type water level sensing unit has another problem: when the cylindrical member 22 has been deformed and the float 25 has come into contact with the inner wall of the cylindrical member 22, this prevents the float 25 from making up-and-down movement and makes it difficult to accurately measure the water level.

Moreover, in installation, a hole must be bored vertically with high accuracy so that the float 25 may not touch the inner wall. To achieve this is difficult when the hole is as deep as several tens of meters.

Thus, there have been demands for an underground water level sensing unit capable of measuring the position and size of a very wet stratum in the ground.

As for a means of sensing a snowslide, props have been placed at suitable intervals in a place where a snowslide is liable to take place. A resistive wire has been stretched at a suitable height between the props and normally been made conducting. A change in the resistance value caused by the breaking of the wire due to a snowslide is sensed. The value has been transmitted by cable to a base station, which then senses the occurrence of a snowslide.

Such a snowslide monitoring system, however, requires wire to be laid over a wide area. This needs not only a lot of time and labor but also has the difficulty in pinpointing the place where the snowslide has occurred, resulting in a problem that it is impossible to predict the size of the snowslide.

If the movement of a snow accumulation layer imposed a heavy load on the props and they were bent, the props would suffer damage or remain bent. Therefore, it is necessary for maintenance personnel to repair or replace the props after the snow has melted.

Furthermore, since each prop has not been installed on a foundation, there occurs a problem in which the props, together with the snow, might be carried away if a snowslide took place.

Thus, there have been demands for a snowslide monitoring apparatus capable of not only determining the place where a snowslide has occurred and its size but also automatically restoring the sensing units to their original position after the snow has melted even when the sensing units have been bent under the weight of snow or by the movement of snow, and for a sensing unit to be used in the apparatus.

BRIEF SUMMARY OF THE INVENTION

Accordingly, it is an object of the present invention to provide a monitoring apparatus which is easy to bury in the ground and can predicte the occurrence of disaster, such as a landslide in the ground or a snowslide in a snowy region, by use of sensing units capable of sensing the displacement exactly even when all of the ground or of the snow accumulation section has been displaced, and for a sensing unit to be used in the apparatus.

It is another object of the present invention to provide a ground monitoring apparatus which is capable of sensing the displacement of the ground exactly, regardless of the places of installed sensing units, and of predicting the occurrence of disaster, such as a mudslide in the ground, and for a sensing unit to be used in the apparatus.

It is still another object of the present invention to provide an underground water level sensing unit capable of measuring the position of a very wet stratum in the ground and its depth size with high accuracy.

It is still another object of the present invention to provide a snowslide monitoring apparatus capable of not only determining the place where a snowslide has occurred and its size but also automatically restoring the sensing units to their original position after the snow has melted even when the sensing units have been bent under the weight of snow or by the movement of snow, and for a sensing unit to be used in the apparatus.

According to one aspect of the present invention, there is provided a sensing unit for sensing geographical displacement, comprising: a cylindrical member used to be buried in ground or a snow accumulation section; sensor means, provided fixedly at a predetermined position where the geographical displacement may occur, for sensing the geographical displacement; computing means for converting data on the displacement sensed by the sensor means into electric signal; transmitting means for transmitting by a radio the electric signal obtained from the computing means to a predetermined station; and a battery used as a driving power source for the sensor means, computing means, and transmitting means.

According to another aspect of the present invention, there is provided a monitoring apparatus comprising: a plurality of sensing units buried at suitable intervals in an area of ground or a snow accumulation section to be observed, each sensing unit including a gyro-sensor for, when external force acts on it as a result of the displacement of the ground or the snow accumulation section, sensing impulsive acceleration from the magnitude and direction of the displacement and the inclination of the sensing unit itself, and a transmission section for transmitting the sense data by radio; and data processing means, provided in a base station that acquires the sense data transferred from the sensing units, for processing the sense data for each measuring point in real time, determining the movement of the ground and/or the snow accumulation section, and creating data to judge a state of the ground and/or the snow accumulation section on the basis of the movement.

According to still another aspect of the present invention, there is provided a ground monitoring apparatus comprising: a plurality of sensing units buried at suitable intervals in an area of ground to be observed, each of the sensing units including a plurality of water level sensors that are provided at suitable intervals in a longitudinal direction of the sensing unit and sense moisture in the ground in the form of electric signal and determining the position at which the electric signal of one of the water level sensors has changed last to be the water level of penetrating water in the ground; data processing means, provided in a base station that acquires the sense data transmitted from the sensing units, for processing the sense data for each measuring point in real time and comparing the result with a reference water level; and judging means for judging a state of the ground on the basis of the comparison data from the data processing means.

According to still another aspect of the present invention, there is provided a ground monitoring apparatus comprising: a plurality of sensing units buried at suitable intervals in an area of ground to be observed, each sensing unit including a gyro-sensor for, when external force acts on it as a result of the displacement of ground, sensing impulsive acceleration from the magnitude and direction of the displacement and the inclination of the sensing unit itself, a plurality of water level sensors which are provided at suitable intervals in a longitudinal direction of the sensing unit and sense the water level in the ground or in the ground and above the ground, and a computing section for subjecting the acceleration value sensed by the gyro-sensor and the water level data sensed by the water level sensor to a computing process; data processing means, provided in a base station that acquires the sense data transmitted from the sensing units, for processing the sense data for each measuring point in real time and determining the data items that have exceeded a reference acceleration value and the data items that have exceeded a reference water level or the data items that have exceeded the reference water level and the water level data above the ground for each measuring point; and judging means for judging the cause of a landslide and its size on the basis of the data processed by the data processing means.

According to still another aspect of the present invention, there is provided a ground monitoring apparatus comprising: a plurality of sensing units buried at suitable intervals in an area of ground to be observed, each sensing unit including a two-axis inclinometer for sensing the tilt angles of two axes crossing at right angles and the direction of tilt, a plurality of water level sensors which are provided at suitable intervals in a longitudinal direction of the sensing unit and sense the water level in the ground or in the ground and above the ground, and a computing section for subjecting the angle value of the inclinometer, the data from the inclinometer, and the water level data to a computing process; data processing means, provided in a base station that acquires the sense data transmitted from the sensing units, for processing the sense data for each measuring point in real time and determining the data items that have exceeded a reference tilt angle value and the data items that have exceeded a reference water level or the data items that have exceeded the reference water level and the water level data above the ground for each measuring point; and judging means for judging the cause of a landslide and its size on the basis of the data processed by the data processing means.

According to still another aspect of the present invention, there is provided a ground monitoring apparatus comprising: a plurality of sensing units buried at suitable intervals in an area of ground to be observed, each sensing unit including a gyro-sensor for, when external force acts on it as a result of the displacement of the ground, sensing impulsive acceleration from the magnitude and direction of the displacement and the inclination of the sensing unit itself, a two-axis inclinometer for sensing the tilt angles of two axes crossing at right angles and the direction of tilt, a plurality of water level sensors which are provided at suitable intervals in a longitudinal direction of the sensing unit and sense the water level in the ground or in the ground and above the ground, and a computing section for subjecting the acceleration value obtained by correcting the angle value of the gyro-sensor on the basis of the angle value of the inclinometer, the data from the inclinometer, and the water level data to a computing process; data processing means, for provided in a base station that acquires the sense data transmitted from the sensing units, for processing the sense data for each measuring point in real time and, of the data items that have exceeded a reference acceleration value for each measuring point, determining the data items that have exceeded a reference tilt angle and the data items that have exceeded a reference water level or the data items that have exceeded the reference water level and the water level data above the ground; and judging means for judging the cause of a landslide and its size on the basis of the data processed by the data processing means.

According to still another aspect of the present invention, there is provided an underground water level sensing unit comprising: a cylindrical member which is buried in ground and at whose outer surface a plurality of hollow sections, for accumulating penetrating water from a very wet layer in the ground are provided at suitable intervals in a direction of axis; and a plurality of water level sensors for sensing the water accumulated in the hollow sections in the form of electric signal.

According to still another aspect of the present invention, there is provided an underground water level sensing unit comprising: a double-structure cylindrical member buried in ground and composed of an inner cylinder and a porous outer cylinder; a plurality of small compartments formed by a plurality of partition plates provided at suitable intervals in a direction of axis between the inner cylinder and outer cylinder; and a plurality of water level sensors for sensing water penetrating through the outer cylinder from a very wet layer in the ground into the small compartments in the form of electric signal.

According to still another aspect of the present invention, there is provided an underground water level sensing unit comprising: a plurality of holes bored at suitable intervals in a direction of axis in the same outer surface of a thick cylindrical member buried in ground; and a plurality of water level sensors for sensing water penetrating into the holes from a very wet layer in the ground in the form of electric signal.

According to still another aspect of the present invention, there is provided a snowslide monitoring apparatus comprising: a plurality of sensing units buried at suitable intervals in an area of a snow accumulation section to be observed, each sensing unit including a gyro-sensor for, when external force acts on it as a result of the displacement of the snow accumulation section, sensing impulsive acceleration from the magnitude and direction of the displacement and the inclination of the sensing unit itself, a plurality of thermometers which are provided at suitable intervals in a longitudinal direction of the sensing unit and sense temperature at each depth in the snow accumulation layer, and a computing section for subjecting the acceleration value sensed by the gyro-sensor and the temperature data sensed by each of the temperatures to a computing process; data processing means, provided in a base station that acquires the sense data transmitted from the sensing units, for processing the sense data for each measuring point in real time and determining the data items that have exceeded a reference acceleration value and the data items that have exceeded a reference temperature for each measuring point; and judging means for judging the possibility that a snowslide will take place or the presence or absence of a snowslide and its size on the basis of the data processed by the data processing means.

According to still another aspect of the present invention, there is provided a snowslide monitoring apparatus comprising: a plurality of sensing units buried at suitable intervals in an area of a snow accumulation section to be observed, each sensing unit including a gyro-sensor for, when external force acts on it as a result of the displacement of the snow accumulation section, sensing impulsive acceleration from the magnitude and direction of the displacement and the inclination of the sensing unit itself, a two-axis inclinometer for sensing the tilt angles of two axes crossing at right angles and the direction of tilt, a plurality of thermometers which are provided at suitable intervals in a longitudinal direction of the sensing unit and sense temperature at each depth in the snow accumulation layer, and a computing section for subjecting the acceleration value obtained by correcting the angle value of the gyro-sensor on the basis of the angle value of the inclinometer, the data from the inclinometer, and the temperature data to a computing process; data processing means, provided in a base station that acquires the sense data transmitted from the sensing units, for processing the sense data for each measuring point in real time and, of the data items that have exceeded a reference acceleration value for each measuring point, determining the data items that have exceeded a reference tilt angle value and the data items that have exceeded a reference temperature; and judging means for judging the possibility that a snowslide will take place or the presence or absence of a snowslide and its size on the basis of the data processed by the data processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, embodiments of the present invention will be explained.

[First Embodiment]

Figure 1:
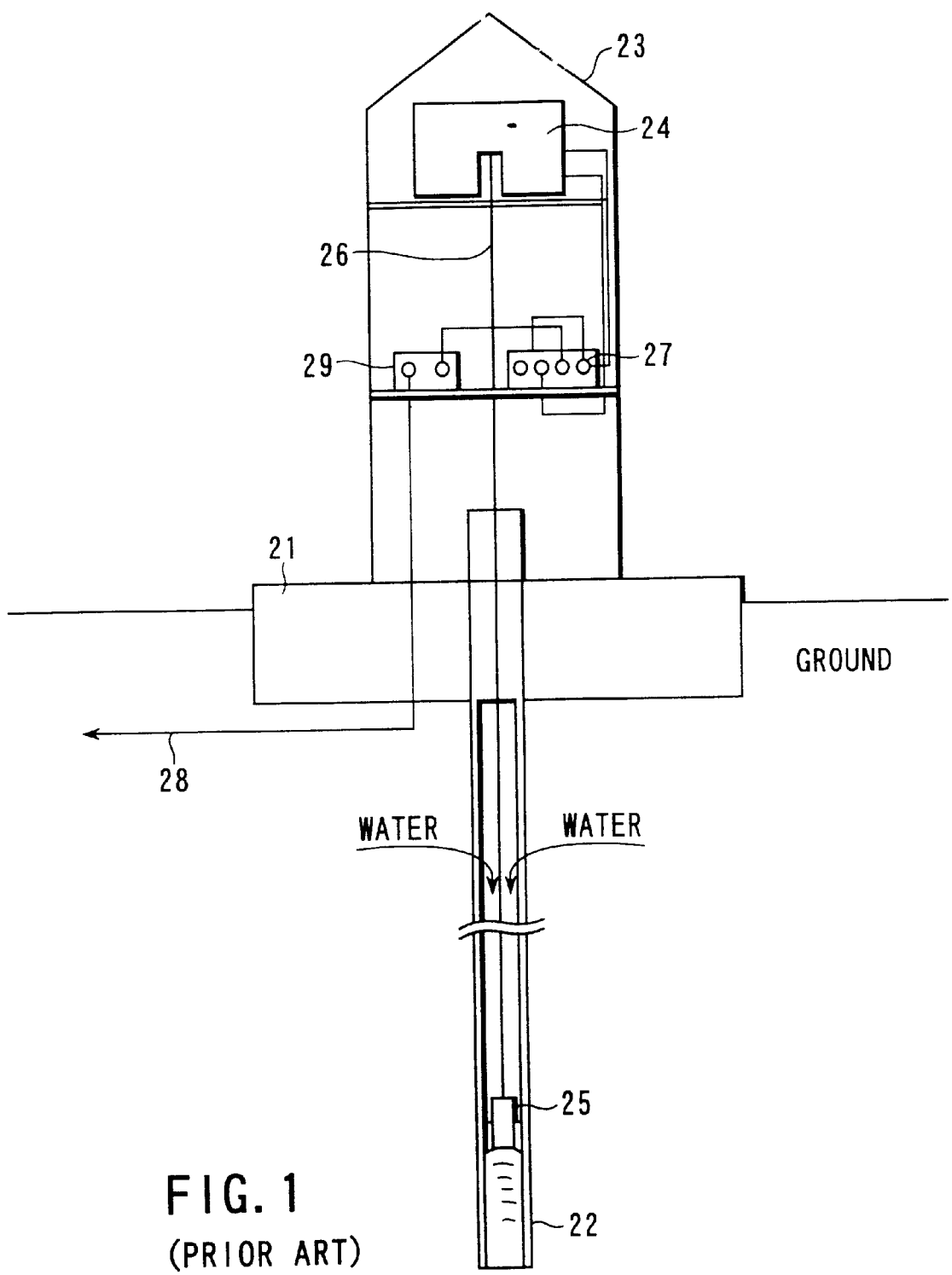
FIG. 1 is a diagram to help explain the configuration of a conventional underground water level sensing unit.
Figures 2, 3A, 3B:
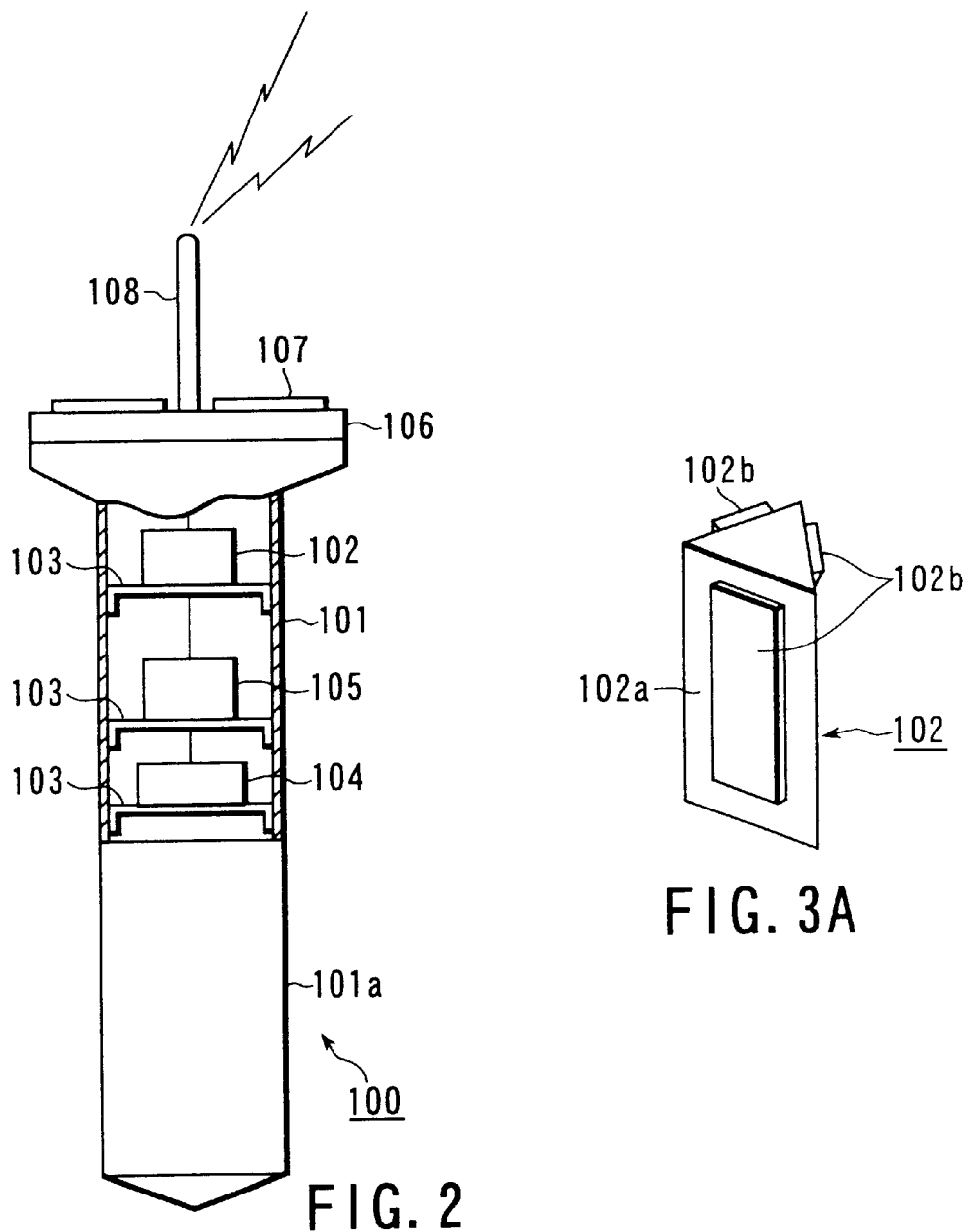
FIG. 2 is a schematic diagram of a sensing unit, with the important portions broken away, used in a monitoring apparatus according to a first embodiment of the present invention.
FIGS. 3A and 3B show an example of the configuration of a three-dimensional solid-state gyro-sensor using piezoelectric elements as sensing sections in the sensing unit of the first embodiment.

FIG. 2 shows an example of the configuration of a sensing unit used in a monitoring apparatus according to a first embodiment of the present invention.

In FIG. 2, numeral 100 is a sensing unit. The sensing unit 100 has a cylindrical member 101 that is to be buried in the ground. The cylindrical member 101 can be adjusted so as to have a suitable length according to how deep the member is buried. In the cylindrical member 101, a three-dimensional solid-state gyro-sensor 102 is provided as a sensing section. The gyro-sensor 102 is fixed to the inner wall of the cylindrical member 101 via a support plate 103. The fixed position of gyro-sensor 102 can be adjusted according to a desired measuring point. In the cylindrical member 101, there are further provided a battery 104 for driving the three-dimensional solid-state gyro-sensor 102 and a computing section 105 for amplifying the sense signal from the gyro-sensor 102 and making calculations.

Numeral 106 indicates a lid member for closing the upper opening section of the cylindrical member 101. On the top surface of the lid member 106, there is provided a solar battery 107 acting as a charging power supply for the battery 104. Further on the lid member 106, there is provided a transmission antenna 108 for transmitting the sense signal processed at the computing section 105 to a base station (not shown).

The gyro-sensor 102 is a vibration gyro-sensor which is such that a piezoelectric element 102b for sensing external force in the direction of one of three axes is provided on each side of a triangular prism 102a as shown in FIG. 3A. When an acceleration of α is applied to each piezoelectric element 102b, the elements 102b generate a voltage proportional to the acceleration. The voltage is inputted to the computing section 105.

FIG. 3B shows an example of a sensing circuit applied to the gyro-sensor 102. The three piezo-electric elements 102b are made up of two sensing piezoelectric elements (L and R) and one feedback piezoelectric element (FB). The sensing circuit includes a bias oscillator 102c, a phase compensator circuit 102d, a differential amplifier 102e for L and R signals, an alternating-current output synchronous detector 102f, and a direct-current amplifier 102g. The comparison of the level of the signal from the piezoelectric element L with that of the signal from the piezoelectric element R enables the polarity to be judged and the angular rate to be sensed.

Instead of the piezoelectric elements, semiconductor strain sensors may be used. While a vibration gyro-sensor (a kind of mechanical gyro-sensor) has been used as the gyro-sensor, other types of mechanical gyro-sensors may be used. In addition, an optical gyro-sensor (an optical fiber gyro-sensor or a ring laser gyro-sensor) or a fluid gyro-sensor may be used. An optical fiber gyro-sensor and a ring laser gyro-sensor, which are considered to be particularly effective in this case, will be described by reference to FIGS. 4 and 5.

Figure 4:
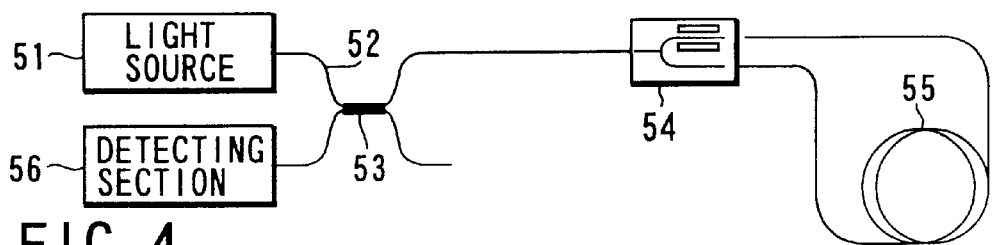
FIG. 4 shows an example of the configuration of an optical fiber gyro-sensor.

An optical fiber gyro-sensor shown in FIG. 4 is a rate sensor capable of sensing angular rate using the Sagnac effect. The coherent light (laser light) emitted from a light source 51 is directed to a coupler 53 via an optical fiber 52. The light is branched into two by a coupler 53 and an optical integrated circuit 54. Both of the divided rays of light are allowed to enter both ends of a sensing coil 55. The rays of light that have passed through the sensing coil 55 and come back are combined by the coupler 53 and converted by a detecting section 56 into an electric signal proportional to the intensity of light. When the sensor is at rest, the intensity of light sensed by the detecting section 56 is constant. When an angular rate acts on the sensing coil 55, a phase difference occurs between the rays of light, resulting in a change in the light intensity. The angular rate is determined by sensing the change.

Figure 5:
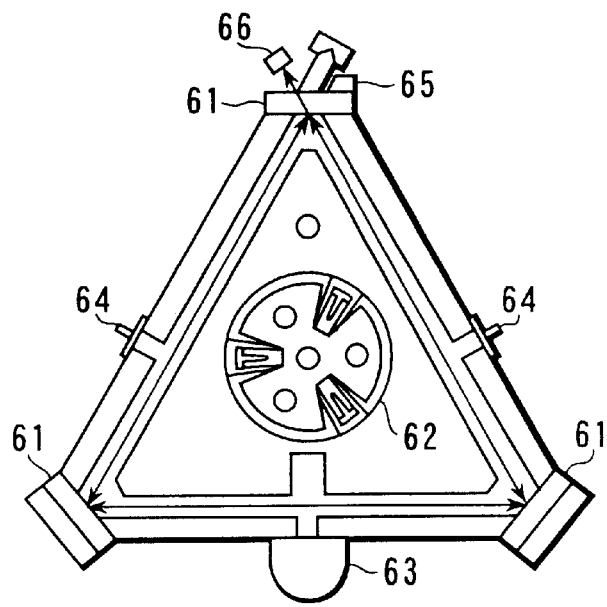
FIG. 5 shows an example of the configuration of a ring laser gyro-sensor.

A ring laser gyro-sensor shown in FIG. 5 is also an angular rate sensor using the Sagnac effect. In a closed optical path composed of a mirror 61, a dither unit 62, a cathode 63, and an anode 64, laser light is generated by a photodiode 65. An oscillating state is produced by adjusting the optical path length. Rotating the optical path causes the clockwise laser light and the counterclockwise laser light to produce interference fringes, with the result that the frequency proportional to the angular rate appears. The frequency is sensed by a detector 66, which determines the angular rate.

Figure 6:
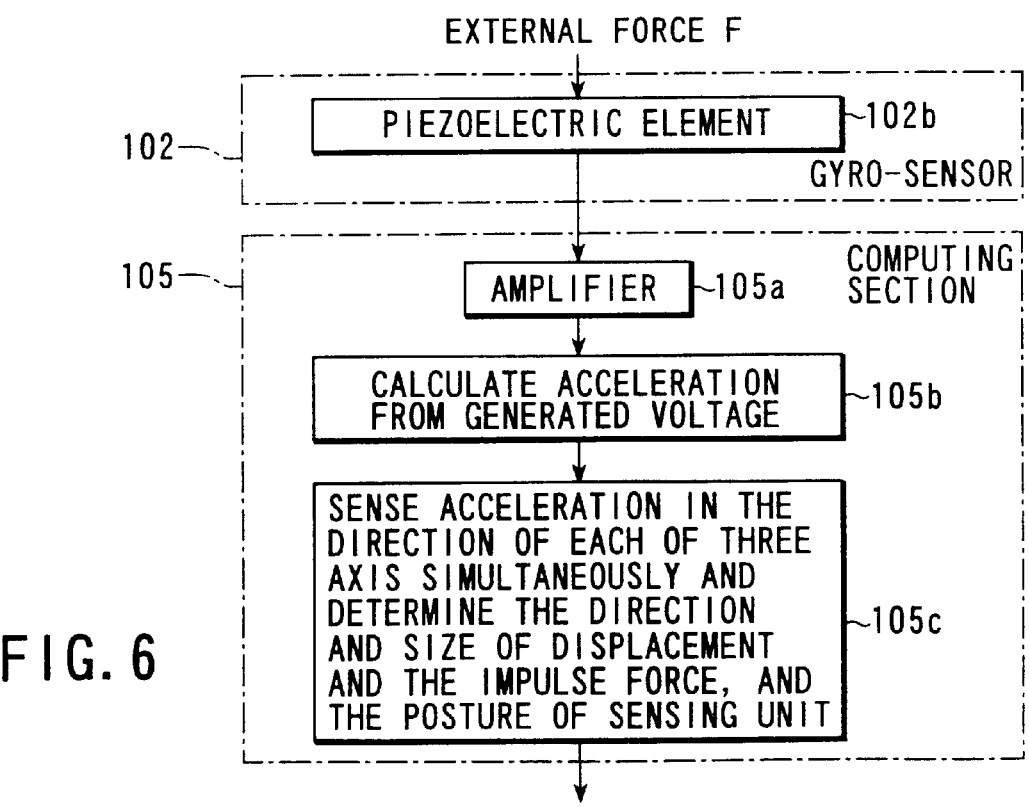
FIG. 6 is a block diagram to help explain the function of the computing section in the sensing unit of the first embodiment.

The function of the computing section 105 shown in FIG. 2 will be explained in detail by reference to FIG. 6.

When the voltage generated by the individual piezoelectric elements 102*b* of the gyro-sensor 102 according to the acceleration a is inputted to the computing section 105, a amplifier 105a amplifies the voltage signal to a signal level suitable for a computing process, an acceleration determining section 105*b* finds acceleration on the basis of the voltage signal, and a judging section 105*c* judges the magnitude and direction of the displacement, the impulse force, and the posture of the sensing unit 100.

A ground monitoring apparatus using sensing units 100 having such a configuration and functions will be explained.

Figure 7:
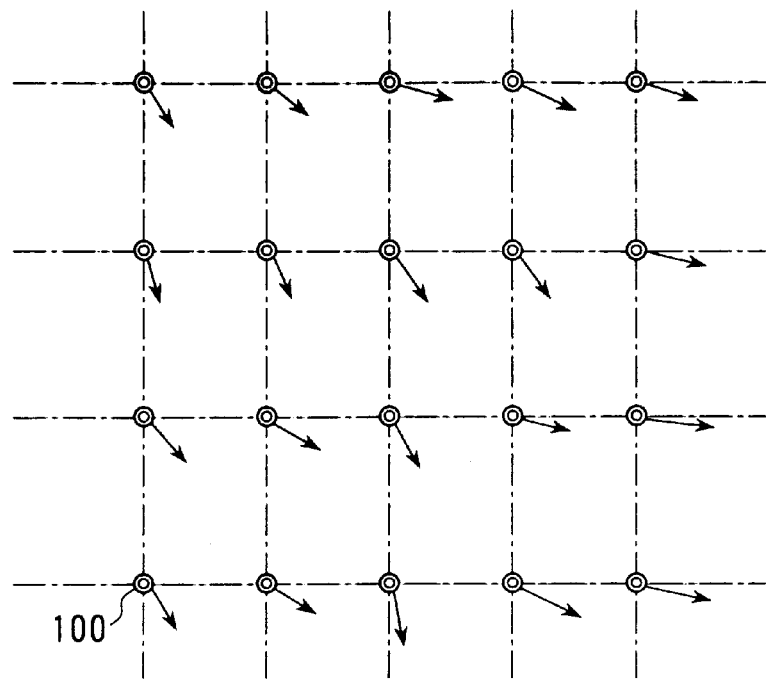
FIG. 7 shows a state where sensing units of the same type as that of the sensing unit in the first embodiment are arranged in a matrix.
Figure 8:
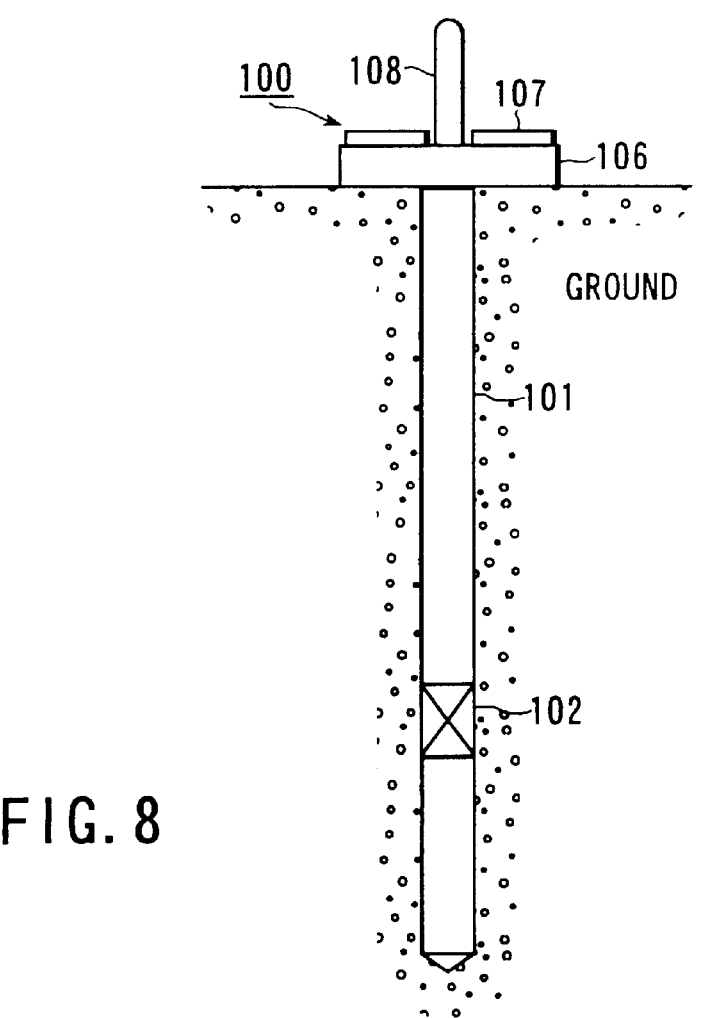
FIG. 8 shows a state where the sensing unit of the first embodiment is buried in the ground.

Sensing units are placed in a matrix and properly spaced in the ground in an area where a landslide can take place, such as a mountainous region, as shown in FIG. 7. They are buried as shown in FIG. 8.

Figure 9A:
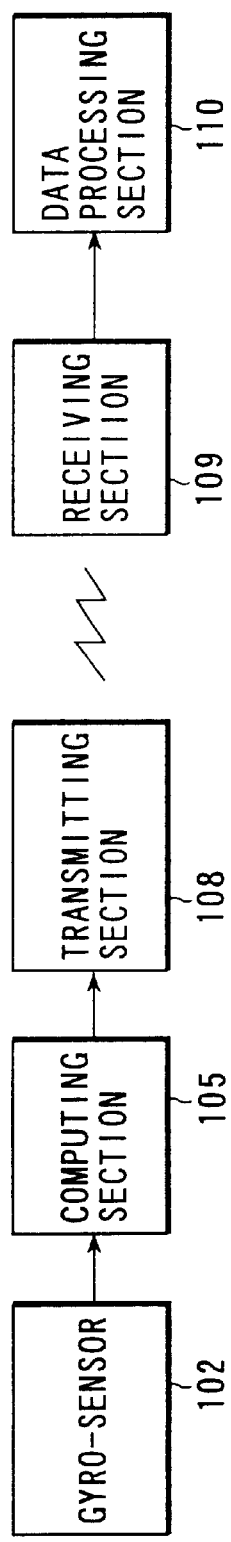
FIGS. 9A and 9B are block diagrams to help explain a data processing function in the first embodiment.
Figure 9B:
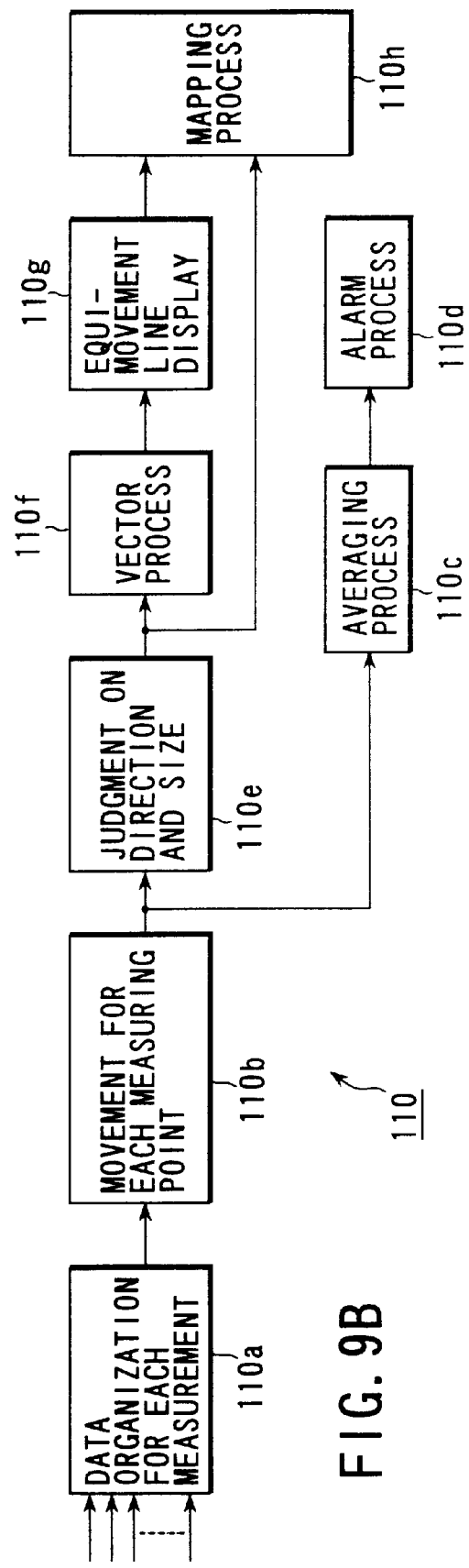

FIGS. 9A and 9B are block diagrams of the configuration of a system for transmitting data, including the magnitude and direction of the displacement sensed by each sensing unit 100, the impulse force, and the posture of each sensing unit 100, to a base station and monitoring the state of the ground in a specific range.

In FIG. 9A, each sensing unit side is composed of a gyro-sensor 102, a computing section 105, and a transmitting section (transmission antenna) 108. The base station side is composed of a receiving section 109 and a data processing section 110.

As shown in FIG. 9B, the data processing section 110 on the base station side includes a data organizing section 110*a* for organizing data on measurement from each sensing unit 100, a computing section 110*b* for determining the movement for each measuring point on the basis of the data organized by the data organizing section 110*a*, an averaging section 110*c* for averaging the movements determined by the computing section 110*b* and, if the average value is larger than a specific reference, will actuate an alarm section 110*d*, a judging section 110*e* for judging the magnitude and direction of the displacement on the basis of the movement determined by the computing section 110*b*, a vector processing section 110*f* for performing a vector process on the basis of the magnitude and direction of the displacement judged by the judging section 110*e*, display means 110*g* for displaying equi-movement lines on the basis of the vector at each point subjected to the vector process, and a mapping section 110*h* for performing a mapping process on the basis of the equi-movement lines displayed by the display means 110*g* and the magnitude and direction of the displacement judged by the judging section 110*e*.

The operation of the ground monitoring apparatus constructed as described above will be explained.

As means for transmitting the data from each sensing unit 100 to the base station, communication means using microwaves or communication means using PHS (Personal Handy-phone System) channels can be considered. Other types of communication means may be used as long as they are capable of transmitting, by radio, data indicating the accelerations and inclinations of the three axes sensed by the individual sensing units 100.

With the sensing units 100 arranged in a matrix as shown in FIG. 7, it is assumed that the displacement whose magnitude and direction are shown by the arrow develops at each measuring point in the ground. In this situation, the solid-state three-dimensional gyro-sensor 102 and computing section 105 sense the acceleration and the inclination of each sensing unit 100. These sensed data items are transmitted from the transmission antenna 108 to the base station.

As shown in FIGS. 9A and 9B, when receiving the data transmitted from each sensing unit 100, the base station processes the data as follows. In the data processing section 110, the data organizing section 110*a* organizes the accelerations and inclination data items corresponding to the three axes for each measuring point. Then, the computing section 110*b* determines the movement for each measuring point. The movement for each measuring point determined by the computing section 110*b* is subjected to an averaging process at the averaging section 110*c*. When the resulting value has exceeded a specific value, the alarm section 110*d* produces an alarm, warning that there is a strong possibility that a landslide will take place.

The judging section 110*e* judges the direction and magnitude of the movement for each measuring point and gives the result to not only the mapping section 110*h* but also the vector processing section 110*f*. The result is subjected to a vector process at the vector processing section 110*f* and then converted into an equi-movement display signal at the equi-movement display section 110*g*. The equi-movement display signal is supplied to the mapping section 110*h*.

The mapping section 110*h* senses the entire change the equi-movement display signal and points from the equi-moving lines. It also maps the entire change and its direction on a map on the basis of the direction and magnitude of the movement for each measuring point, making it possible to observe the change of the ground.

As described above, the first embodiment includes the solid-state three-dimensional gyro-sensors 102 using piezoelectric elements or semiconductor strain sensors, the computing section 105, and the battery 104 using the solar battery 107 as a power supply. The sensing units 100 without a moving section which are capable of sensing the magnitude and direction of the displacement, the impulse force, and their own posture are buried in the holes bored in the ground in an area to be monitored. The data from the sensing units 100 are transmitted by radio to the base station. In the base station, the data processing section 110 processes the received data in real time and determines the movement for each measuring point. The movement is plotted on a map, thereby enabling the state of the ground to be monitored.

Therefore, when holes are just bored in a large number of places over a wide area in, for example, a mountainous region and sensing units 100 are simply buried in the holes, this eliminates the need for power cables and communication cables and facilitates the installation of sensing units 100.

Because the solid-state three-dimensional gyro-sensors 102 are used in the sensing units 100, they have no moving sections. Because the sensing units 100 use the solar battery as the power supply, they consume less electric power. These features combine to achieve an almost indefinite service life and eliminate the need for maintenance.

With the sensing units 100 arranged in a matrix as shown in FIG. 7, the direction, movement, and acceleration of the displacement of the ground can be sensed for the entire layer. The acceleration of movement of the layer can also be sensed. Therefore, in the base station, the measurement data transmitted by radio from each gyro-sensor 102 is processed to determine the movement for each measuring point and the average of the movements. If the average value has exceeded the specific value, an alarm is given. Moreover, the direction and magnitude of the movement for each measuring point are judged and the result is subjected to the vector process. On the resulting vector, equi-movement lines are displayed. The overall change is determined from the mapping process and the points are sensed from the equi-movement line. From the direction and magnitude of the movement for each measuring point, the overall change and direction are plotted on a map. Observing the changing state of the ground makes it possible to judge whether the ground is in a stable state or in a dangerous state where a landslide is being accelerated.

In the first embodiment, sensing units 100 are placed in various places. Persons or animals may pass by or touch some of the sensing units 100. In such a case, they may sense erroneous data.

To prevent the sensing units 100 from sensing data erroneously, the following measures can be taken:

(1) When the sensed value of a sensing unit 100 has varied greatly, the data processing section on the base station side samples the data for a specific period of time (for example, about five minutes). If the variation continues further, it will judge that there is something wrong with the ground.

(2) When the sensed value of a sensing unit 100 has varied, the data processing section on the base station counts how many times the values of the same order have been sensed consecutively. If the count is larger than a specific number of times (for example, three times), it will judge that there is something wrong with the ground.

(3) When a sensing unit 100 has sensed an impulse value (G value) larger than a specific value, the data processing section judges that an abnormality, such as falling stones, has occurred, even when the number of times sensing has been done is smaller than the specified value.

The above-described functions may be incorporated into sensing units 100 beforehand. This simplifies the monitoring unit in the data processing section on the base station side.

While in the first embodiment, a sensing unit 100 including a solid-state three-dimensional gyro-sensor 102 put in the cylindrical member 101 in a single stage form as shown in FIG. 8 has been buried in the ground, a sensing unit 100 including solid-state three-dimensional gyro-sensors 102 each provided in the upper and lower parts of the cylindrical member 101 in a two-stage form may be buried in the ground. This will enable an interlayer slide between the surface portion and the deeper portion of the layer to be sensed.

In the first embodiment, the case where a landslide is monitored by sensing the displacement of the ground has been explained. Similar sensing units 100 may be used to monitor the occurrence of a snowslide by sensing the accumulation of snow in a snowy region.

Figure 10:
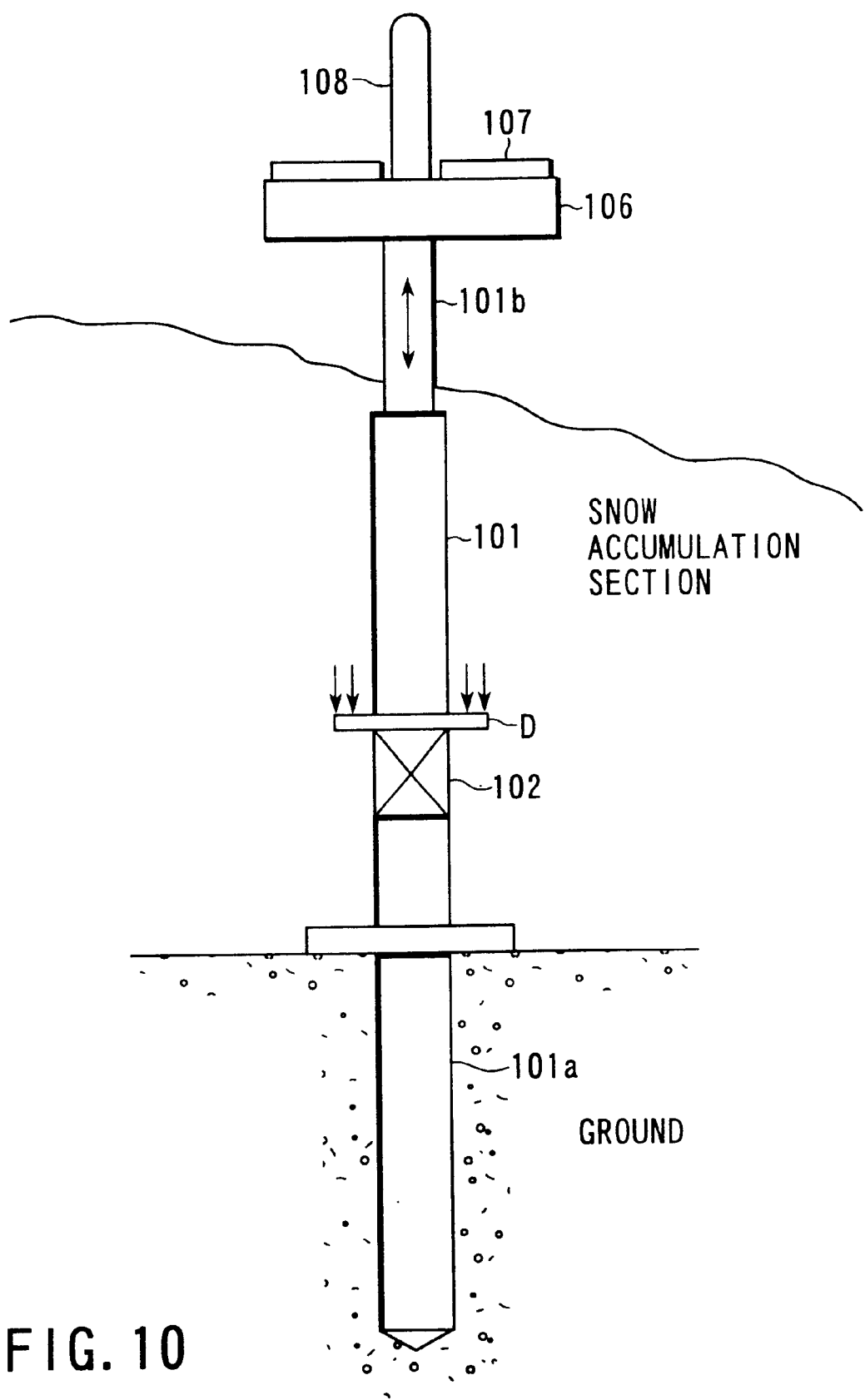
FIG. 10 shows a state where the sensing unit of the first embodiment is buried in a snow accumulation section.

FIG. 10 shows the state of a sensing unit 100 buried in a snowy region.

As shown in FIG. 10, the sensing unit 100 has an upper cylindrical section 110b designed to be expandable in a vertical direction as indicated by the arrow. In installation, the length of the cylindrical section 110b is adjusted according to the amount of snowfall. In this case, if the relationship between the amount of strain in the direction of axis and snowfall were determined by experiments, the amount of snowfall could be sensed by means of the sensing section D. The cylindrical member 101 is provided with a downer cylindrical section 110b which is buried in the ground and supports the sensing section D.

When an area to be monitored extends in a line along a river or a railway, sensing units 100 are placed in a line at suitable intervals toward a base station. By transferring the sense data via the intervening sensing units 100, effective monitoring can be done with a small number of low-output sensing units 100.

Use of waterproof sensing units 100, use of a secondary battery as a power supply, and data transfer by wire enable the ground, such as a riverbed or the seabed, to be monitored.

As described above, with the first embodiment, it is possible to provide a monitoring apparatus which is easy to bury in the ground and can predict the occurrence of disaster, such as a landslide in the ground or a snowslide in a snowy region, by use of sensing units 100 capable of sensing the displacement exactly even when all of the ground or the snow accumulation section has been displaced.

[Second Embodiment]

Figure 11:
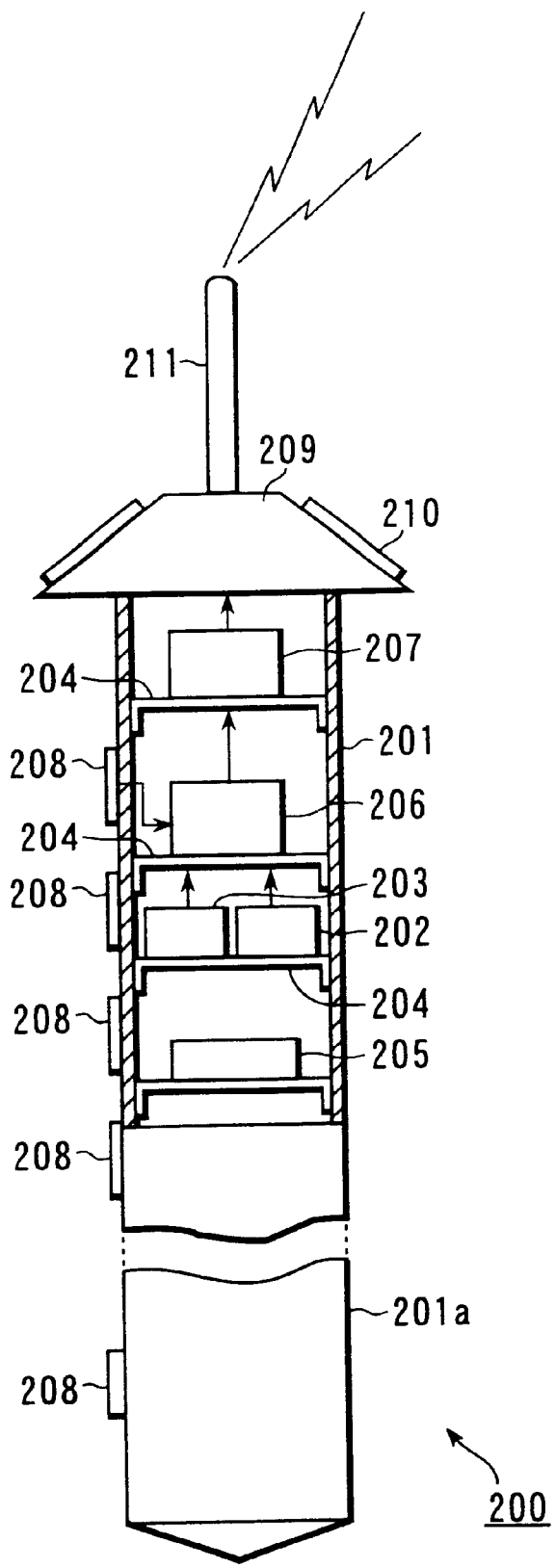
FIG. 11 is a schematic diagram of a sensing unit, with the important portions broken away, used in a ground monitoring apparatus according to a second embodiment of the present invention.

FIG. 11 shows an example of the configuration of a sensing unit used in a ground monitoring apparatus according to a second embodiment of the present invention.

In FIG. 11, numeral 200 is a sensing unit. The sensing unit 200 has a cylindrical member 201 that is to be buried in the ground. The cylindrical member 201 can be adjusted so as to have a suitable length according to how deep the member is buried. In the cylindrical member 201, there are provided a solid-state gyro-sensor 202 serving as a sensing section and a two-axis inclinometer 203. The gyro-sensor 202 and inclinometer 203 are mounted on a support plate 204 fixed to the surface of the inner wall of the cylindrical section 201a. In the cylindrical section 201a, there are further provided a battery 205 acting as a driving power supply, a computing section 206 for amplifying the sense signals from the gyro-sensor 202 and inclinometer 203 and making calculations, and a transmitting section 207 for transmitting the sense signal processed at the computing section 206. Each of the battery 205, computing section 206, and transmitting section 207 is mounted on a support plate 204 fixed to the surface of the inner wall of the cylindrical member 201.

Furthermore, a plurality of water level sensor 208 are fixed to the outer surface of the cylindrical member 201 in the direction of axis at suitable intervals.

Numeral 209 indicates a lid member for closing the upper opening section of the cylindrical member 201. On the top surface of the lid member 209, there is provided a solar battery 210 acting as a charging power supply for the battery 205. Further on the lid member 209, there is provided a transmission antenna 211 for transmitting the sense signal processed at the computing section 206 from the transmitting section 207 to a base station (not shown).

The gyro-sensor 202 is identical to the gyro-sensor 102 of FIG. 3A.

The two-axis inclinometer 203 measures the tilt angles of two axes crossing at right angles and supplies the measurement signal to the computing section 206.

The water level sensor 208 senses the electrical resistance, which changes according to the moisture in the ground where it is buried. The sensor 208 then supplies the sensed change in the electrical resistance to the computing section 206.

The function of each of the gyro-sensor 202, inclinometer 203, water level sensor 208, and computing section 206 will be explained by reference to FIGS. 12 and 13.

Figure 12:
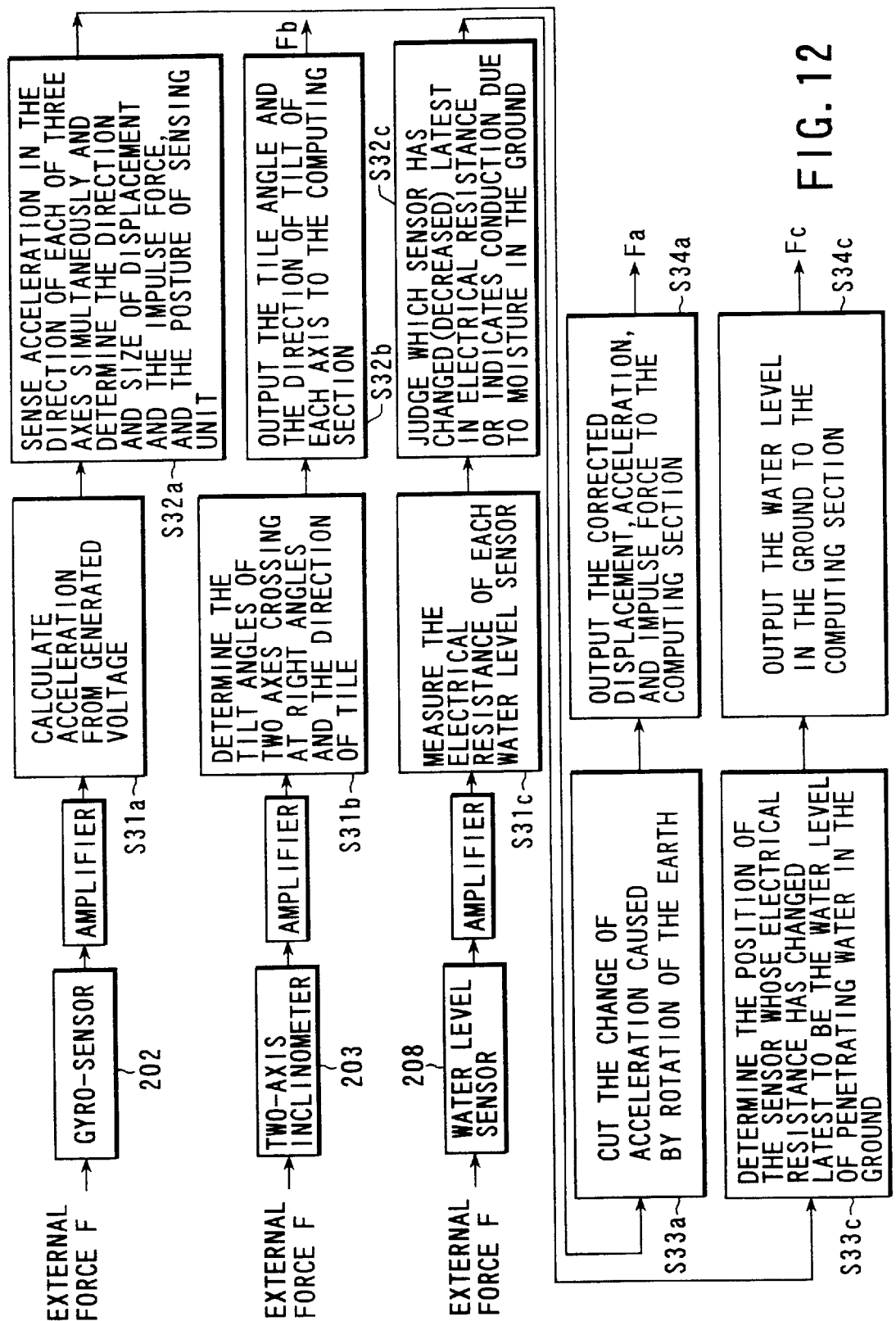
FIG. 12 is a block diagram to help explain the function of processing the signals from the gyro-sensor, two-axis inclinometer, and water level sensor in the sensing unit of the second embodiment.
Figure 13:
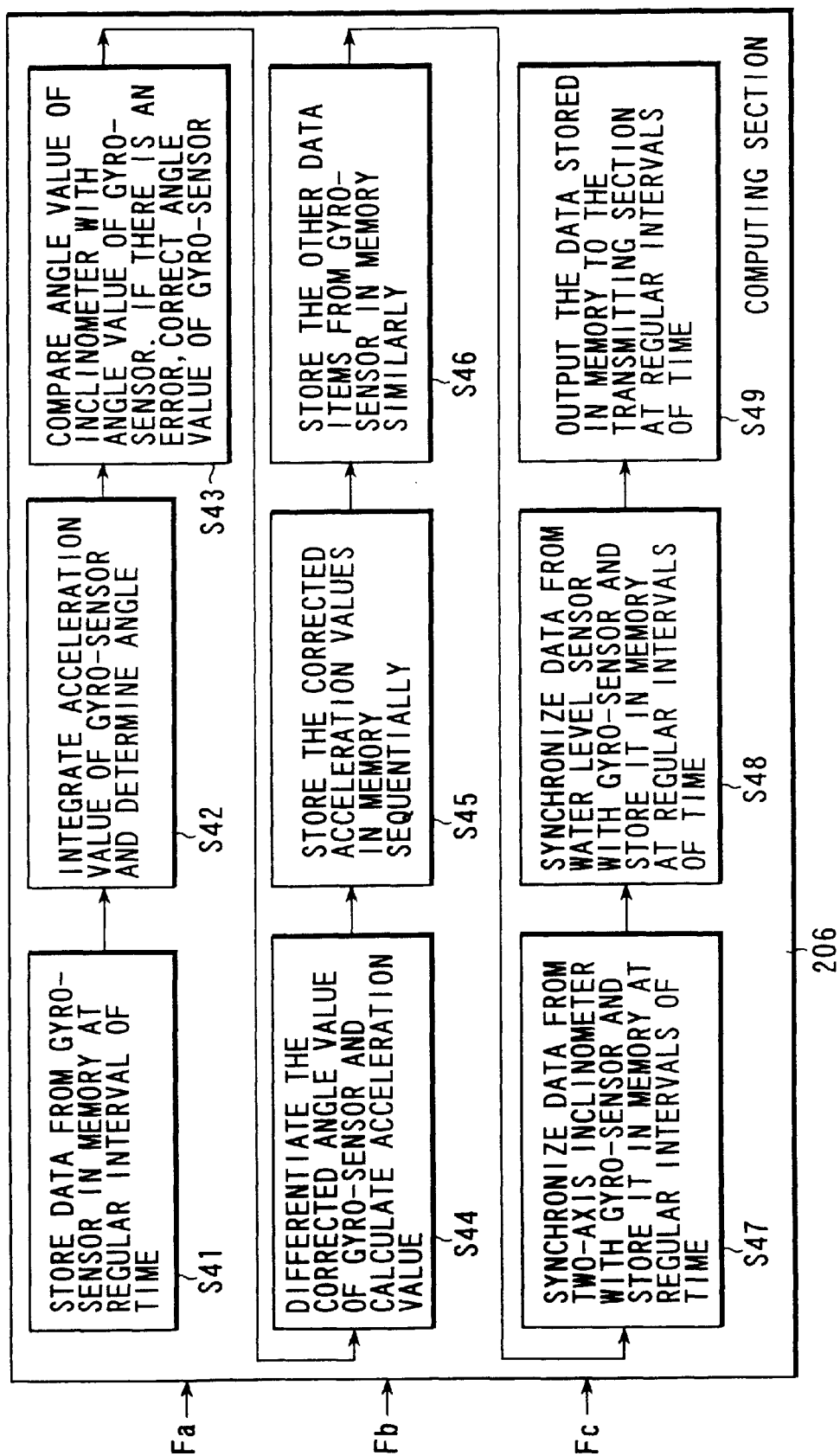
FIG. 13 is a block diagram to help explain the function of processing the signals in the computing section in the sensing unit of the second embodiment.

In FIG. 12, each piezoelectric element of the gyro-sensor 202 generates a voltage according to an acceleration of $\alpha$. When the gyro-sensor 202 inputs the voltages, an amplifier amplifies the voltage signals to signal levels suitable to a computing process. At a section S31a, an acceleration is calculated from the voltage signals. Next, at a section S32a, the acceleration in the direction of each axis simultaneously is sensed and the direction and magnitude of the displacement, the impulse force, and the posture of the sensing unit 200 are judged from these values. At a section S33a, the acceleration caused by the rotation of the earth is cut. Next, at a section S34a, the displacement, acceleration, and impulse force are corrected and the resulting data items are outputted to the computing section 206.

Moreover, the measurement signal from the two-axis inclinometer 203 is amplified by an amplifier to a signal level suitable for a computing process. At a section 31b, the tilt angles of the two axes crossing at right angles and the direction of tilt are determined from the measurement signal. Next, at a section S32b, the tilt angle of each axis and the direction of inclination of each axis are outputted as output data Fb to the computing section 206.

Moreover, the sense signal from the water level sensor 208 is amplified by an amplifier to a signal level suitable for a computing process. At a section S31c, the electrical resistance of each sensor is sensed from the value. Nest, at a section S32c, it is judged which sensor has changed (decreased) latest in their electrical resistance or indicates conduction due to moisture in the ground. At a section S33c, the position of the sensor whose electrical resistance has changed latest to be the water level of the penetrating water in the ground is determined. Nest, at a section S34c, the water level is outputted as output data Fc to the computing section 206.

Figure 14:
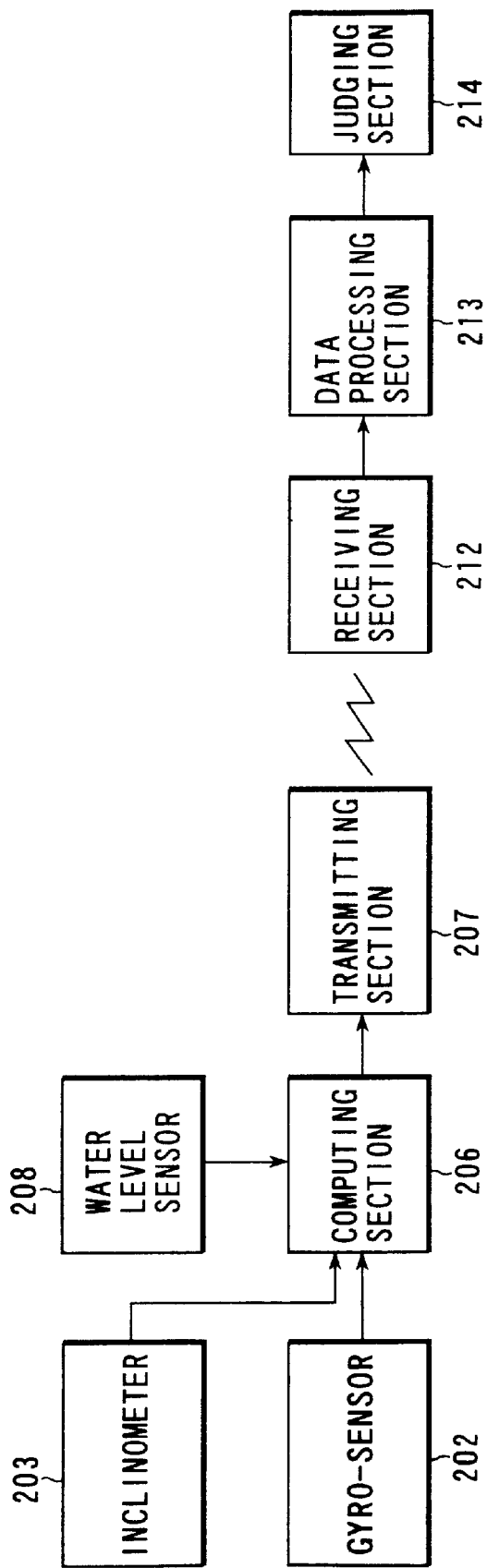
FIG. 14 is a block diagram for the data processing system in the entire ground monitoring apparatus of the second embodiment.

The output data items Fa, Fb, and Fc of the gyro-sensor 202, inclinometer 203, and water level sensor 208 are inputted to the computing section 206 as shown in FIG. 14. At a section S41, the data item from the gyro-sensor 202 is stored in a memory for a specific period of time. At a section S42, the acceleration value of the gyro-sensor is integrated from the data item to determine the angle.

At a section S43, the angle value determined by the two-axis inclinometer is compared with the angle value determined by the gyro-sensor and, if there is an error, the angle value of the gyro-sensor will be corrected. At a section S44, the corrected angle value of the gyro-sensor is differentiated to find an acceleration value. At a section S45, the acceleration value is stored in the memory sequentially. Similarly, at a section S46, other data items including the displacement of the gyro-sensor, the impulse force, and the position are stored in the memory.

At a section S47, the data from the two-axis inclinometer is synchronized with the gyro-sensor and stored in the memory at regular intervals of time. At a section S48, the data from the water level sensor is synchronized with the gyro-sensor and stored in the memory at regular intervals of time. At a section S49, the data items stored in the memory are transmitted to the transmitting section 207 at regular intervals of time.

FIG. 14 is a block diagram of a system which transmits to the base station data on the displacement, acceleration, and impulse force concerning the gyro-sensor 202, data on the tilt angle and direction concerning the inclinometer 203, and data on the water level in the ground concerning the water level sensor 208, and monitors the state of the ground in a specific range.

In FIG. 14, each sensing unit side is composed of a gyro-sensor 202, a two-axis inclinometer 203, a water level sensor 208, a computing section 206, and a transmitting section 207. The base station side is composed of a receiving section 212, a data processing section 213, and a judging section 214.

The function of the data processing section 213 on the base station side will be described by reference to FIG. 15.

Figure 15:
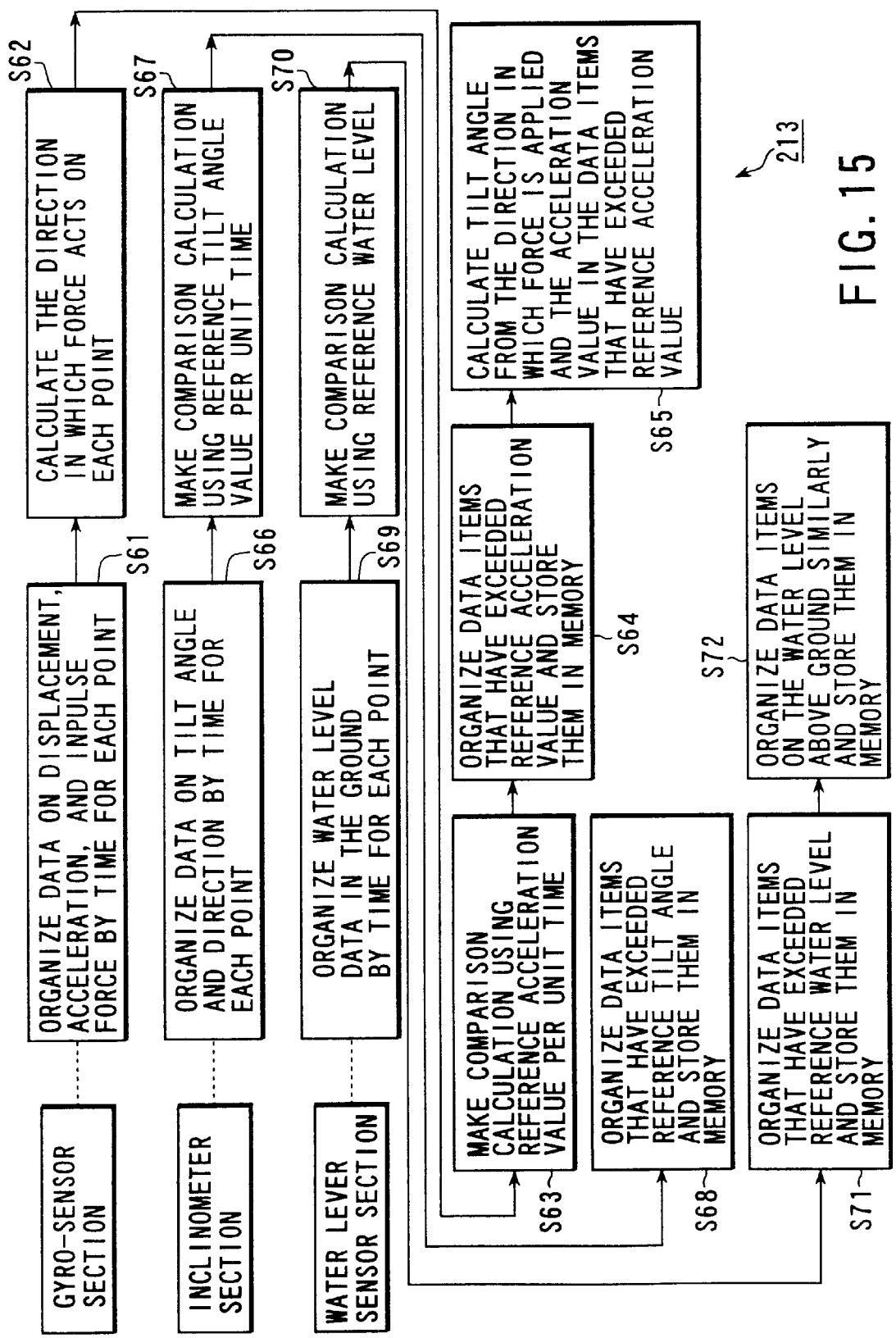
FIG. 15 is a block diagram to help explain the function of the data processing section of FIG. 14.

In the data processing section 213 of FIG. 15, at a section S61, data is organized about the displacement, acceleration, and impulse force by time for each point on the basis of the measurement signal from the gyro-sensor 202. At a section S62, the direction of force exerted on each point is calculated. At a section S63, comparison calculation is made with a reference acceleration value per unit time. At a section S64, the data items that have exceeded the reference acceleration value are organized and stored in the memory. At a section S65, a tilt angle is calculated from the direction in which the force has been applied and the acceleration value, on the basis of the data items that have exceeded the reference acceleration value.

Furthermore, at a section S66, the data items are organized about tilt angle and direction by time for each point on the basis of the measurement signal from the two-axis inclinometer 203. At a section S67, comparison calculation is made with a reference tilt angle value per unit time. At a section S68, the data items that have exceeded the reference tilt angle are organized and stored in the memory.

Furthermore, at a section S69, the underground water level data items are organized by time for each point on the basis of the measurement signal from the water level sensor 208. At a section S70, comparison calculation is made with a reference water level. At a section S71, the data items that have exceeded the reference water level are organized and stored in the memory. At a section S72, the data items are organized about the water level above ground in a similar manner and stored in the memory.

Furthermore, the judging section 214 carries out various judging processes, explained later in detail, on the basis of the data processed by the data processing section 213 and gives the alarm or displays a suitable message according to the cause and size of a landslide.

The operation of the ground monitoring apparatus constructed as described above will be explained.

Figure 16:
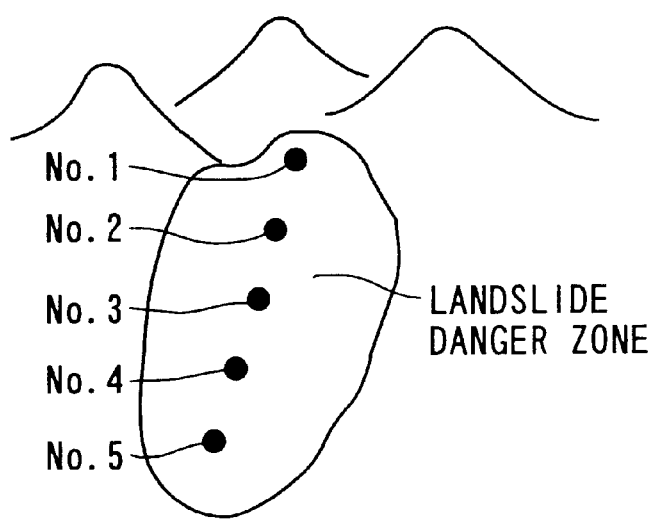
FIG. 16 shows an example of an arrangement of sensing units of the second embodiment on a slope in a mountainous region.
Figure 17:
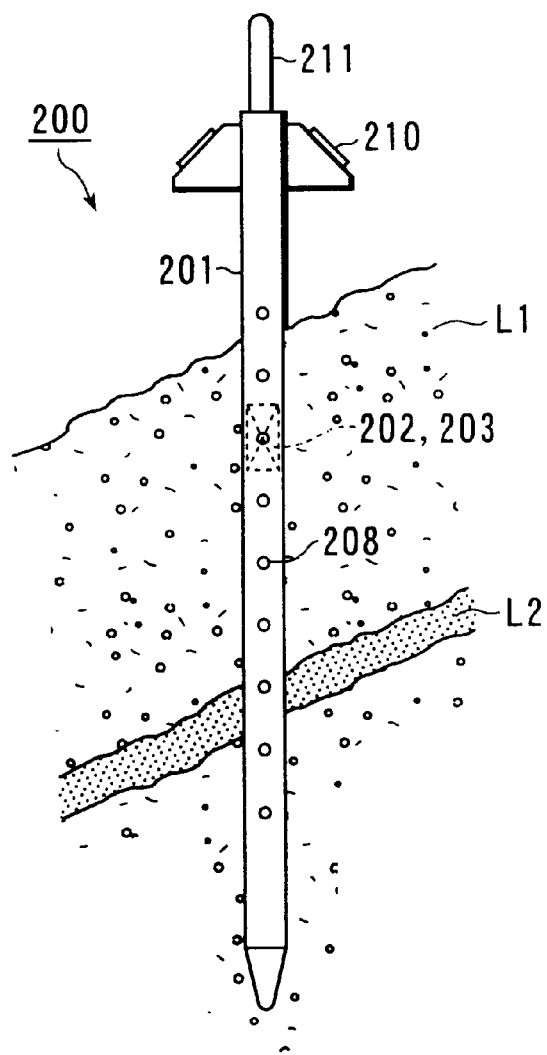
FIG. 17 shows a state where a sensing unit of the second embodiment is buried in the ground.

As shown in FIG. 16, a plurality of sensing units 200 are placed in the ground in a mountainous region where a landslide is liable to take place. Specifically, sensing units 200 (No. 1 to No. 5) are placed at suitable intervals along a slope in a landslide danger zone. They are buried as shown in FIG. 17, where L1 indicates a soil layer and L2 indicates a clay layer.

In each sensing unit 200 buried this way, the signals from the gyro-sensor 202, inclinometer 203, and water level sensor 208 at each measuring point in the ground are subjected to the processes as shown in FIG. 12. The resulting signals are taken in by the computing section 206. The computing section 206 then makes the calculations as shown in FIG. 13. The transmitting section 207 transmits the corrected acceleration value, the data from the inclinometer 203, and the data from the water level sensor 208 to the base station via the transmission antenna 211.

In the base station, as shown in FIG. 14, when the receiving section 212 receives the data transmitted from each sensing unit 200, the data processing section 213 processes the data and organizes each of the data items that have exceeded the reference acceleration value, the data items that have exceeded the reference tilt angle, the data items that have exceeded the reference water level, and data on the ground water level. The organized data items are taken in by the judging section 214.

The various judging processes carried out by the judging section 214 will be described in detail by reference to FIGS. 18 to 20.

Figure 18:
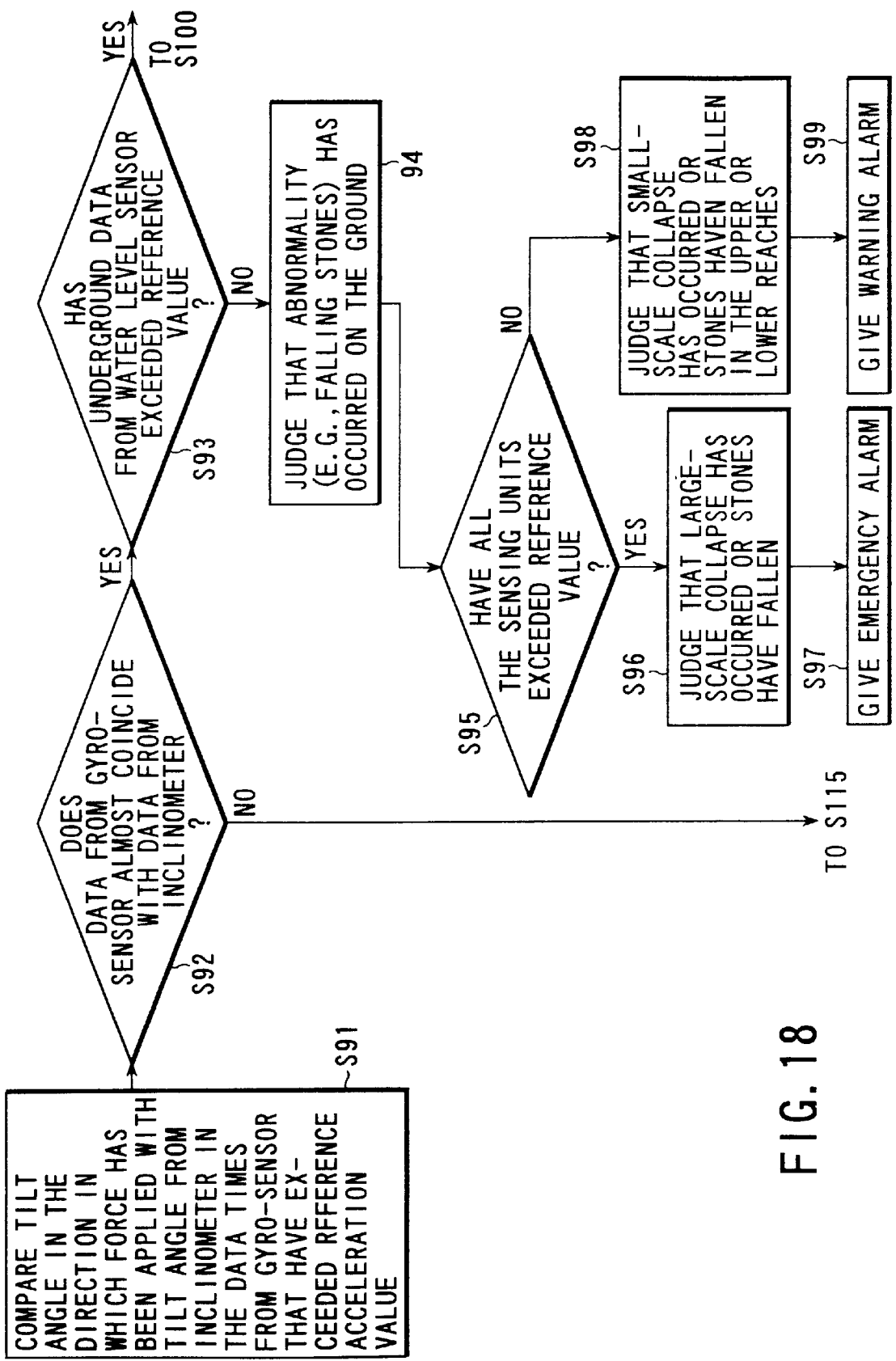
FIG. 18 is a flowchart to help explain a first judging process at the judging section of FIG. 14.

As shown in FIG. 18, at step S91, the direction in which the force has been exerted and the tilt angle are compared with the direction and tilt angle determined by the inclinometer 203 in the data items that have exceeded the reference acceleration value from the gyro-sensor 202. It is determined at step S92 whether or not the data from the gyro-sensor 202 almost coincides with the data from the inclinometer 203. If it is determined that the data from the gyro-sensor 202 coincides with that from the inclinometer 203, it is determined at step S93 whether or not the underground data from the water level sensor 208 has exceeded the reference value.

If it is not determined at step S93 that the underground data from the water level sensor 208 has exceeded the reference value, it is judged at step S94 that an abnormality (such as falling stones) has occurred on the ground and it is determined at step S95 whether or not all the sensing units 200 have exceeded the reference value.

If it is determined at step S95 that all the sensing units 200 have exceeded the reference value, it is judged at step S96 that a slide has taken place or stones have fallen on a large scale, and an emergency alarm is given at step S97. If it is not determined at step S95 that all the sensing units 200 have exceeded the reference value, it is judged that at step S98 that only a small number of sensing units 200 in the upper reaches or the lower reaches have exceeded the reference value and a slide has taken place or stones have fallen on a small scale, and a warning alarm is given at step S99.

Figure 19:
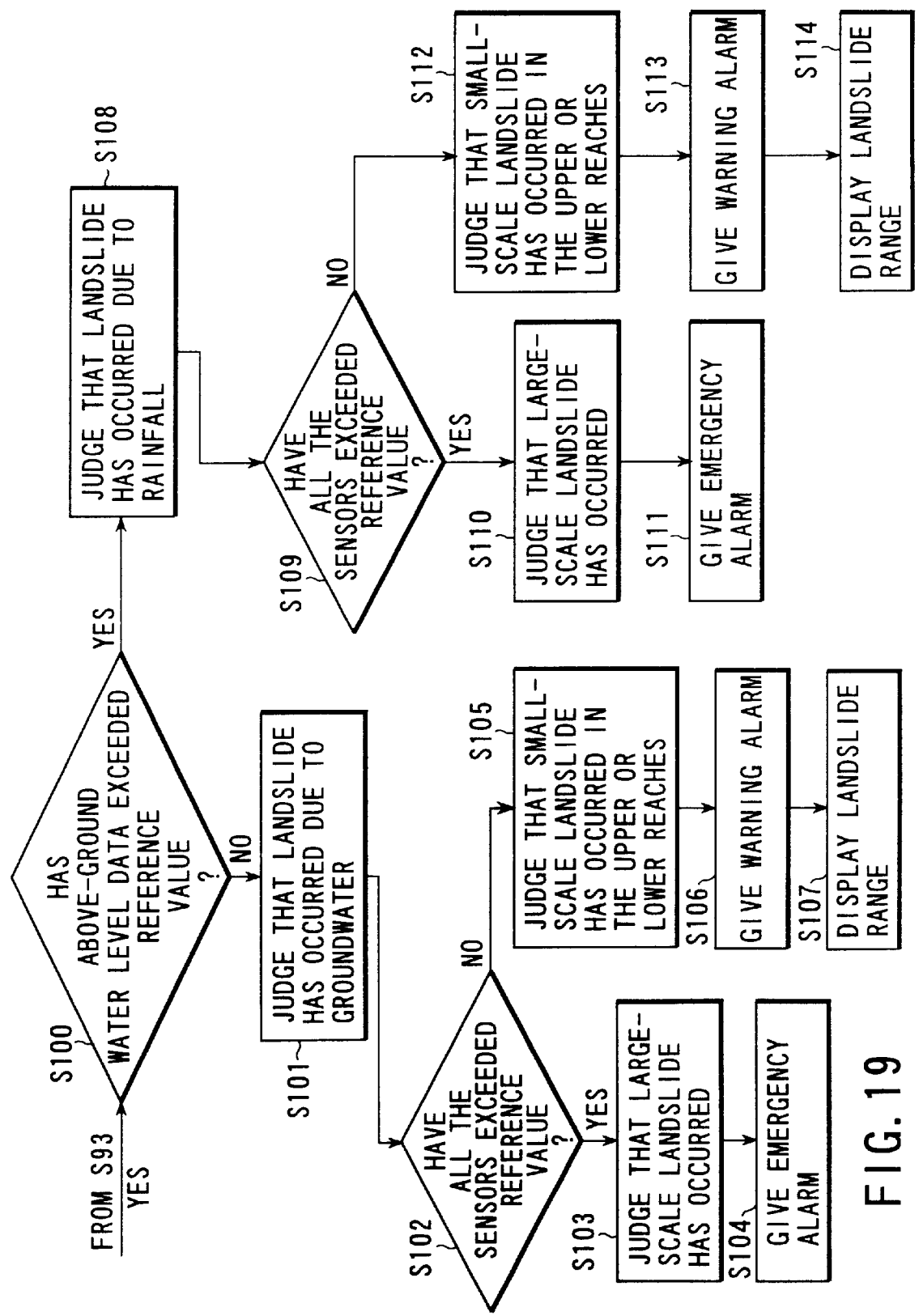
FIG. 19 is a flowchart to help explain a second judging process at the judging section.

If it is determined at step S93 that the underground data from the water level sensor 208 has exceeded the reference value, the judging section will pass control to a judging process as shown in FIG. 19. As shown in FIG. 19, it is determined at step 100 whether or not the above-ground water level data has exceed the reference value.

If it is not determined at step S100 that the above-ground water level data has exceeded the reference value, it is judged at step S101 that a landslide has taken place due to groundwater and it is determined at step S102 whether or not all the sensing units 200 have exceeded the reference value. If it is determined that all the sensing units 200 have exceeded the reference value, it is judged at step S103 that a landslide has taken place on a large scale, and an emergency alarm is given at step S104. If it is not determined in step S102 that all the sensing units 200 have exceeded the reference value, it is judged at step S105 that a landslide has taken place in upper or lower reaches on a small scale, and a warning alarm is given at step S106 and the range of the landslide is displayed at step S107.

If it is determined at step S100 that the above-ground water level has exceeded the reference value, it is judged at step S108 that a landslide has occurred due to rainfall and it is determined at step S109 whether or not all the sensing units 200 have exceeded the reference value. If it is determined at step S109 that all the sensing units 200 have exceeded the reference value, it is judged at step S110 that a landslide has occurred on a large scale, and an emergency alarm is given at step S111. If it is not determined at step S109 that all the sensing units 200 have exceeded the reference value, it is judged at step S112 that a landslide has taken place in upper or lower reaches on a small scale, and a warning alarm is given at step S113 and a range of landslide is displayed at step S114.

Figure 20:
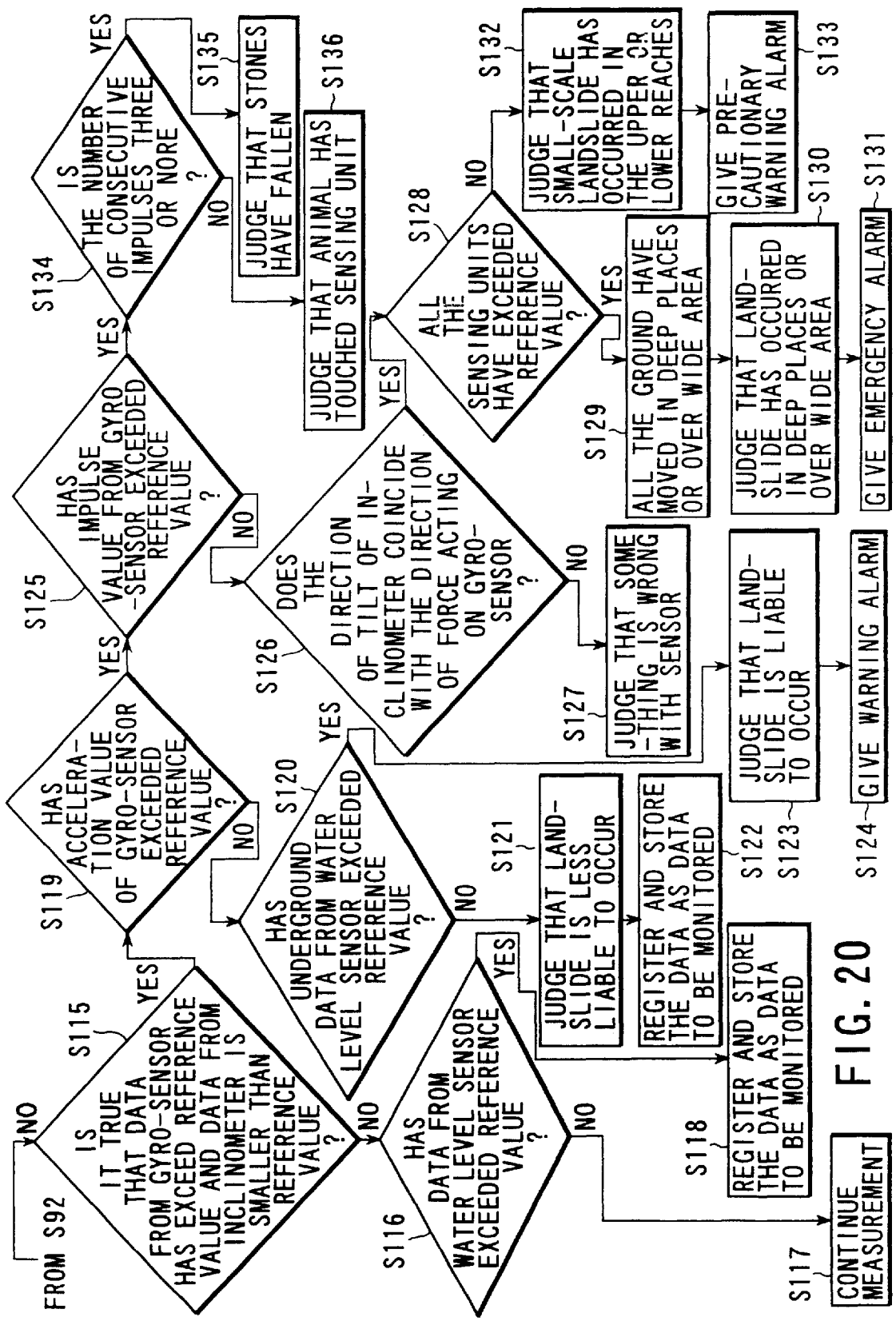
FIG. 20 is a flowchart to help explain a third judging process at the judging section.

Meanwhile, if it is not determined at step S92 of FIG. 18 that the data from the gyro-sensor 202 coincides with the data from the inclinometer 203, the judging section will pass control to a judging process as shown in FIG. 20.

In FIG. 20, it is determined at step S115 whether or not the data from the gyro-sensor 202 has exceeded the reference value and the data from the inclinometer 203 is smaller than the reference value. If the data is not smaller than the reference value, it is determined at step 116 whether or not the data from the water level sensor 208 has exceeded the reference value. If it has not exceeded the reference value, then the control is passed to step S117 at which the measurement is continued. If it has exceeded the reference value, it is entered and stored into the memory as the data to be monitored at step S118.

If it is determined at step S115 that the data from the gyro-sensor 202 has exceeded the reference value and the data from the inclinometer 203 is smaller than the reference value, it is determined at step S119 whether or not the acceleration value of the gyro-sensor 202 has exceeded the reference value. If it has not exceeded the reference value, it is determined at step S120 that the underground data from the water level sensor 208 has exceeded the reference value. If it has not exceeded the reference value, it is judged at step S121 that a landslide is less liable to take place, and the data to be monitored is entered and stored into the memory at step S122. If it is determined at step S120 that the underground data from the water level sensor 208 has exceeded the reference value, it is judged at step S123 that a landslide is liable to take place, and a warning alarm is given at step S124.

If it is determined at step S119 that the acceleration value from the gyro-sensor 202 has exceeded the reference value, it is determined at step S125 whether or not the impulse value from the gyro-sensor 202 has exceeded the reference value. If it has not exceeded the reference value, it is determined at step S126 whether or not the direction of inclination of the inclinometer 203 coincides with the direction of force of the gyro-sensor 202. If they do not coincide, it is judged at step S127 that something is wrong with the sensor.

If it is determined at S126 that the direction of inclination of the inclinometer 203 coincides with the direction of force of the gyro-sensor 202, it is determined at step S128 whether or not all the sensing units 200 have exceeded the reference value.

If it is determined at step S128 that all the sensing units 200 have exceeded the reference value, it is confirmed at step S129 that all of the ground has moved in the deep places or over a wide area, and it is judged at step S130 that a landslide has occurred in the deep places or over a wide area and a warning alarm is given at step S131.

If it is not determined at step S128 that all the sensing units 200 have exceeded the reference value, it is judged at step S132 that a landslide has taken place in upper or lower reaches on a small scale and a precautionary warning alarm is given at step S133.

Furthermore, if it is determined at step S125 that the impulse value from the gyro-sensor 202 has exceeded the reference value, it is determined at step S134 whether or not the number of consecutive impulses is three or more. If it is determined that the number of consecutive impulses is three or more, it is judged at step S135 that stones have fallen. If it is not determined that the number of consecutive impulses is three or more, it is judged at step S136 that an animal or the like has touched the sensing unit 200.

As described above, in the second embodiment, a sensing unit 200 includes the gyro-sensor 202 for sensing the displacement, acceleration, and impulse force, the two-axis inclinometer 203 for sensing the tilt angles of two axes crossing at right angles and the direction of tilt, the water level sensor 208 for sensing the underground water level and the above-ground water level, the computing section 206 for calculating the angle value of the gyro-sensor 202 on the basis of the acceleration value corrected according to the angle value of the inclinometer 203, the data from the inclinometer 203, and the water level data, and the battery 205 using the solar battery 210 as a driving power supply. Sensing units of this type are buried in holes bored in the ground in an area to be monitored. Each of the data items sensed by the sensing units 200 is transmitted to the base station. In the base station, the data processing section 213 processes the received data in real time. For the data items that have exceeded the reference acceleration value for each measuring point, the processing section 213 determines a tilt angle from the direction in which the force has been exerted and the acceleration value. It also determines the data items that have exceeded the reference tilt angle, the data that has exceeded the reference water level, and the above-ground water level. On the basis of the data items processed at the data processing section 213, the judging section 214 performs various judging processes. This enables the state of the ground to be monitored by giving a suitable alarm or displaying a suitable message according to the cause and size of a landslide.

Consequently, by simply boring a large number of holes over a wide area in a mountainous region and burying sensing units 200 in the holes, the displacement of the ground can be sensed exactly, regardless of the places of installed sensing units 200, and the occurrence of disaster, such as a mudslide in the ground, can be predicted.

[Third Embodiment]

An example of the configuration of a sensing unit 200 used in a ground monitoring apparatus according to a third embodiment of the present invention will be explained.

Figure 21A:
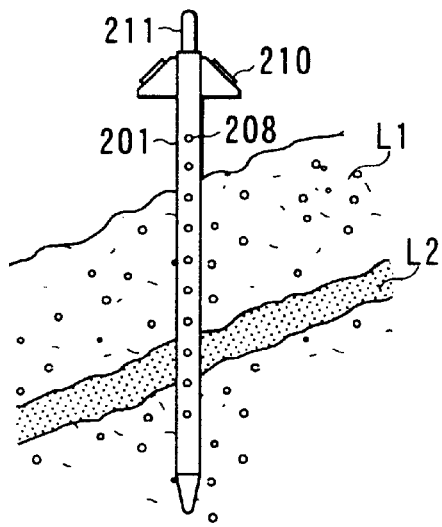
FIGS. 21A to 21C show states where a sensing unit used in a ground monitoring apparatus according to a third embodiment of the present invention is buried in the ground.
Figure 21B:
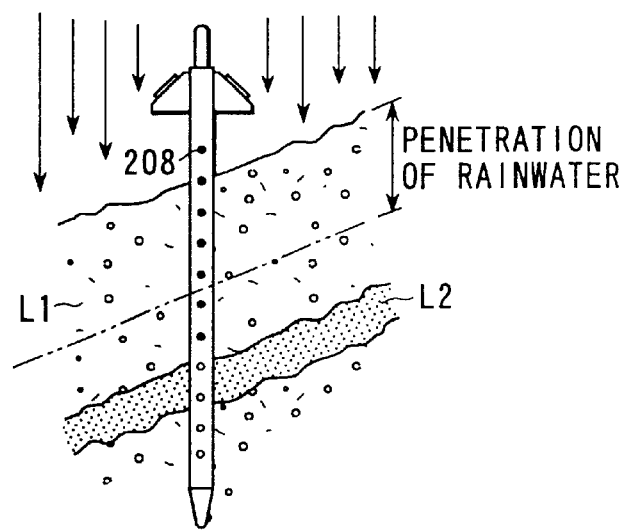
Figure 21C:
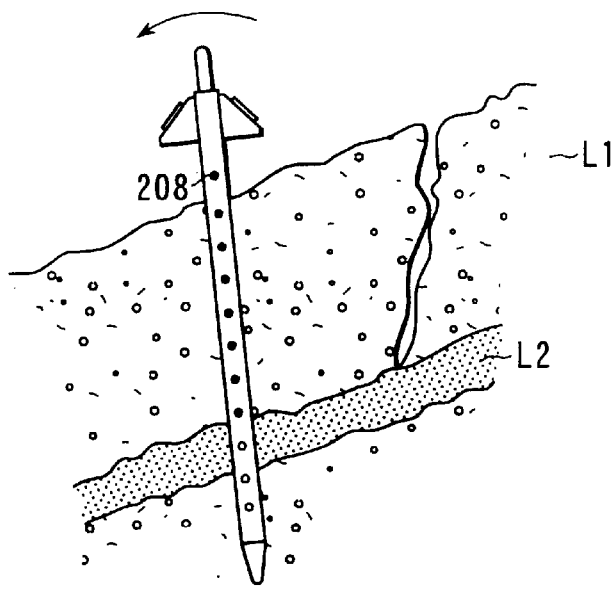

FIGS. 21A to 21C each show a state where a sensing unit 200 with only a water level sensor 208 is buried in the ground. As shown in FIGS. 21A to 21C, a plurality of water level sensors 208 are provided in the direction of axis at suitable intervals on the outer surface of a cylindrical member 201 and fixed there. In the cylindrical member 201, there are provided a computing section for taking in the measurement signal from each water level sensor 208 and making calculations, a transmitting section, and a battery using a solar battery as a power supply, though they are not shown.

Figure 22:
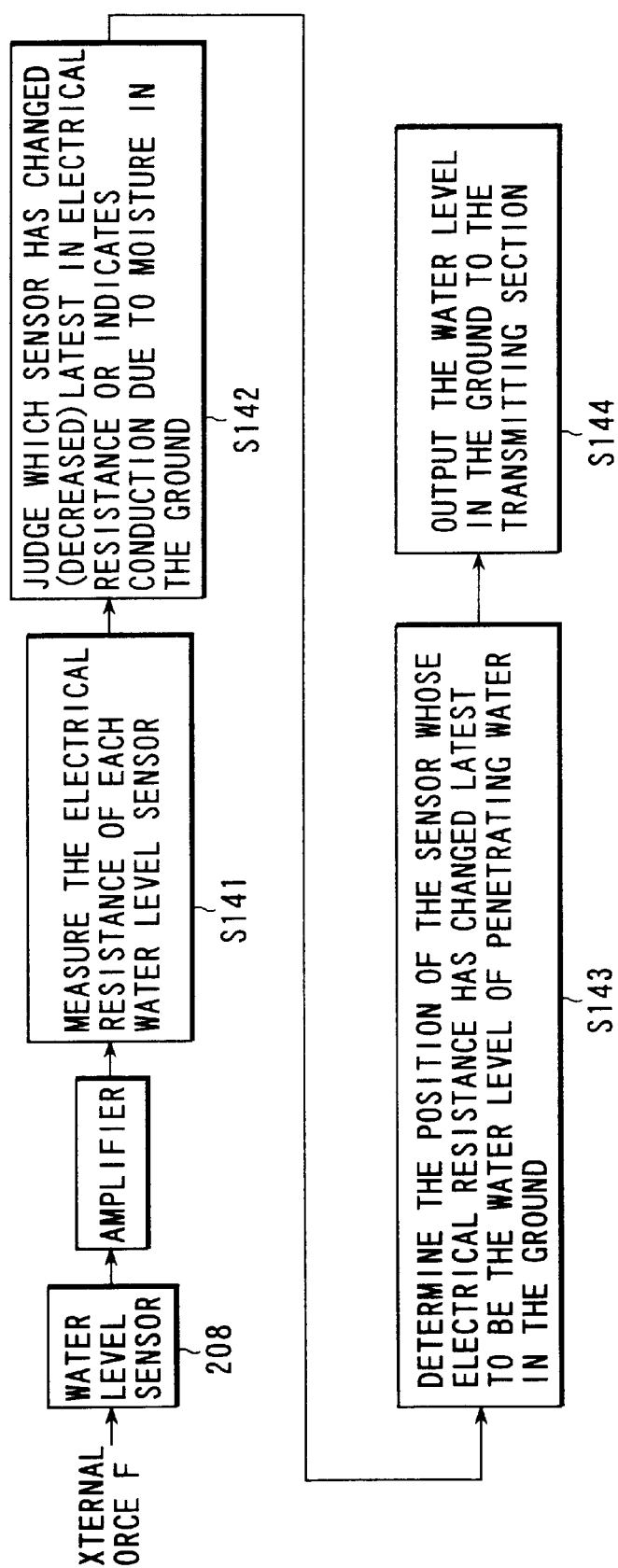
FIG. 22 is a block diagram to help explain the function of processing the signal from the water level sensor in the sensing unit of the third embodiment.

The function of the computing section will be explained by reference to FIG. 22. The sense signal from each water level sensor 208 is amplified by an amplifier to a signal level suitable for a computing process. At a section S141, the electrical resistance of each sensor from the value is measured. Next, at a section S142, it is judged which sensor has changed (decreased) latest in their electrical resistance or indicates conduction due to moisture in the ground. At a section S143, the position of the sensor whose electrical resistance has changed latest is determined to be the water level of the penetrating water in the ground. Next, at a section 144, the water level is outputted as output data to the transmitting section.

FIG. 21A shows a state where rainwater has penetrated neither a soil layer L1 nor a clay layer L2, with a sensing unit 200 buried in a slope. FIG. 21B shows a state where rainwater has penetrated to a middle portion of the clay layer L2 as a result of a rainfall. FIG. 21C shows a state where rainwater has reached all of the soil layer L1 and has penetrated to the surface of the clay layer L2.

In FIG. 21A, the electrical resistance of each water level sensor 208 is larger. In FIG. 21B, the electrical resistance of each of the water level sensors 208 from above the ground to the middle portion of the clay layer L2 is smaller or indicates conduction (represented by a black dot). In FIG. 21C, the electrical resistance of each of the water level sensors 208 from above the ground to the clay layer L2 is smaller (represented by a black dot). The signals from the sensors are inputted to the computing section, which then makes calculations as described above. The transmitting section transmits the resulting data to the base station side.

The data processing section on the base station side carries out the data processes at S69 to S71 in FIG. 15. The judging section performs a judging process as shown in FIG. 23.

Figure 23:
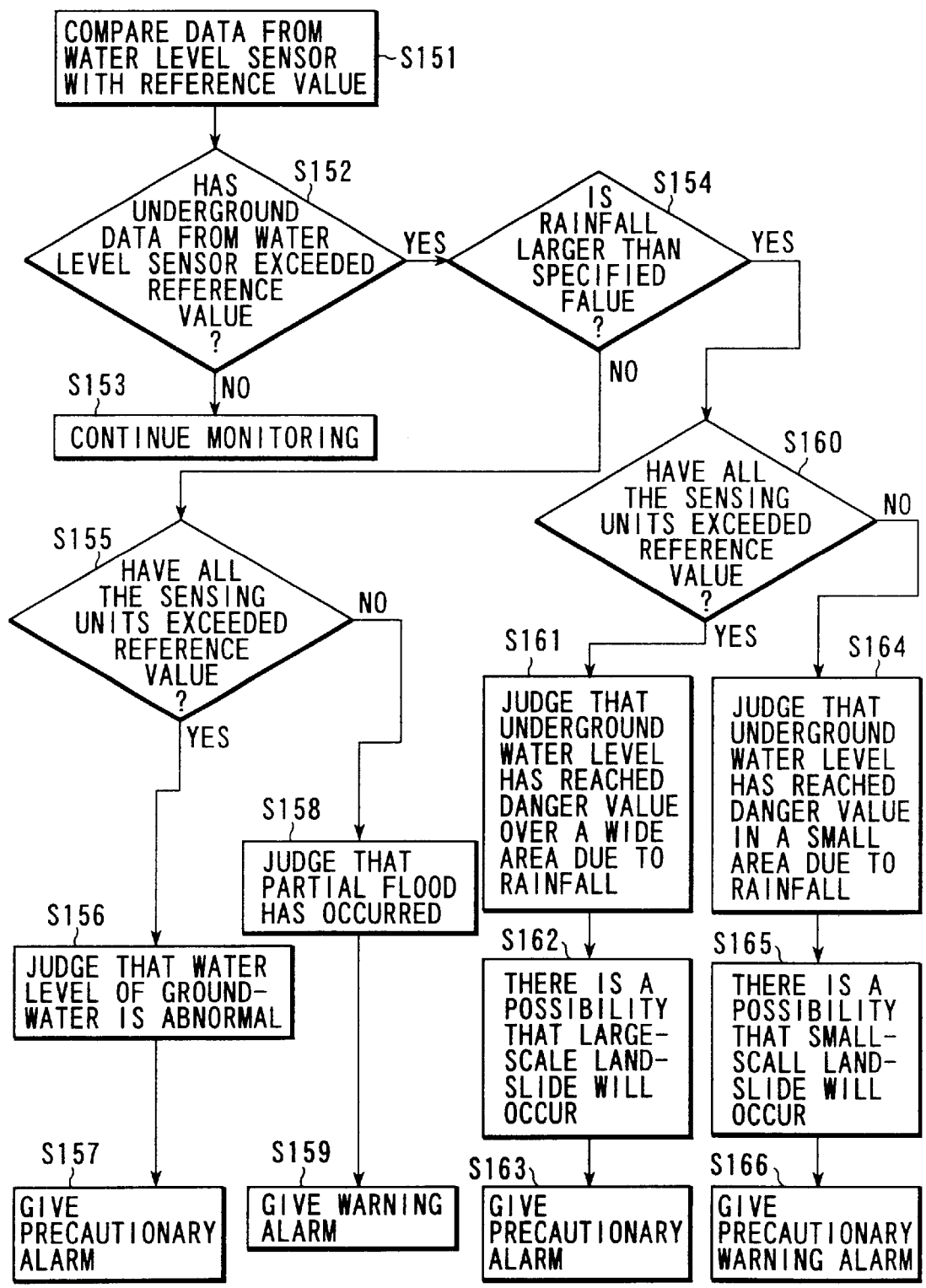
FIG. 23 is a flowchart to help explain a judging process at the judging section on the base station side in the third embodiment.

In FIG. 23, data from the water level sensor is compared with the reference value at step S151, and it is determined at step S152 whether or not the underground data from the water level sensor has exceeded the reference value. If it is not determined that the underground data has exceeded the reference value, then the control is passed to step S153 at which the monitoring is continued. If it is determined that the underground data has exceeded the reference value, it is determined at step S154 whether or not the rainfall is larger than a specified value.

If it is not determined at step S154 that the rainfall is larger than the specified value, it is determined at step S155 whether or not all the sensing units 200 have exceeded the reference value. If all the sensing units 200 have exceeded the specified value, it is judged at step S156 that the level of groundwater is abnormal, and a precautionary warning alarm is given at step S157. If it is determined at step S155 that all the sensing units 200 have exceeded the reference value, it is judged at step S158 that a partial flood has occurred, and a warning alarm is given at step S159.

If it is determined at step S154 that the rainfall has exceeded the specified value, it is determined at step S160 whether or not all the sensing units 200 have exceeded the reference value. If it is determined that all the sensing units 200 have exceeded the specified value, it is judged at step S161 that as a result of rainfall, it is confirmed at step S162 that the underground water level has reached a dangerous value over a wide area and an emergency alarm is given because of the possibility that a large-scale landslide will occur at step S163. If it is not determined at step S160 that all the sensing units 200 have exceeded the specified value, it is judged at step S164 that as a result of rainfall, it is confirmed in step S165 that the underground water level has reached the dangerous value in a small area, and a precautionary warning is given because of the possibility that a small-scale landslide will occur at step S166.

As described above, a plurality of sensing units 200 composed of only the water level sensors 208 are buried in the ground at suitable intervals. The degree of penetration of rainwater in the ground is determined by measuring the underground water level. The determined penetration is subjected to the data processing and judging process on the base station side. This makes it possible to predict the occurrence of a collapse and its size.

With the sensing unit 200 constructed as described above, a water level sensor 208 may be provided on the cylindrical portion exposed above the ground to measure the amount of rainwater (or water level) at the surface of the ground. The measurement data may then be transmitted to the base station, which may make judgment whether or not the ground is in a dangerous state because of a localized heavy rain. In this case, an umbrella section is provided to the upper part of the cylindrical portion to prevent the water level sensor 208 on the cylindrical portion exposed above the ground surface from getting wet directly with rain.

In the data processing section on the base station side, after the processes as described above have been carried out, the judging processes at step S100 to step S114 of FIG. 19 are executed.

As described above, even when sensing units 200 are composed of only water level sensors, the state of the ground can be predicted.

[Fourth Embodiment]

An example of the configuration of a sensing unit 200 used in a ground monitoring apparatus according to a fourth embodiment of the present invention will be explained.

Figure 24:
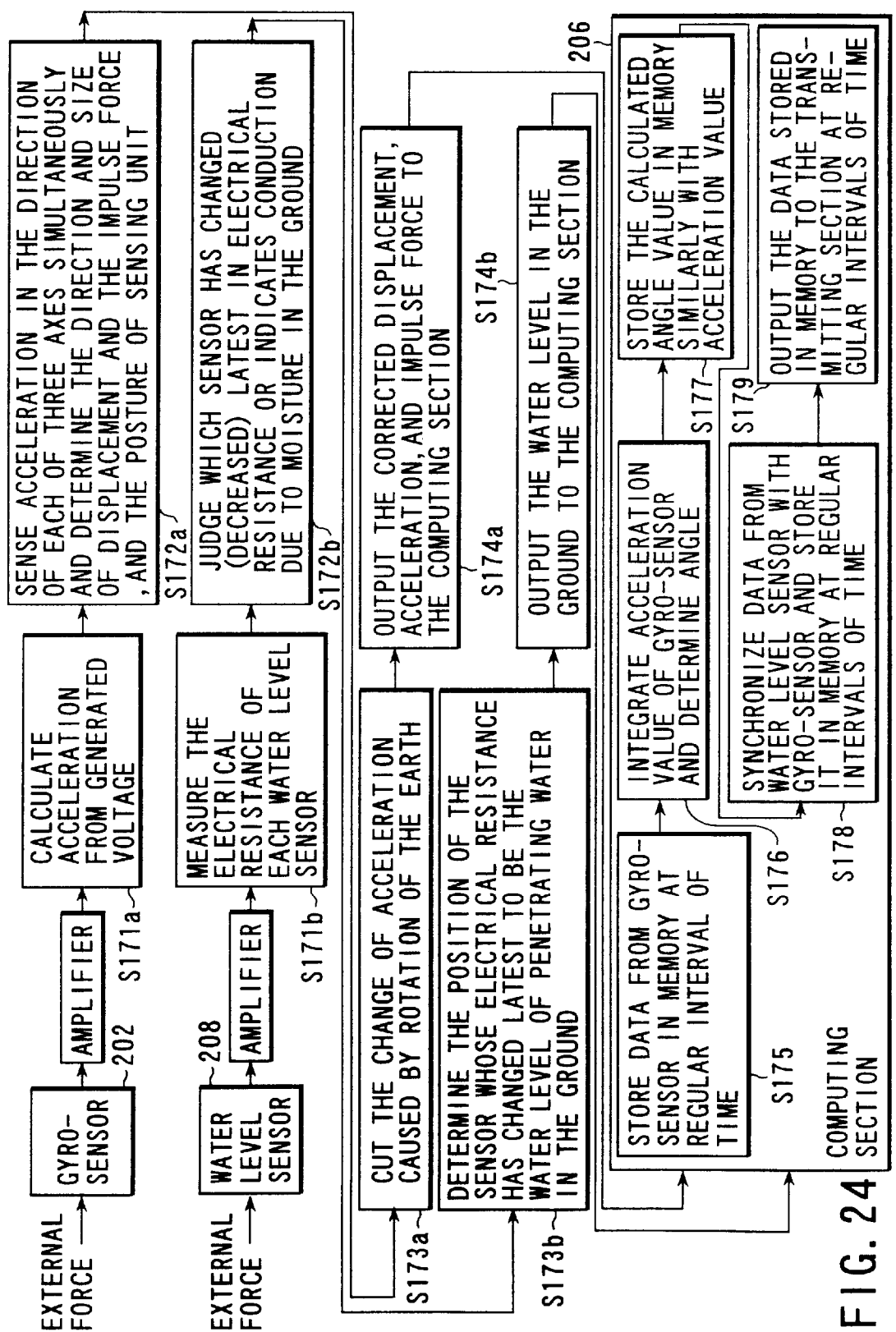
FIG. 24 is a block diagram to help explain the signal processing function of a sensing unit used in a ground monitoring apparatus according to a fourth embodiment of the present invention.

FIG. 24 shows the function of a sensing unit 200 including a gyro-sensor and a water level sensor. In FIG. 24, each piezoelectric element of the gyro-sensor 202 generates a voltage according to an acceleration of α. When the gyro-sensor 202 inputs the voltages, an amplifier amplifies the voltage signals to signal levels suitable to a computing process. At a section S171a, an acceleration is calculated from the voltage signals. Next, at a section S172a, the acceleration in the direction of each axis simultaneously is sensed and the direction and magnitude of the displacement, the impulse force, and the posture of the sensing unit 200 are judged from these values. At a section S173a, the acceleration caused by the rotation of the earth is cut. Next, at a section S174a, the displacement, acceleration, and impulse force are corrected and the resulting data items are outputted as output data Fa to the computing section 206.

Furthermore, an amplifier amplifies the sense signal from the water level sensor 208 to a signal level suitable for a computing process. At a section S171b, the electrical resistance of each sensor is measured from the value. At a section S172b, it is judged which sensor has changed (decreased) latest in their electrical resistance or indicates conduction due to moisture in the ground. At a section 173b, it is determined that the position of the sensor whose electrical resistance has changed latest to be the water level of the penetrating water in the ground. At a section 174b, the water level is outputted as output data Fc to the computing section 206.

The output data items Fa and Fc of the gyro-sensor 202 and water level sensor 208 are inputted to the computing section 206. At a section S175, the data item from the gyro-sensor 202 is stored in a memory for a specific period of time. At a section S176, the acceleration value of the gyro-sensor is integrated from the data item to determine the angle. At a section S177, the angle value is stored in the memory.

At a section S178, the data from the water level sensor is synchronized with the gyro-sensor and stored in the memory at regular intervals of time. At a section S179, the data items stored in the memory is transmitted to the transmitting section at regular intervals of time.

When data on the displacement, acceleration, and impulse force concerning the gyro-sensor 202 and data on the water level in the ground concerning the water level sensor 208 are transmitted to the base station, the data processing section in the base station processes the sense data for each measuring point in real time, determines the data items that have exceeded the reference acceleration value and the data items that have exceeded the reference water level or the data items that have exceeded the reference water level and the above-ground water level data. The judging section carries out various judgments on the basis of the data items processed at the data processing means. Then, according to the cause and size of a landslide, a suitable alarm is given or a suitable message is displayed, which enables the state of the ground to be monitored effectively.

As described above, even when sensing units 200 are each composed of the gyro-sensor 202 and water level sensors 208, the occurrence of a landslide and its size can be predicted, regardless of the places of installed sensing units 200.

[Fifth Embodiment]

An example of the configuration of a sensing unit 200 used in a ground monitoring apparatus according to a fifth embodiment of the present invention will be explained.

Figure 25:
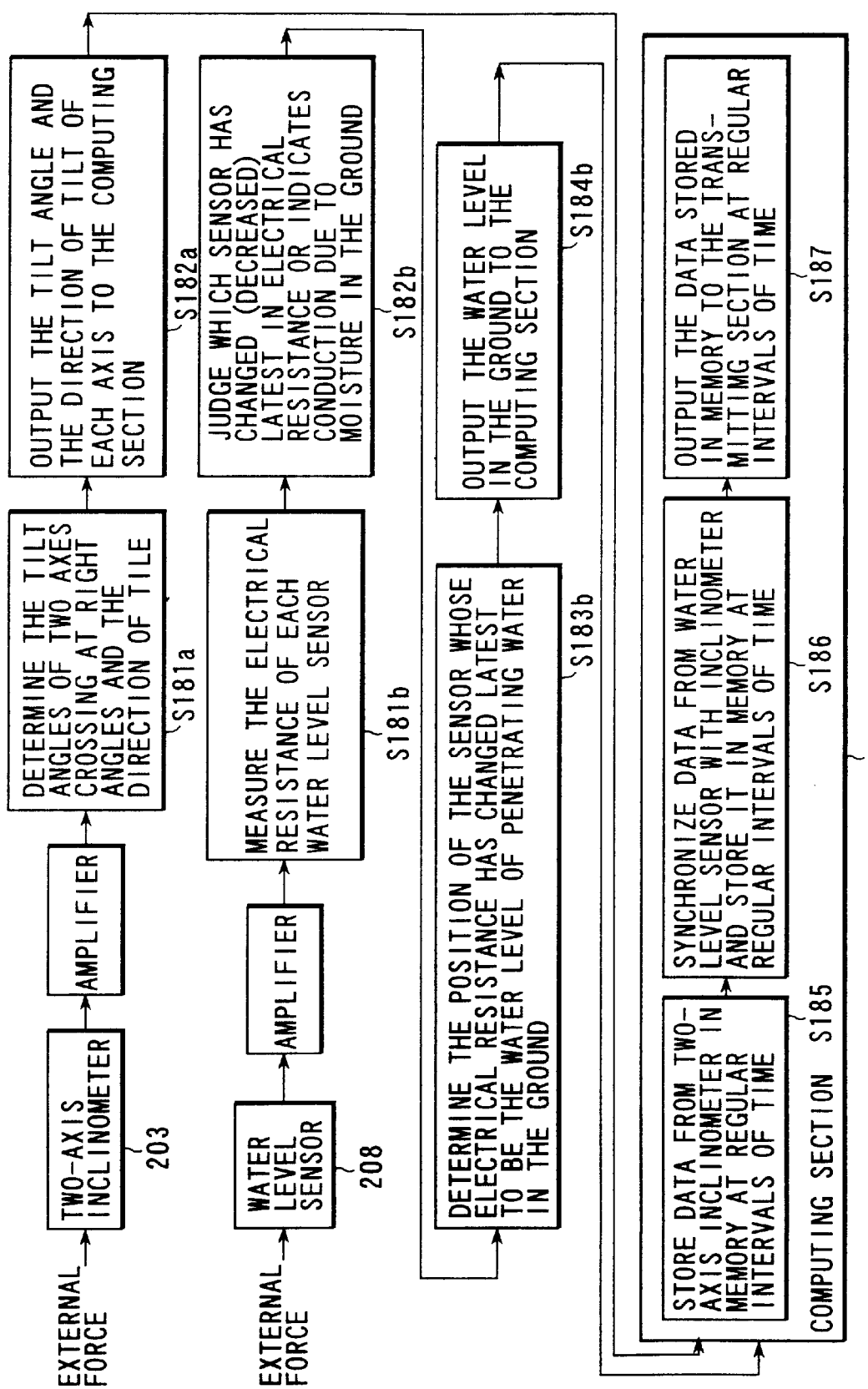
FIG. 25 is a block diagram to help explain the signal processing function of a sensing unit used in a ground monitoring apparatus according to a fifth embodiment of the present invention.

FIG. 25 shows the function of a sensing unit 200 including a two-axis inclinometer and a water level sensor. In FIG. 25, an amplifier amplifies the measurement signal from the two-axis inclinometer 203 to a signal level suitable for a computing process. At a section S181a, the tilt angles of the two axes crossing at right angles and the direction of tilt are determined from the measurement signal. Next, at a section S182a, the tilt angle of each axis and the direction of inclination of each axis are outputted as output data Fb to the computing section 206.

Furthermore, an amplifier amplifies the sense signal from the water level sensor 208 to a signal level suitable for a computing process. At a section S181b, the electrical resistance of each sensor is sensed from the value. Next, at a section S182b, it is judged which sensor has changed (decreased) latest in their electrical resistance or indicates conduction due to moisture in the ground. At a section S183b, the position of the sensor whose electrical resistance has changed latest is determined to be the water level of the penetrating water in the ground. Next, at a section S184b, the water level is outputted as output data Fc to the computing section 206.

The output data items Fb and Fc of the inclinometer 203 and water level sensor 208 are inputted to the computing section 206. At a section S185, the data item from the inclinometer is stored in a memory for a specific period of time. At a section S186, the data from the water level sensor 208 is synchronized with the data from the inclinometer and stored in the memory at regular intervals of time. At a section S187, the data items stored in the memory is transmitted to the transmitting section at regular intervals of time.

When the underground water level data from the water level sensor 208 is transmitted to the base station, the data processing section in the base station processes the sense data for each measuring point in real time, determines the data items that have exceeded the reference acceleration value and the data items that have exceeded the reference water level or the data items that have exceeded the reference water level and the above-ground water level data. The judging section carries out various judgments on the basis of the data items processed at the data processing means. Then, according to the cause and size of a landslide, a suitable alarm is given or a suitable message is displayed, which enables the state of the ground to be monitored effectively.

As described above, even when sensing units 200 are each composed of the gyro-sensor 202 and water level sensors 208, the occurrence of a landslide and its size can be predicted, regardless of the places of installed sensing units 200.

In each of the above embodiments, the data judging process at the judging section on the base station side may be practiced in still other ways according to a combination of the gyro-sensor 202, two-axis inclinometer 203, and water level sensor 208.

As described above, with the second to fifth embodiments of the present invention, it is possible to provide a monitoring apparatus which is capable of sensing the displacement of the ground exactly, regardless of the places of installed sensing units 200, and of predicting the occurrence of disaster, such as a mudslide in the ground.

[Sixth Embodiment]

Figure 26:
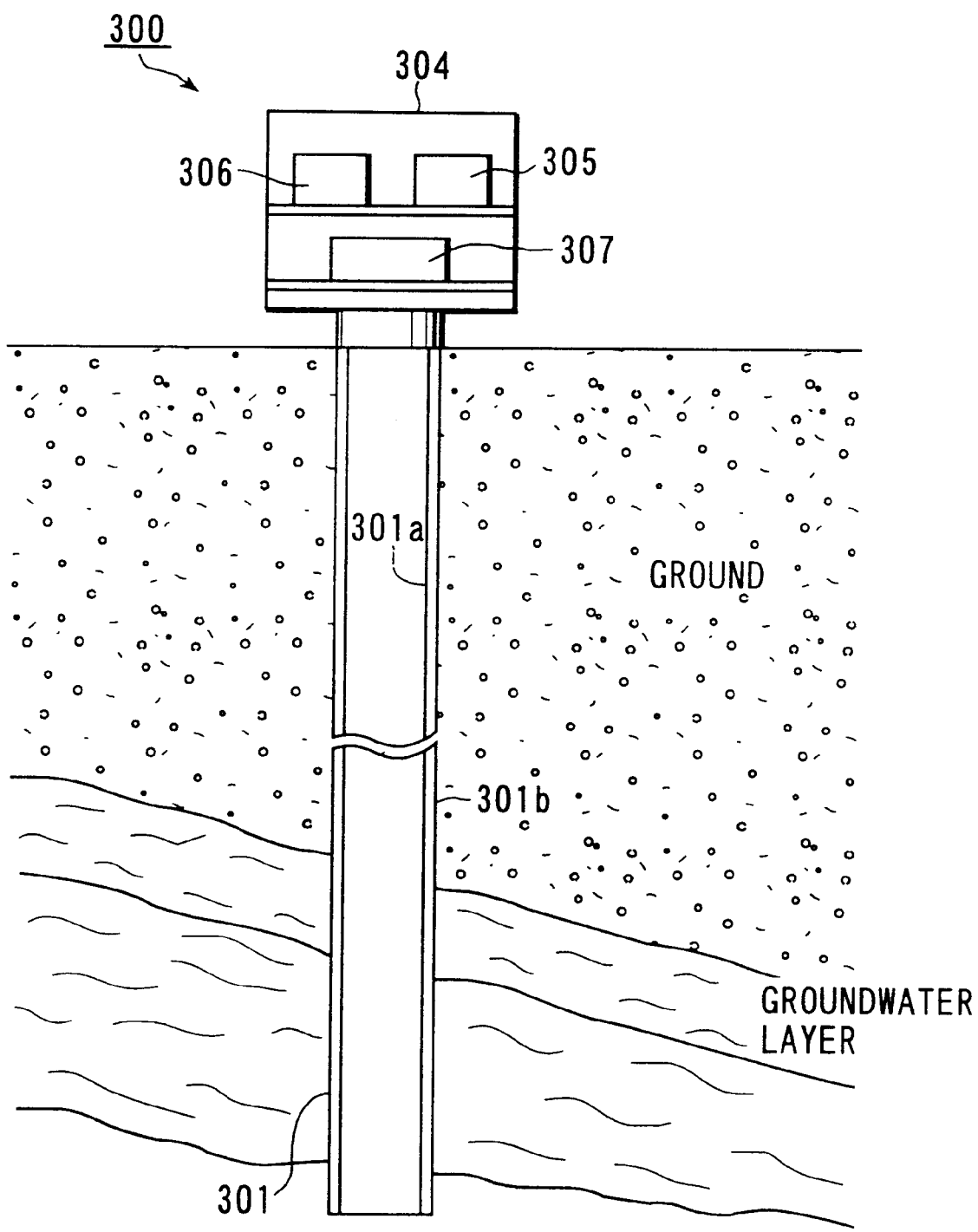
FIG. 26 shows an overall configuration of an underground water level sensing unit according to a sixth embodiment of the present invention.

FIG. 26 shows an overall configuration of an underground water level sensing unit according to a sixth embodiment of the present invention.

In FIG. 26, numeral 300 is a sensing unit. The sensing unit 300 has a cylindrical member 301 that is to be buried in the ground. The cylindrical member 301 has a double structure composed of an inner cylinder 301a and an outer cylinder 301b, which can be adjusted so as to have a suitable length according to how deep the member is buried.

Figure 27:
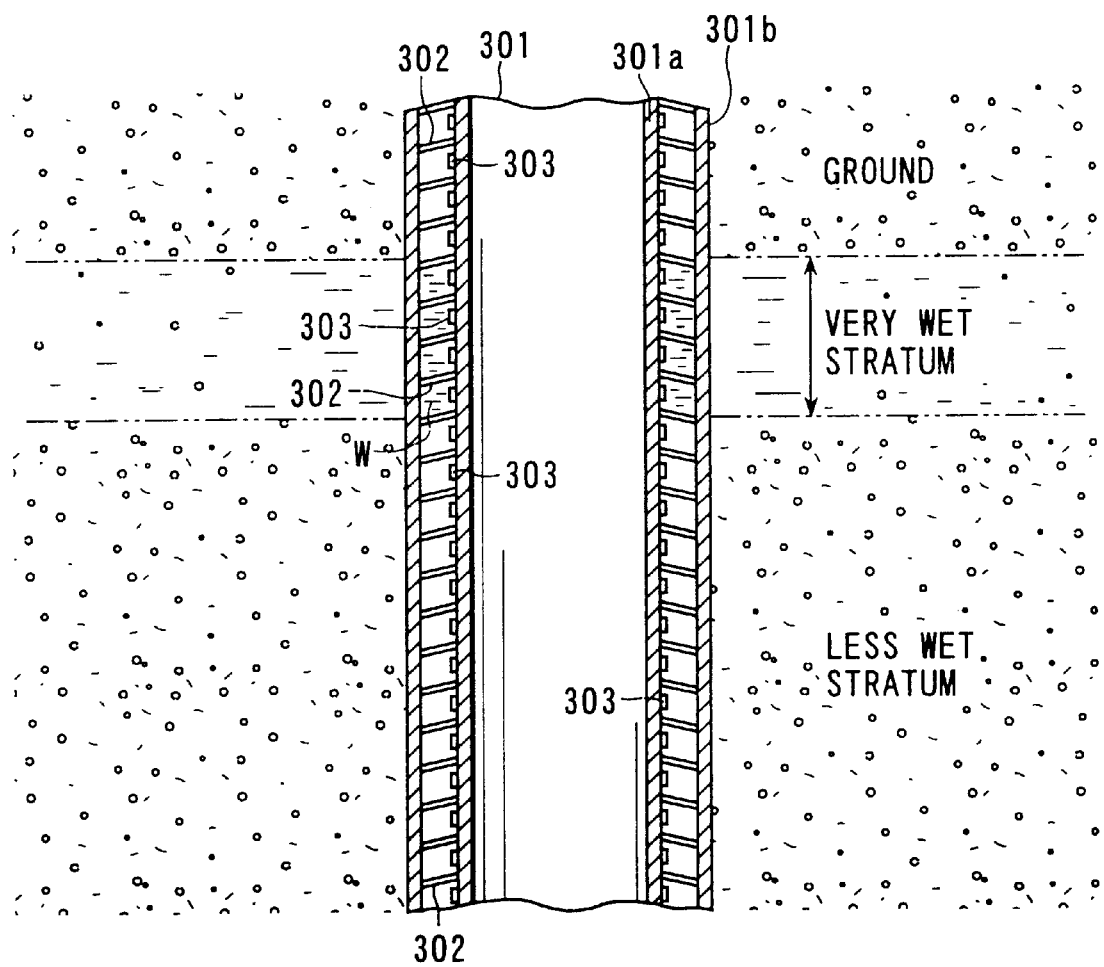
FIG. 27 is a detailed sectional view of a cylindrical member in the sixth embodiment.

As shown in FIG. 27, the inner cylinder 301a of the cylindrical member 301 is made of, e.g., iron and the outer cylinder 301b is made of, e.g., porous material, such as punching metal. Between the inner cylinder 301a and the outer cylinder 301b, a plurality of ringed partition plates 302 are provided in the direction of axis at suitable intervals (for example, at intervals of 2 cm) to form small compartments. In this case, each partition plate 302 is higher on the inner cylinder side and lower on the outer cylinder side.

A vent may be made in each compartment at a suitable position to allow penetrating water W to go in and out smoothly.

A plurality of water level sensors 303 for sensing penetrating water W in the compartments are provided on the outer surface of the inner cylinder 301 in such a manner that the water level sensors 303 correspond to the compartments, respectively. The output terminals of the water level sensors 303 are connected to leads (not shown) laid in the hollow portion of the inner cylinder 301a. The water level sensors 303 are such that, for example, their electrical resistance changes or indicate conduction when penetrating water accumulates in the compartment.

Figure 28A:
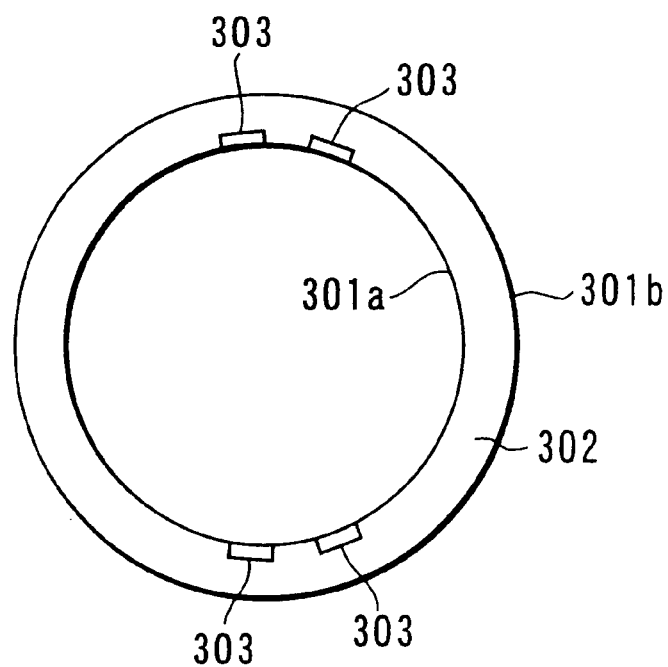
FIGS. 28A to 28C show examples of connection of water level sensors provided in small compartments formed in the cylindrical member in the sixth embodiment.
Figures 28B, 28C:
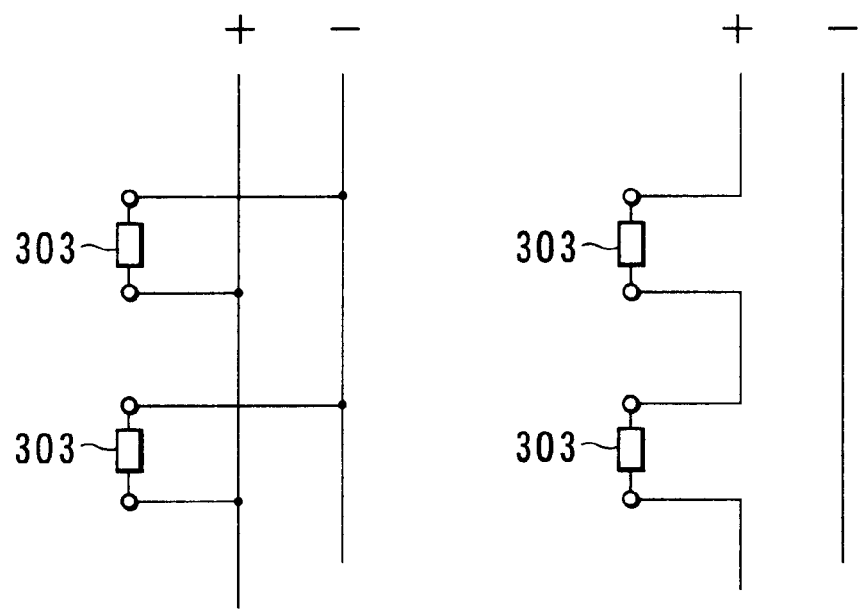

As water level sensors 303 provided for a single compartment, if a pair of sensors is provided in a first position and another pair of sensors is provided in an opposite side of the pair of sensors, that is, in a position 180 degrees away from the first position as shown in FIG. 28A, two cases can be considered: one case where the output terminals of the pairs of water level sensors 303 are connected in parallel as shown in FIG. 28B, and the other where they are connected in series as shown in FIG. 28C.

In FIG. 26, numeral 304 indicates a case provided at the end of the cylindrical member 301 above the ground. In the upper part of the case 304, a power supply 305 and a communication unit 306 are provided. In its lower part, a computing unit 307 is provided.

The power supply 305 supplies electrical energy to each water level sensor 303, the computing unit 307, and the communication unit 306. The computing unit 307 has the function of judging the number of each of water level sensor 303 and the on/off state of each sensor and a computing function of determining the distance from the surface of the earth and the area (width) from the number of the water level sensor 303 judged to be on by the judging function.

The communication unit 306 is used to transmit information on the sensed water level determined by the computing unit 307, together with its own number, to a base station (not shown).

The operation of the underground water level sensing unit constructed as described above will be explained.

It is assumed that the cylindrical member 301 is buried in the ground as shown in FIG. 27 and penetrating water flows through the porous outer cylinder 301b into the compartments in the portion corresponding to a very wet stratum.

Figure 29:
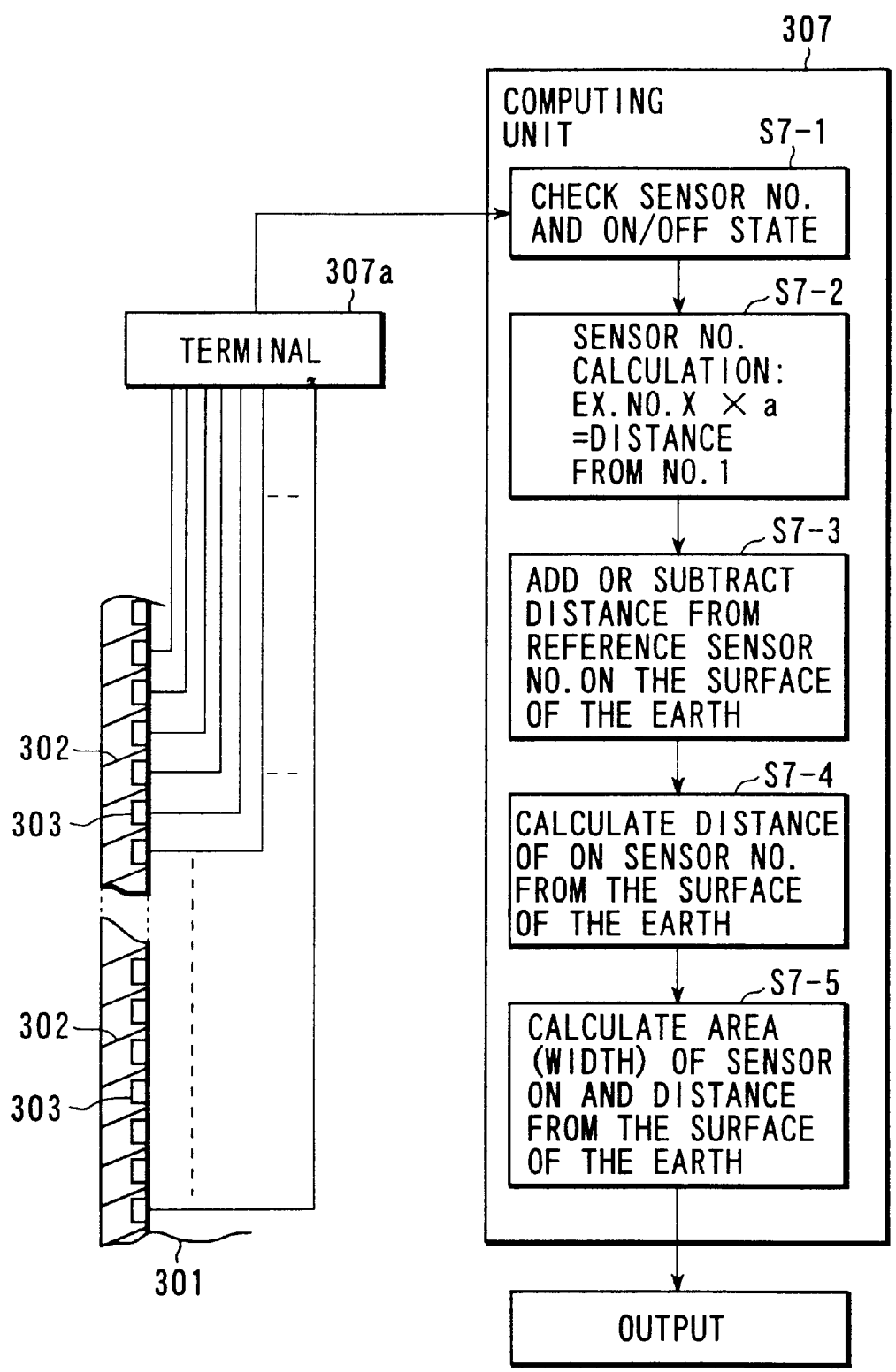
FIG. 29 is a flowchart to help explain a computing process on the basis of the sense signals from the individual water level sensors in the sixth embodiment.

In this state, the water level sense signal sensed by each water level sensor 303 is taken in by the computing unit 307 via a terminal 307a as shown in FIG. 29. The computing unit 307 checks the sensor number and the on/off state of the sensor at step S7-1. The water level sensors 303 in the positions corresponding to the very wet stratum of FIG. 27 are on, whereas the water level sensors 303 in the other part of the ground or in the positions corresponding to the less wet stratum are off.

In this case, with the water level sensors 303 on the same axis connected in parallel as shown in FIG. 28B, if only one sensor at a single point is on and sensors at three to four points above and below the sensor are off, it is judged that sensing has been done erroneously. Conversely, if a sensor is off at only one point and sensors at three to four points above and below the sensor are on, it is judged that the sensing is continues.

Furthermore, when sensors on the same axis are connected in series for every plural points as shown in FIG. 28C, if at least one sensor at a single point is off, it is judged that sensing has been done erroneously. If the sensors at all the points are on, it is judged that the sensing is continues.

The number of the water level sensor judged to be on at step S7-1 is transferred to step S7-2, where the distance from sensor number 1 is determined from the sensor number in the on state and the distance between sensors.

At step S7-3, the distance from the reference sensor number on the surface of the earth is added to or subtracted from the distance from sensor number 1 determined at step S7-2. Then, at step S7-4, the distance of the off sensor from the surface of the earth is calculated.

After similar calculations are made for the other sensors, the sensor on area (width) and the distance from the surface of the earth are determined at step S7-5.

Consequently, causing the computing unit 307 to make such calculations enables the position of a very wet stratum and its size (or range) in the ground to be measured.

Another example of measurement will be explained briefly by reference to FIGS. 30 and 31.

Figure 30:
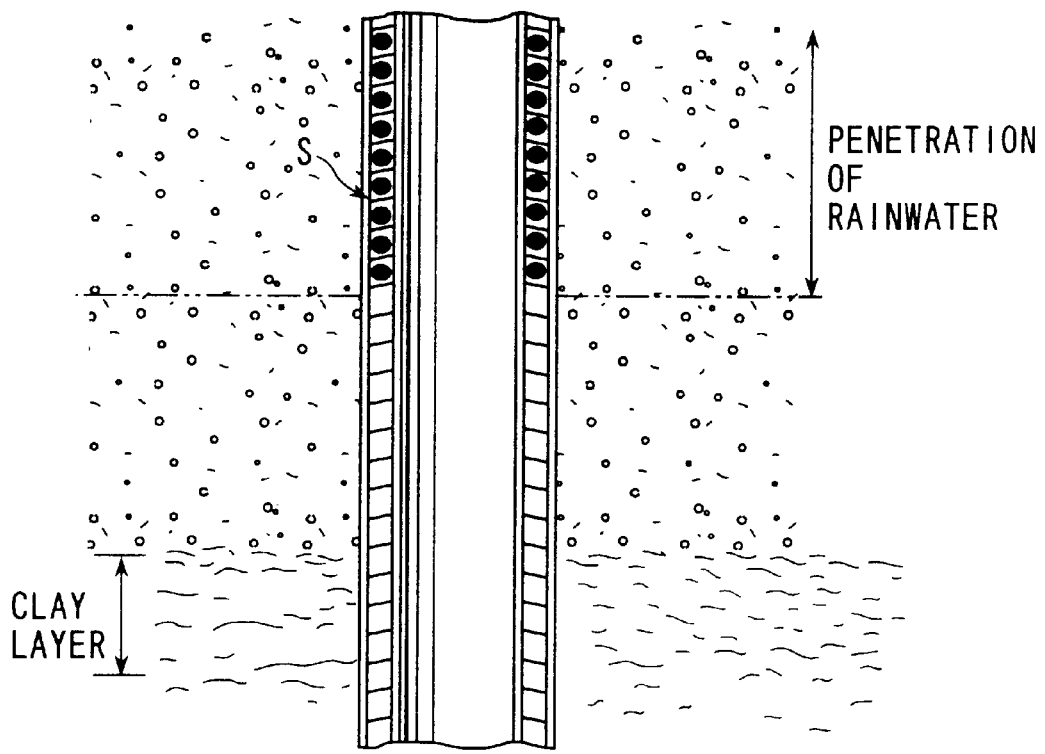
FIG. 30 is a diagram to help explain the operation of the sensing unit when rainwater has permeated from the surface of the earth in the sixth embodiment.

FIG. 30 shows a state where rainwater has penetrated from the surface of the earth. The water level sensors in the positions indicated by dark marks measure a penetrating water level. The computing unit 307 makes calculations as described above to determine the penetrating state of rainwater and the distance to a clay layer (or a slide face).

Figure 31:
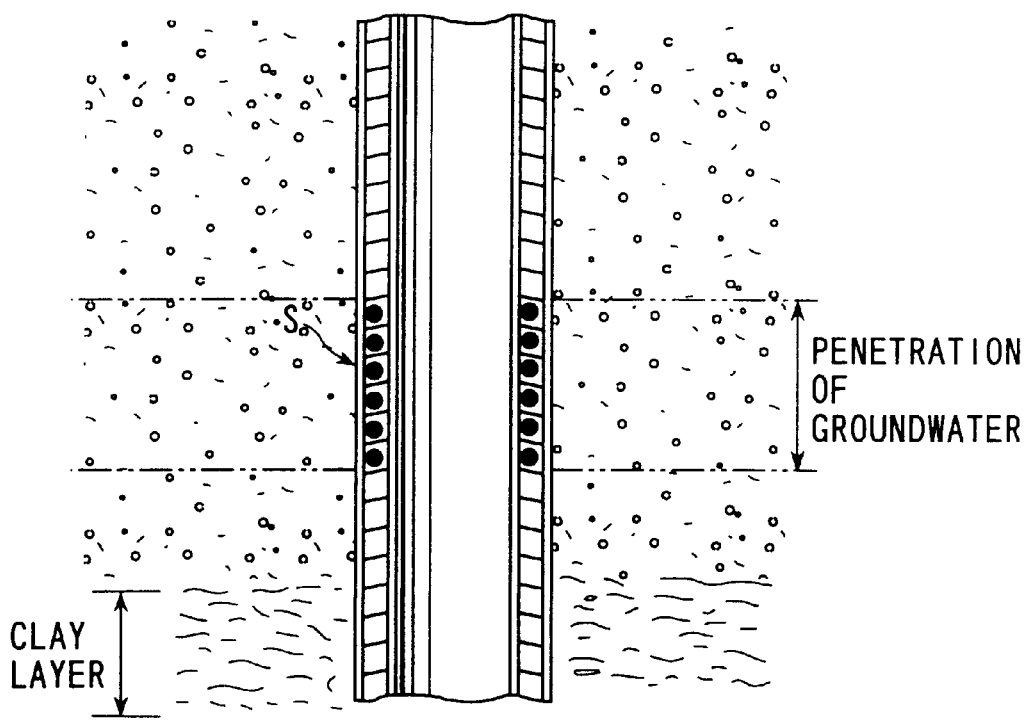
FIG. 31 is a diagram to help explain the operation of the sensing unit when water has permeated from a water vein in the ground in the sixth embodiment.

FIG. 31 shows the position of a water vein in the ground and a state where water penetrates from a water vein. The water level sensors indicated by dark marks turn on, measuring the water level of the penetrating water. The computing unit 307 make the same calculations as described above, determining the distance to a clay layer (slide face).

With the sixth embodiment, small compartments are formed by the ringed partition plates 302 provided in the direction of axis at suitable intervals between the iron inner cylinder 301a and the porous outer cylinder 301b both constituting the cylindrical member 301. The water level sensors 303 are provided on the outer surface of the inner cylinder 301a in such a manner that they correspond to the compartments. The water level sensors 303 sense penetrating water in the corresponding compartments. The computing unit 307 determines the presence or absence of water in each compartment and its position and measures the position and size of a very wet stratum in the ground. Therefore, the sixth embodiment produces the following effects:

(a) The position of a very wet stratum from the surface of the earth and its size can be determined.

(b) Because of the double cylindrical structure and the outer cylinder made of porous material, sand in the ground is less liable to enter the sensing unit mounting section and erroneous operation due to clogging takes place less frequently.

(c) Even if the movement of an underground stratum has distorted the sensing units 300 slightly, they can make measurements unless they are broken, assuring a very long service life.

(d) Because no moving section is provided, it is possible to minimize the probability of breakdown and eliminate the need for maintenance.

(e) When water gauges are installed, they can make measurements even when holes bored for installation are not completely vertical, saving installation time and expenses.

Figure 32:
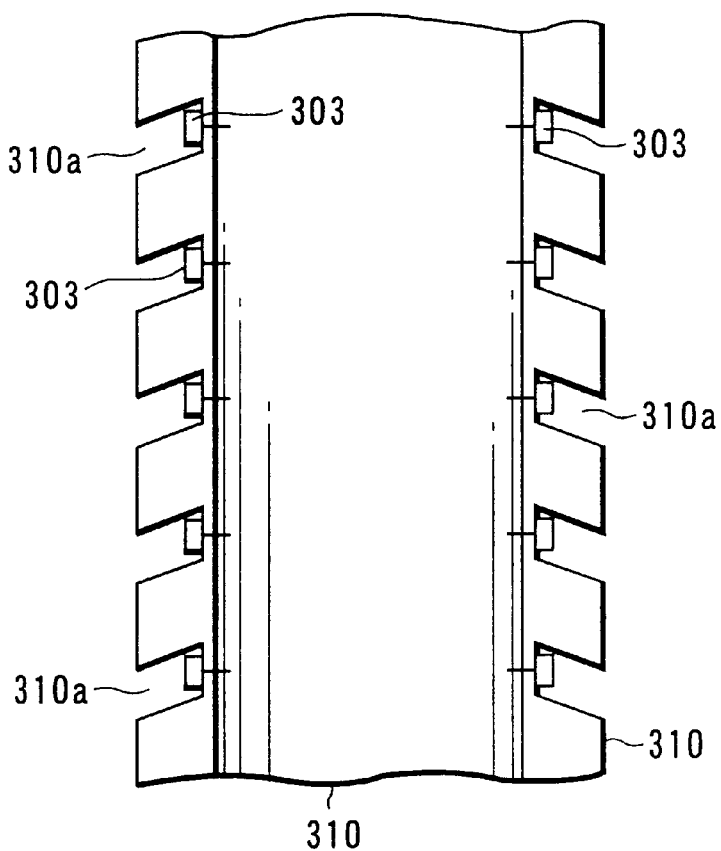
FIG. 32 is a sectional view of part of a modification of the cylindrical member in the sixth embodiment.

In the sixth embodiment, the small compartments are formed by the ringed partition plates 302 provided in the direction of axis at suitable intervals between the iron inner cylinder 301a and the porous outer cylinder 301b both constituting the cylindrical member 301. The water level sensors 303 are provided for the corresponding compartments. The present invention is not limited to this. For instance, as shown in FIG. 32, a plurality of holes 310 are made in a thick cylindrical member 310 may be of, for example, iron or plastic, in such a manner that they are arranged on the same circumference at suitable intervals in the direction of axis of the member. A water level sensor 303 may be provided on the bottom of each hole 310a. The resulting assembly may be used to construct a underground water level sensing unit of FIG. 27.

This underground water level sensing unit produces the effects described above.

An example of monitoring a landslide with the underground water level sensing units 300 will be explained.

Figure 33:
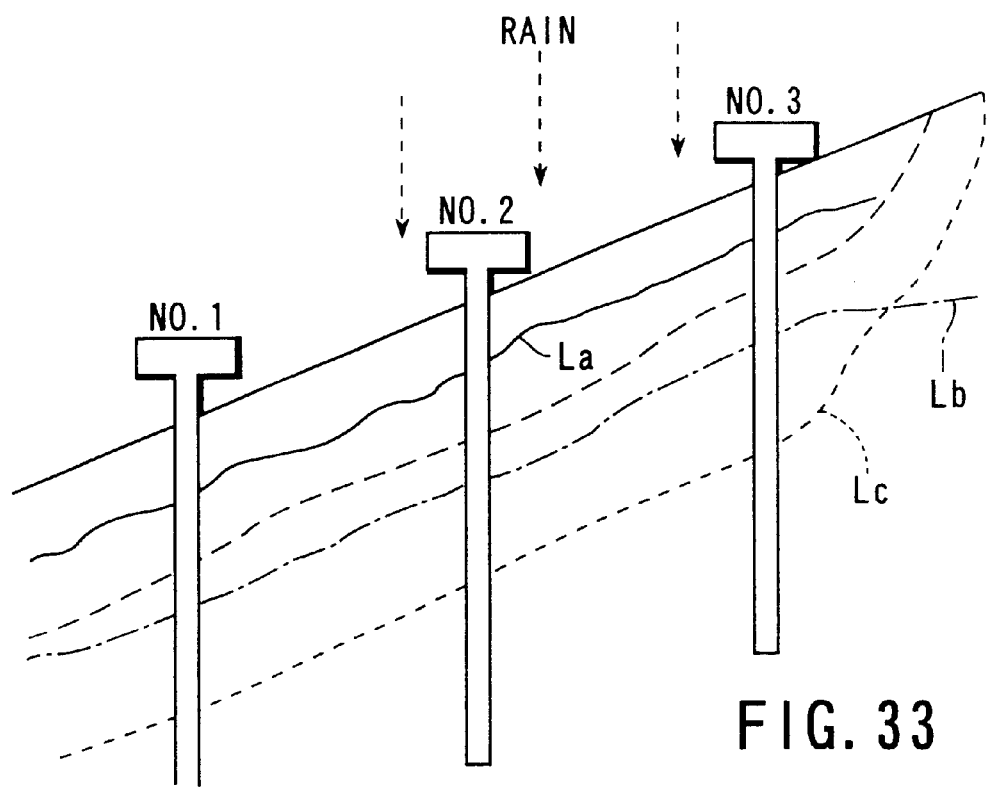
FIG. 33 is a diagram to help explain a case where a landslide is monitored using underground water level sensing units of the sixth embodiment.

It is assumed that, for example, underground water level sensing units 300 (No. 1 to No. 3) are buried in a slope at suitable intervals as shown in FIG. 33.

In this state, when rainwater has reached a penetration layer surface La, the sensing units 300 up to the penetration layer surface La turn on in each underground sensing unit. When rainwater has reached a weak stratum surface Lb, the sensing units 300 up to the weak stratum surface Lb turn on. Furthermore, when rainwater has reached a warning stratum surface Lc with a strong possibility that a landslide will occur, the sensing units 300 up to the stratum surface Lc turn on.

Then, the underground water level sensing units 300 (No. 1 to No. 3) calculate the area for the numbers of the sensing units 300 that are on and the distance from the surface of the earth in a computing process as shown in FIG. 29. The resulting data items are transmitted from the communication unit to the base station.

The base station acquires the data items and performs data processing. If it is judged that only the data items from the underground water level sensing units 300 (No. 1 and No. 3) indicate that water has penetrated to the surface of the warning stratum, it is judged that special attention is needed. If it is judged that all the data items from the underground water level sensing units 300 (No. 1 to No. 3) indicate that water has penetrated to the surface of the warning stratum, it is judged that there is a strong possibility that a landslide will take place and a warning alarm is given. This makes it possible to predict the occurrence of disaster in a landslide danger region, such as a slope.

An example of monitoring the collapse of an embankment by use of underground water level sensing units 300 with the above configuration will be explained.

Figure 34A:
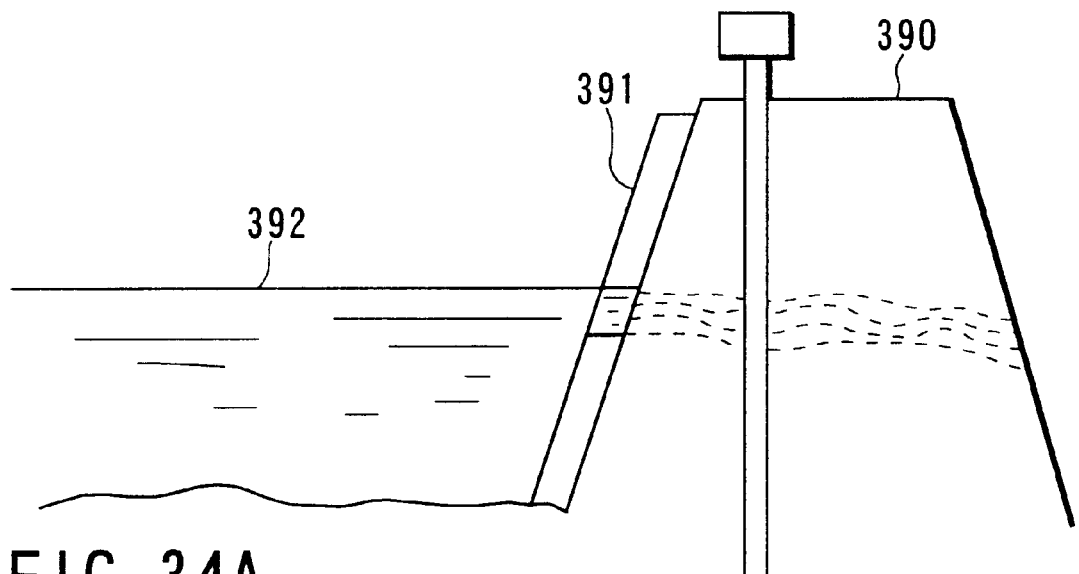
FIGS. 34A to 34B are diagrams to help explain a case where the collapse of an embankment is monitored using underground water level sensing units of the sixth embodiment.
Figure 34B:
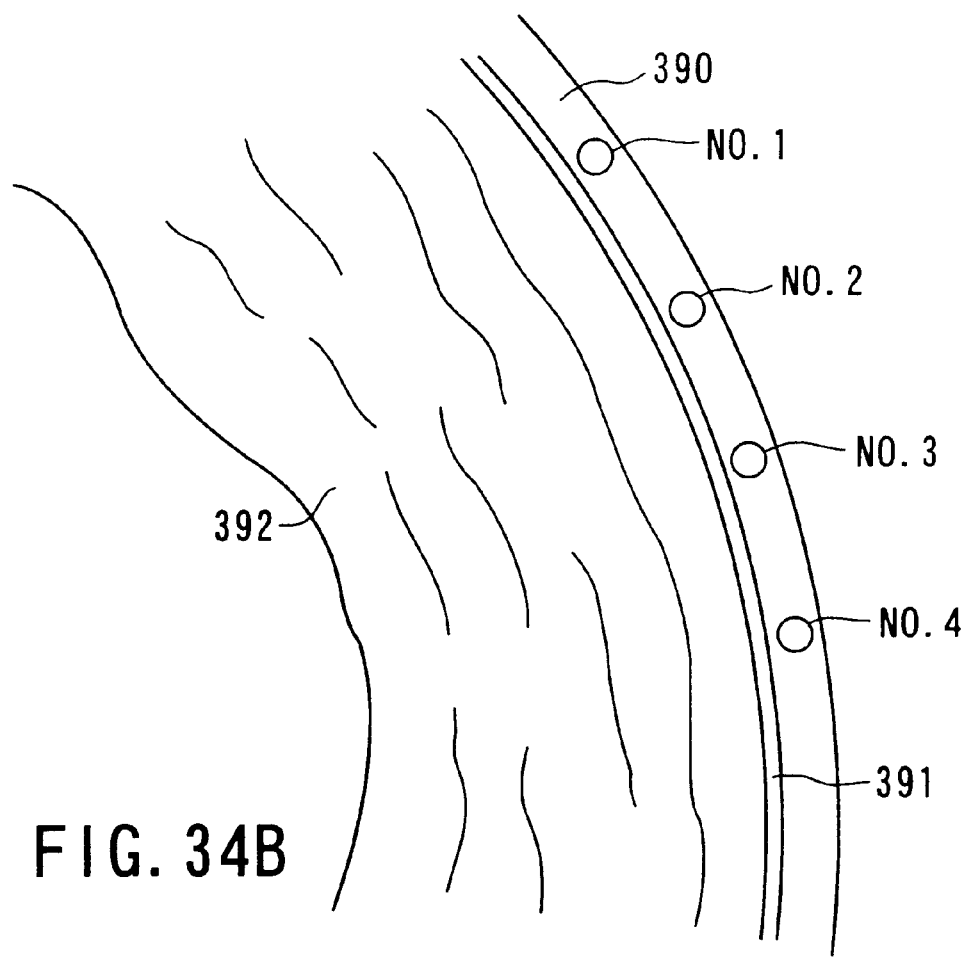

It is assumed that, for example, underground water level sensing units 300 (No. 1 to No. 4) are buried in an embankment 390 at suitable intervals as shown in FIGS. 34A and 34B.

In this state, if part of a bank 391 has broken or deteriorated and the water in the river 392 has flown into the embankment, the water will penetrate gradually in a direction of outer side of the embankment. As the water has penetrated further, earth and sand will flow from part of the embankment 390 and a crack will occur. In the end, the collapse of the embankment may lead to flood damage.

The underground water level sensing units buried in the embankment 390 sense water in the embankment while water is penetrating through the damaged part or deteriorated part of the bank 391 into the embankment. They then transmit the sense results to the observation point, which makes it possible to predict the occurrence of disaster before the collapse of the embankment.

As described above, with the sixth embodiment, it is possible to provide an underground water level sensing unit 300 capable of measuring the position and size of a very wet stratum in the ground with high accuracy.

[Seventh Embodiment]

Figure 35:
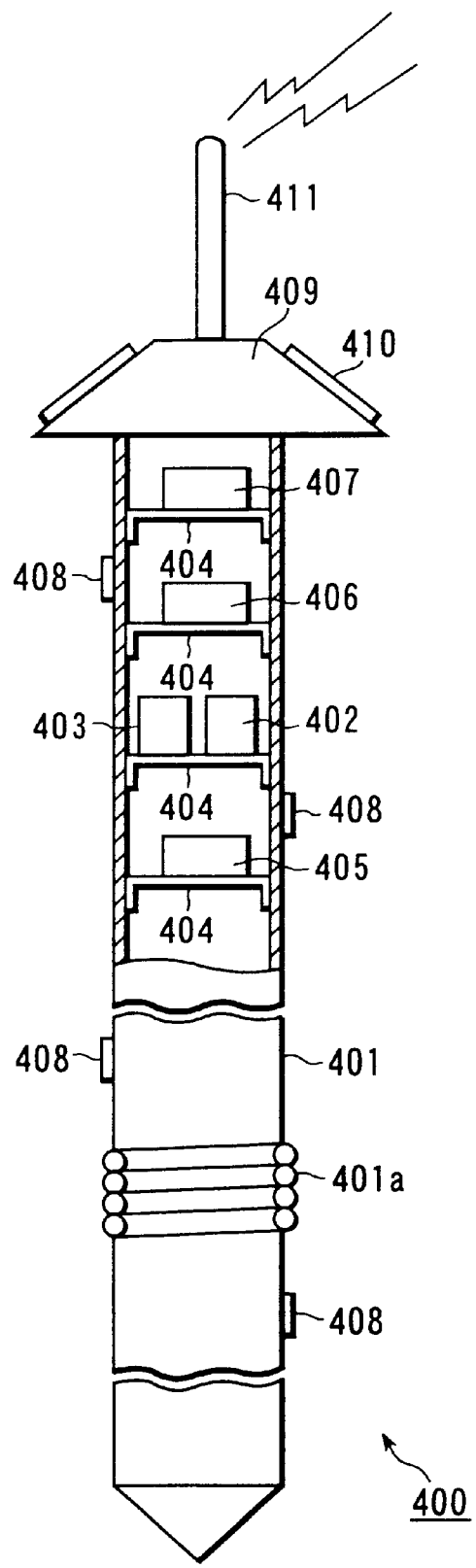
FIG. 35 shows the configuration of a sensing unit, with the important portions broken away, used in a snowslide monitoring apparatus according to a seventh embodiment of the present invention.

FIG. 35 shows an example of the configuration of a sensing unit used in a snowslide monitoring apparatus according to a seventh embodiment of the present invention.

In FIG. 35, numeral 400 is a sensing unit. The sensing unit 400 has a cylindrical member 401 that is to be buried in the ground. The cylindrical member 401 can be adjusted so as to have a suitable length according to the depth of snow accumulated on the ground. The member 401 is divided into two at a suitable position close to the surface of the ground, with the two divisions connected integrally by a spring joint 401a.

In the cylindrical member 401, there are provided a solid-state gyro-sensor 402 serving as a sensing section and a two-axis inclinometer 403. The gyro-sensor 402 and inclinometer 403 are mounted on a support plate 404 fixed to the surface of the inner wall of the cylindrical member 401. In the cylindrical member 401, there are further provided a battery 405 acting as a driving power supply, a computing section 406 for amplifying the sense signals from the gyro-sensor 402 and inclinometer 403 and making calculations, and a transmitting section 407 for transmitting the sense signal processed at the computing section 406. Each of the battery 405, computing section 406, and transmitting section 407 is mounted on a support plate 404 fixed to the surface of the inner wall of the cylindrical member 401.

Furthermore, a plurality of thermometers 408 are provided on the outer surface of the cylindrical member 401 in the direction of axis at suitable intervals above ground.

Numeral 409 indicates a lid member for closing the upper opening section of the cylindrical member 401. On the top surface of the lid member 409, there is provided a solar battery 410 acting as a charging power supply for the battery 405. Further on the lid member 409, there is provided a transmission antenna 411 for transmitting the sense signal processed at the computing section 406 by radio from the transmitting section 407 to a base station (not shown).

The gyro-sensor 402 is identical to the gyro-sensor 102 of FIG. 3A.

The two-axis inclinometer 403 measures the tilt angles of two axes crossing at right angles and supplies the measurement signal to the computing section 406.

The thermometer 408 senses temperature at a depth of accumulated snow and inputs the sensed temperature to the computing section 406.

The function of each of the gyro-sensor 402, inclinometer 403, thermometer 408, and computing section 406 will be explained by reference to FIGS. 36 and 37.

Each piezoelectric element of the gyro-sensor 402 generates a voltage according to an acceleration of $\alpha$. When the gyro-sensor 402 inputs the voltages as shown in FIG. 36, an amplifier amplifies the voltage signals to signal levels suitable to a computing process. At a section T31a, an acceleration is calculated from the voltage signals. Next, at a section T32a, the acceleration in the direction of each axis simultaneously is sensed and the direction and magnitude of the displacement, the impulse force, and the posture of the sensing unit 400 are judged. At a section T33a, the acceleration caused by the rotation of the earth is cut. Next, at a section T34a, the displacement, acceleration, and impulse force are corrected and the resulting data items are outputted as output data Fa to the computing section 406.

Furthermore, an amplifier amplifies the measurement signal from the two-axis inclinometer 403 to a signal level suitable for a computing process. At a section T31b, the tilt angles of the two axes crossing at right angles and the direction of tilt are determined from the measurement signal. Next, at a section T32b, the tilt angle of each axis and the direction of inclination of each axis are outputted as output data Fb to the computing section 406.

Moreover, an amplifier amplifies the sense signal from the thermometer 408 to a signal level suitable for a computing process. At a section T31c, the temperature at each depth of the accumulated snow layer is sensed from the value. Next, at a section T32c, it is judged how much the temperature have changed (risen) according to the depth of the accumulated snow layer. The section T32c also makes similar judgment above ground. At a section T33c, the temperature in the accumulated snow layer is outputted as output data Fc the computing section 406. At this section T33c, the temperature above ground is also outputted.

Figure 37:
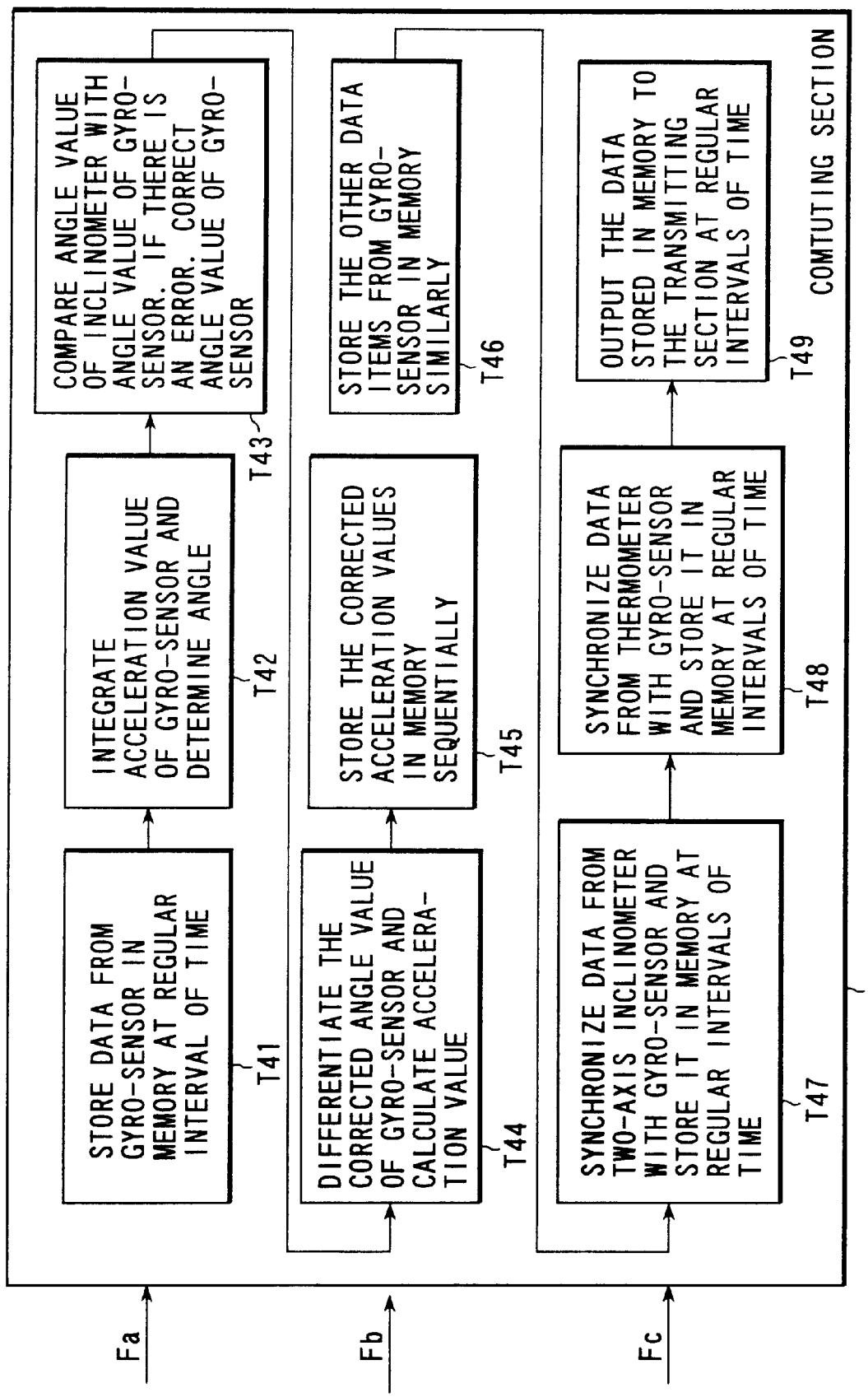
FIG. 37 is a block diagram to help explain the function of processing the signals in the computing section in the sensing unit of the seventh embodiment.

The output data items Fa, Fb, and Fc of the gyro-sensor 402, inclinometer 403, and thermometer 408 are inputted to the computing section 406 as shown in FIG. 37. At a section T41, the data item from the gyro-sensor 402 is stored in a memory for a specific period of time. At a section T42, the acceleration value of the gyro-sensor from the data item is integrated to determine the angle.

At a section T43, the angle value determined by the two-axis inclinometer is compared with the angle value determined by the gyro-sensor and, if there is an error, the angle value of the gyro-sensor is corrected. At a section T44, the corrected angle value of the gyro-sensor is differentiated to find an acceleration value. At a section T45, the acceleration value is stored in the memory sequentially. Similarly, at a section T46, other data items, including the displacement of the gyro-sensor, the impulse force, and the position, are stored in the memory.

At a section T47, the data from the two-axis inclinometer 403 is synchronized with the gyro-sensor 402 and stores in the memory at regular intervals of time. At a section T48, the data from the thermometer 408 is synchronized with the gyro-sensor 402 and stored in the memory at regular intervals of time. At a section T49, the data items stored in the memory are transmitted to the transmitting section 407 at regular intervals of time.

Figure 38:
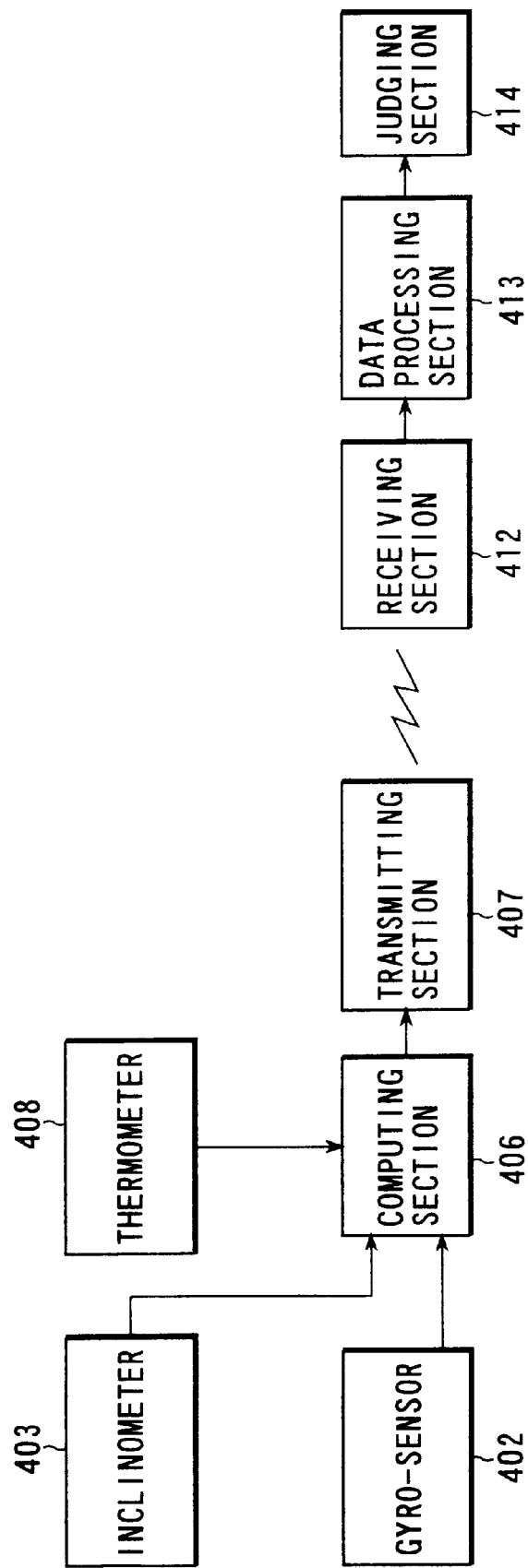
FIG. 38 is a block diagram for the data processing system in the entire snowslide monitoring apparatus of the seventh embodiment.

FIG. 38 is a block diagram of a system for transmitting to the base station data on the displacement, acceleration, and impulse force concerning the gyro-sensor 402, data on the tilt angle and direction concerning the inclinometer 403, and temperature data on the accumulated snow layer concerning the thermometer 408, and monitoring the occurrence of a snowslide and its size.

In FIG. 38, each sensing unit side is composed of the gyro-sensor 402, two-axis inclinometer 403, thermometer 408, computing section 406, and transmitting section 407. The base station side is composed of a receiving section 412, a data processing section 413, and a judging section 414.

The function of the data processing section 413 on the base station side will be described by reference to FIG. 39.

Figure 39:
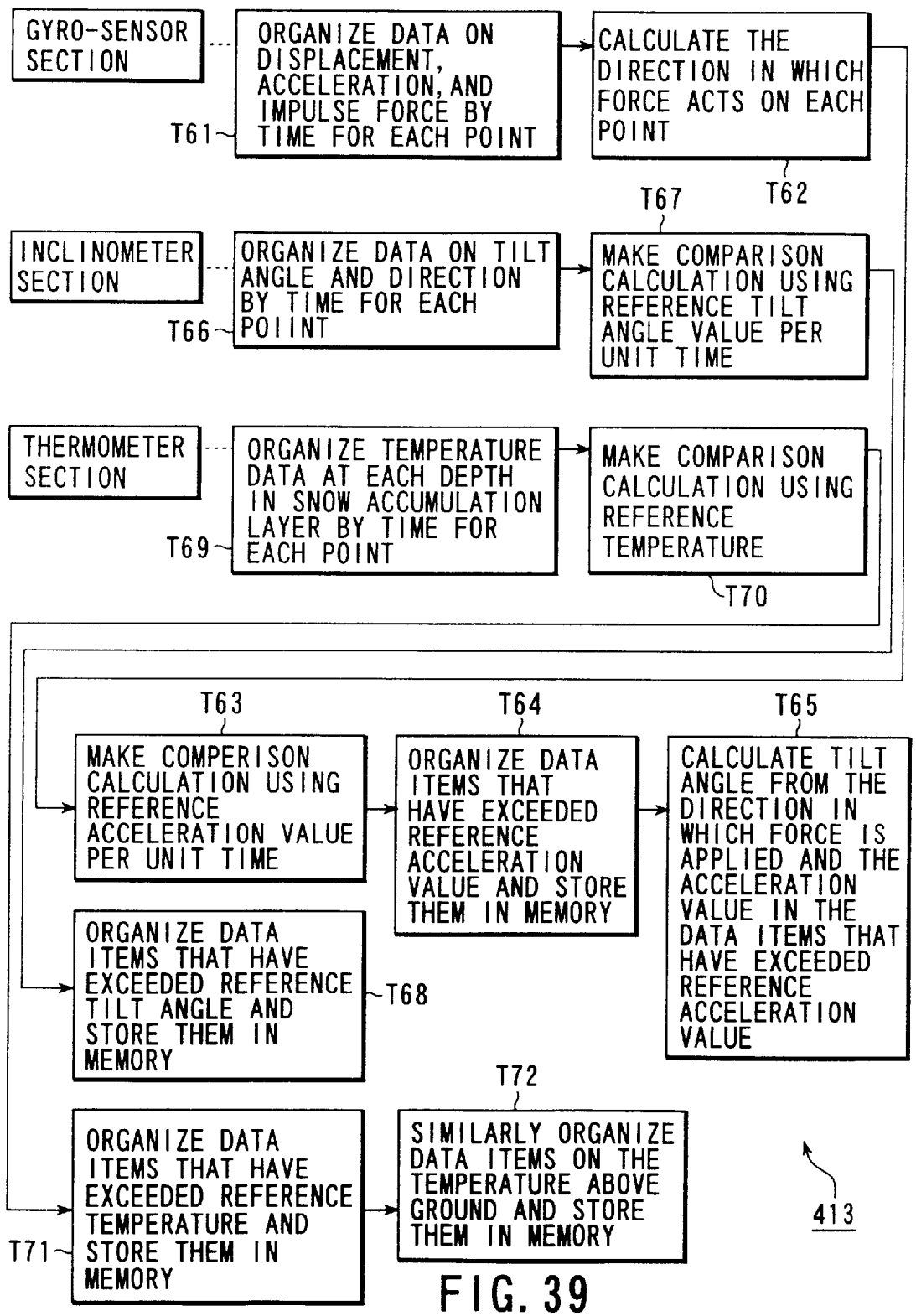
FIG. 39 is a block diagram to help explain the function of the data processing section of FIG. 38.

In the data processing section 413 of FIG. 39, at a section T61, data is organized about the displacement, acceleration, and impulse force by time for each point on the basis of the measurement signal from the gyro-sensor 402. Next, at a section T62, the direction of force exerted on each point is calculated. At a section T63, comparison calculation is made with a reference acceleration value per unit time. Next, at a section T64, the data items larger than the reference acceleration value are organized and stored in the memory. At a section T65, a tilt angle is calculated from the direction in which the force has been applied and the acceleration value, on the basis of the data items larger than the reference acceleration value.

Furthermore, at a section T66, the data items are organized about tilt angle and direction by time for each point on the basis of the measurement signal from the two-axis inclinometer 403. Next, at a section T67, comparison calculation is made with a reference tilt angle value per unit time. At a section T68, the data items larger than the reference tilt angle are organized and stored in the memory.

Furthermore, at a section T69, the temperature data items are organized by time for each point on the basis of the measurement signal from the thermometer 408. Next, at a section T70, comparison calculation is made with the reference temperature. At a section T71, the data items larger than the reference temperature are organized and stored in the memory.

The judging section 414 carries out various judging processes, explained later in detail, on the basis of the data processed by the data processing section 413 and gives the alarm or displays a suitable message according to the cause and size of a snowslide.

The operation of the snowslide monitoring apparatus constructed as described above will be explained.

Figure 40:
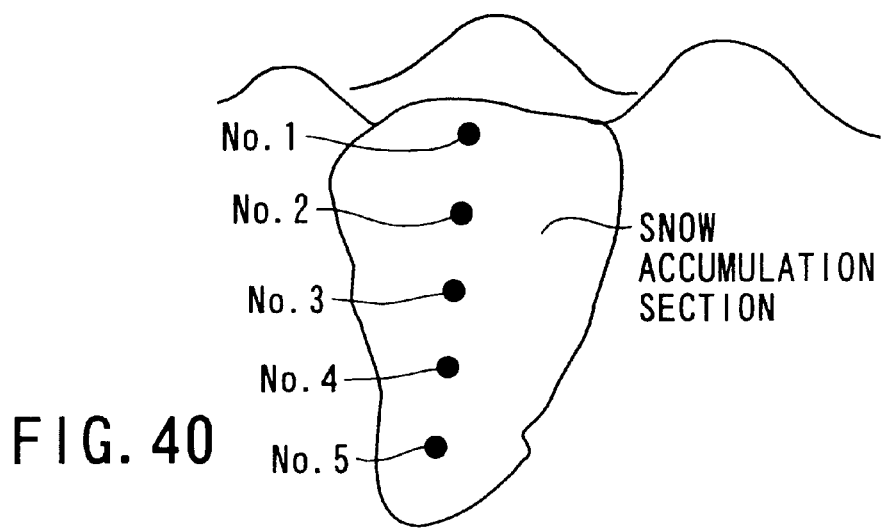
FIG. 40 shows an example of an arrangement of sensing units of the seventh embodiment on a slope in a mountainous region.
Figure 41:
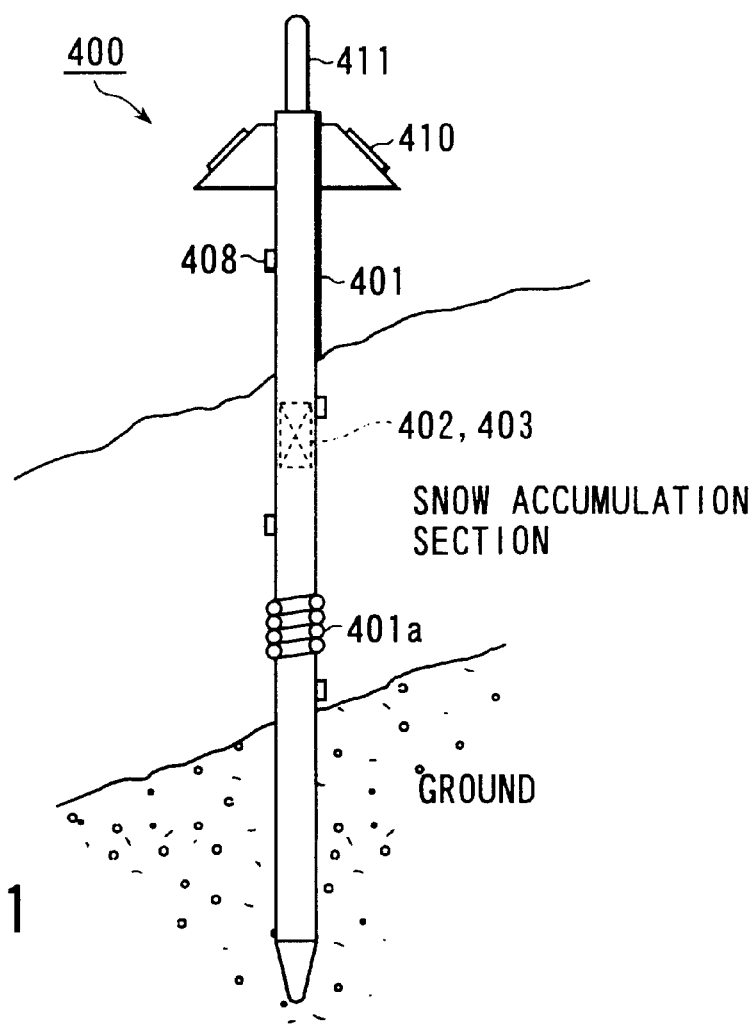
FIG. 41 shows a state where a sensing unit of the seventh embodiment is buried in the ground.

As shown in FIG. 40, a plurality of sensing units 400 are placed in the ground in a mountainous region where a snowslide is liable to take place. Specifically, sensing units 400 (No. 1 to No. 5) are placed at suitable intervals along a slope in a snowslide danger zone. They are buried as shown in FIG. 41. The sensing units 400 themselves would not be carried away by burying the portion lower than spring joint 401a of each sensing unit 400, even if the snowslide occurs.

Figure 36:
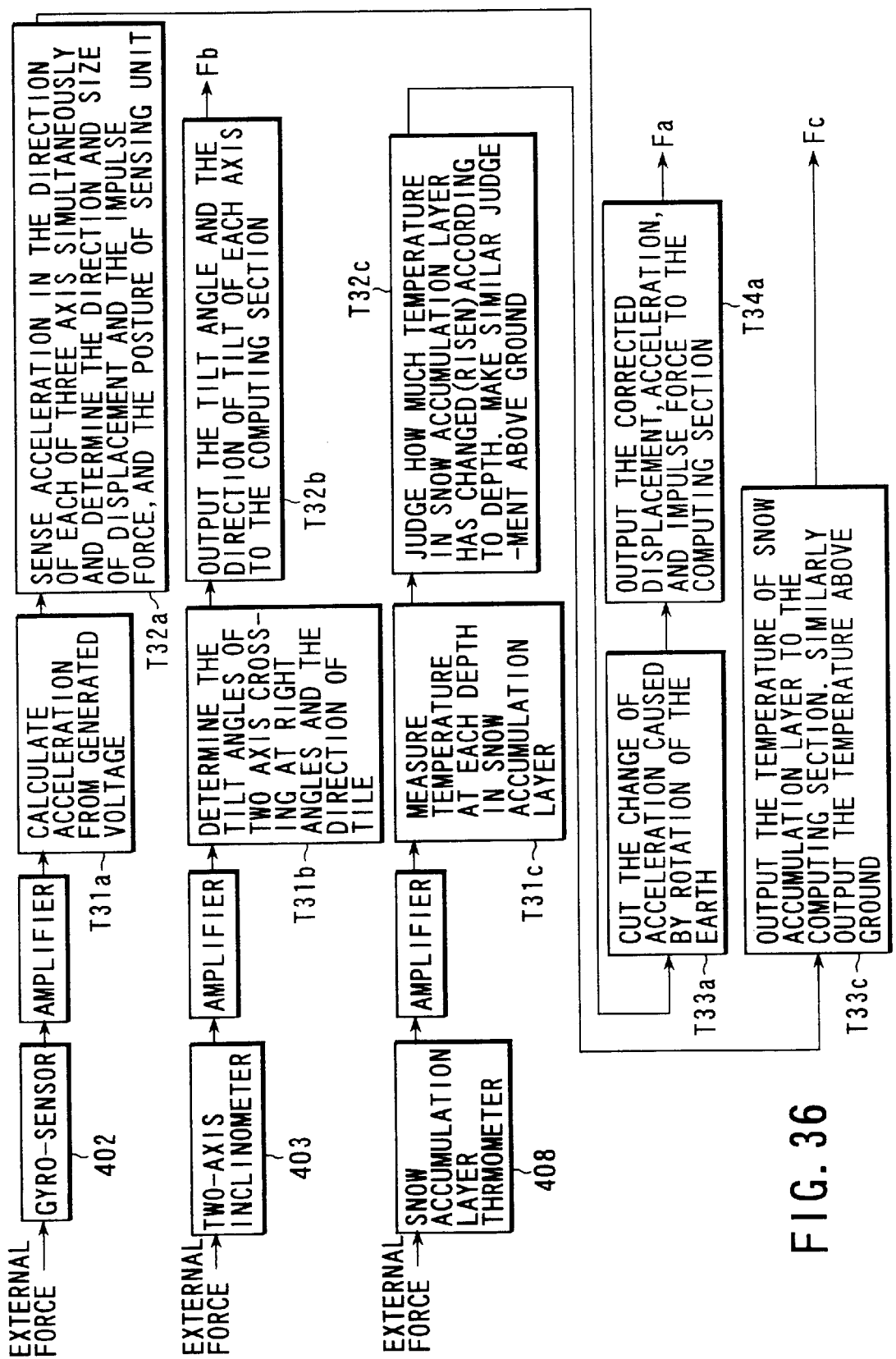
FIG. 36 is a block diagram to help explain the function of processing the signals from the gyro-sensor, two-axis inclinometer, and thermometer in the sensing unit of the seventh embodiment.

In each sensing unit 400 buried this way, the signals from the gyro-sensor 402, inclinometer 403, and temperature 408 at each measuring point in an accumulated snow region are subjected to the processes as shown in FIG. 36. The resulting signals are taken in by the computing section 406. The computing section 406 then makes the calculations as shown in FIG. 37. The transmitting section 407 transmits the corrected acceleration value, the data from the inclinometer 403, and the data from the temperature 408 to a base station via the transmission antenna 411.

In the base station, when the receiving section 412 receives the data transmitted from each sensing unit 400 in FIG. 38, the data processing section 413 shown in FIG. 39 processes the data and organizes each of the data items larger than the reference acceleration value, the data items larger than the reference tilt angle, the data items larger than the reference temperature, and data on the ground temperature. The organized data items are taken in by the judging section 414.

The various judging processes carried out by the judging section 414 will be described in detail by reference to FIGS. 42 to 45.

Figure 42:
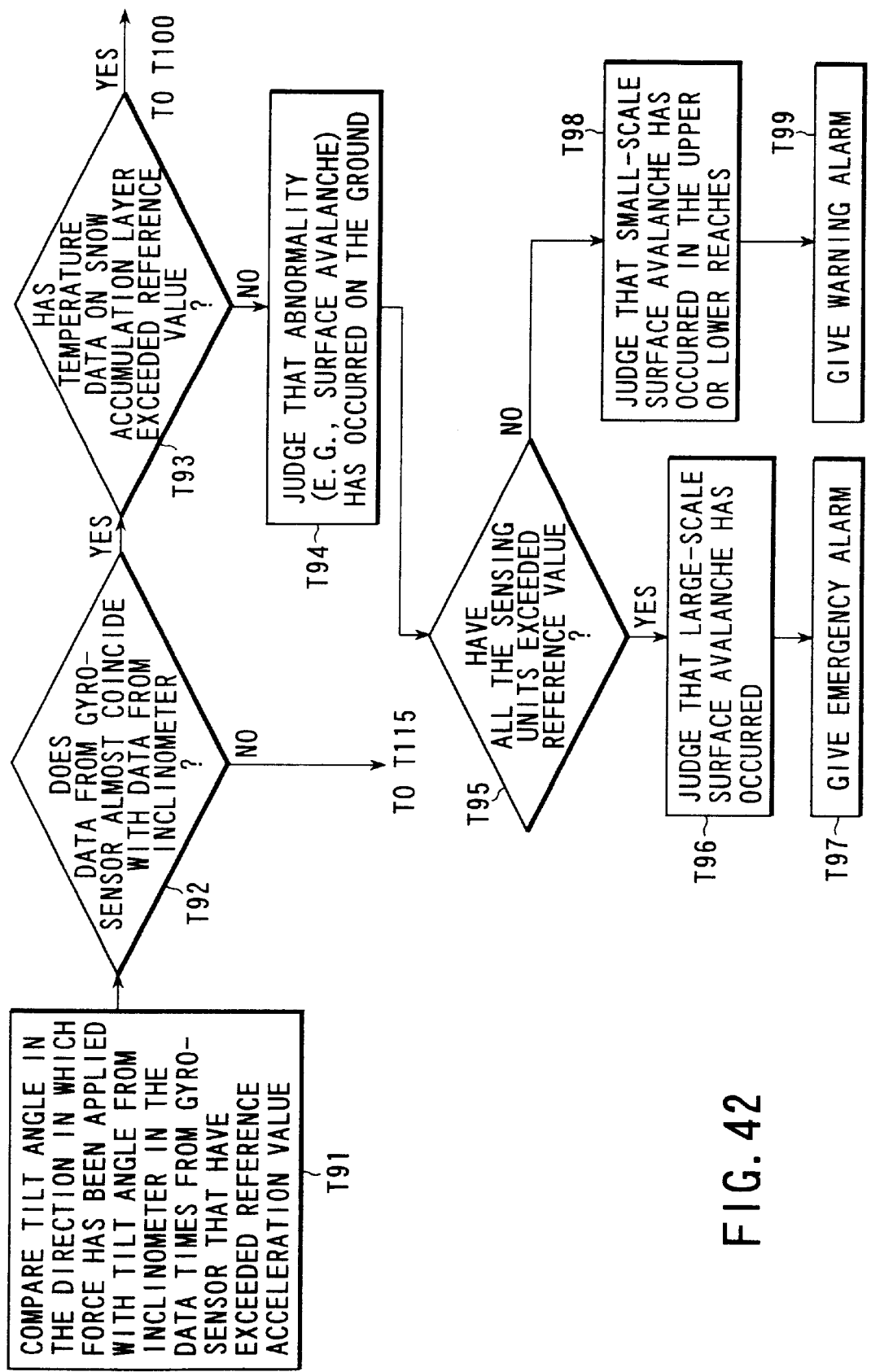
FIG. 42 is a flowchart to help explain a first judging process at the judging section of FIG. 38.

As shown in FIG. 42, the direction in which the force has been exerted and the tilt angle of the gyro-sensor 402 are compared at step T91 with the direction and tilt angle determined by the inclinometer 403 on the basis of the data items larger than the reference acceleration value from the gyro-sensor 402, and it is determined in step T92 whether or not the data from the gyro-sensor 402 almost coincides with the data from the inclinometer 403. If it is determined in step T92 that the data from the gyro-sensor 402 almost coincides with the data from the inclinometer 403, it is determined in step T93 whether or not the temperature in the accumulated snow layer measured by the temperature 408 has exceeded the reference value.

When it is not determined that the data on the accumulated snow layer from the thermometer 408 has exceeded the reference value, it is judged at step T94 that an abnormality (such as a surface avalanche) has occurred on the ground, and it is determined at step T95 whether or not all the sensing units 400 have exceeded the reference value.

If it is determined at step T95 that all the sensing units 400 have exceeded the reference value, it is judged at step T96 that a large-scale surface avalanche has taken place, and an emergency alarm is given at step T97. If it is not determined at step T95 that all the sensing units 400 have exceeded the reference value, it is judged at step T98 that a small-scale surface avalanche has taken place, and an warning alarm is given at step T99.

Figure 43:
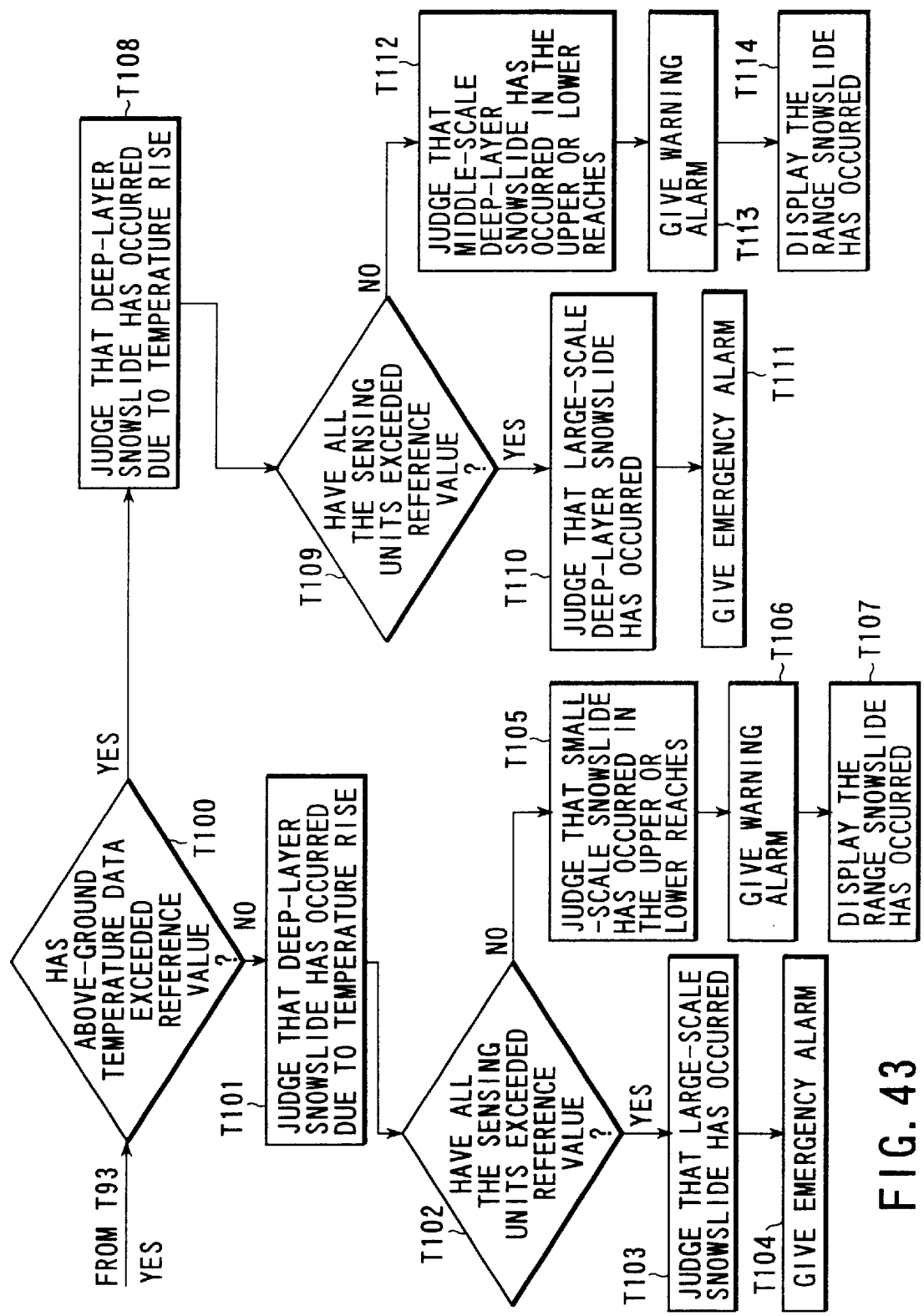
FIG. 43 is a flowchart to help explain a second judging process at the judging section.

If it is determined at step T93 that the temperature data from the thermometer 408 has exceeded the reference value, the judging section will pass control to a judging process as shown in FIG. 43. As shown in FIG. 43, it is determined at step T100 whether or not the ground temperature data has exceed the reference value.

If it is not determined at step T100 that the ground temperature data has exceeded the reference value, it is judged at step T101 that an abnormality has occurred in the accumulated snow layer, and it is determined at step T102 whether or not all the sensing units 400 have exceeded the reference value. If it is determined that at step T102 that all the sensing units 400 have exceeded the reference value, it is judged at step T103 that a large-scale snowslide has taken place, and an emergency alarm is given at step T104. If it is not all the sensing units 400 have exceeded the reference value, it is judged at step T105 that a small-scale snowslide has taken place in upper or lower reaches, and a warning alarm is given at step T106 and a range of snowslide is displayed at step T107.

If it is determined at step T100 that the ground temperature data has exceeded the reference value, it is judged at step T108 that a deep-layer avalanche has occurred due to temperature rise, and it is determined in step T109 whether or not all the sensing units 400 have exceeded the reference value. If it is determined at step T109 that all the sensing units 400 have exceeded the reference value, it is judged at step T110 that a large-scale deep-layer avalanche has occurred, and an emergency alarm is given at step T111. If it is not determined at step T109 that all the sensing units 400 have exceeded the reference value, it is judged at step T112 that a middle-scale avalanche has taken place in upper or lower reaches, and an warning alarm is given at step T113 and a range of snowslide is displayed at step T114.

Figure 44:
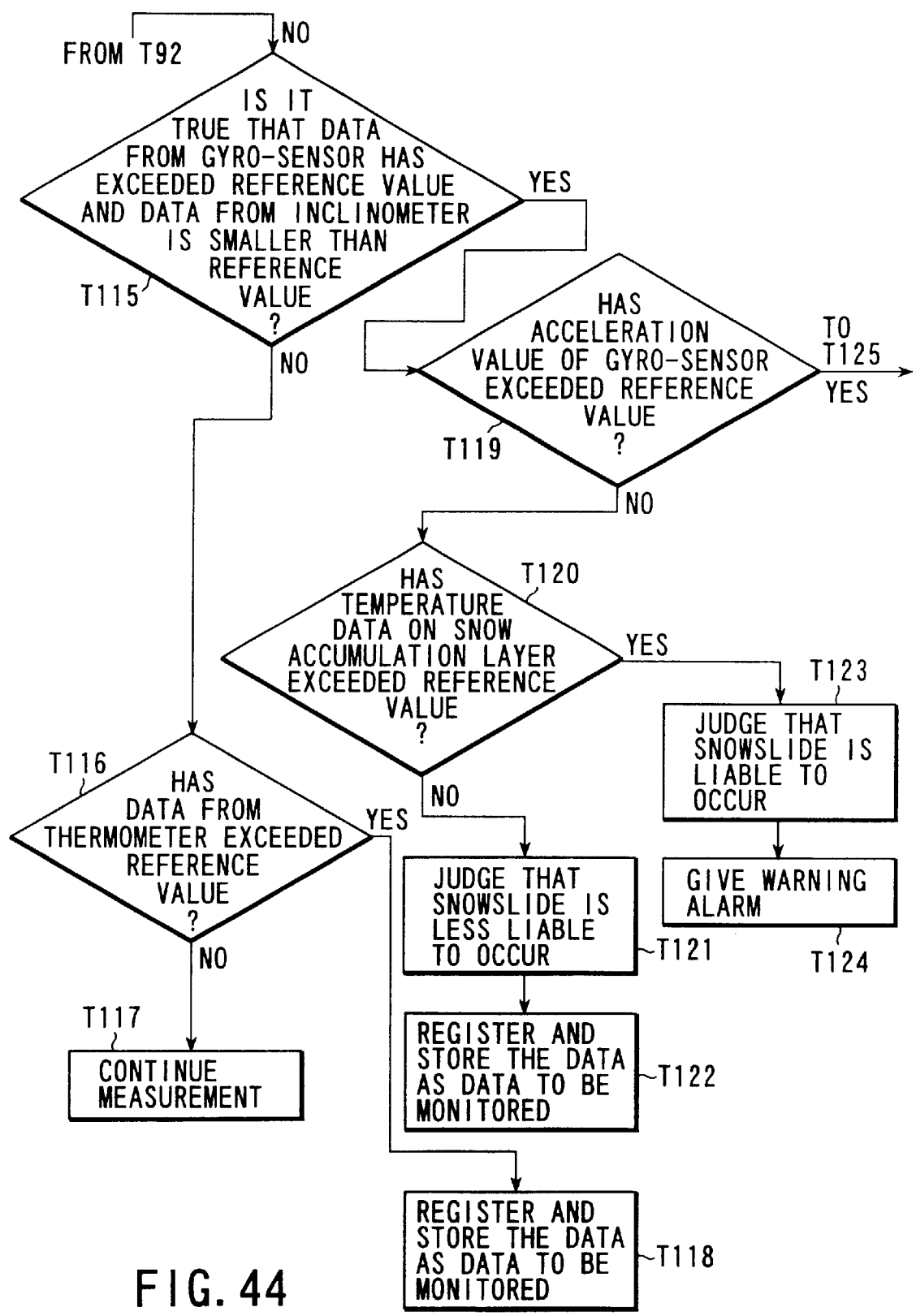
FIG. 44 is a flowchart to help explain a third judging process at the judging section.

If it is not determined at step T92 of FIG. 44 that the data from the gyro-sensor 402 coincides with the data from the inclinometer 403, the judging section will pass control to a judging process as shown in FIG. 44.

In FIG. 44, it is determined at step T115 whether or not the data from the gyro-sensor 402 has exceeded the reference value and the data from the inclinometer 403 is smaller than the reference value. If the data is not smaller than the reference value, it is determined at T116 whether or not the data from the thermometer 408 has exceeded the reference value. If it has not exceeded the reference value, then the control is passed to step T117 in which the measurement is continued. If it has exceeded the reference value, it is entered and stored into the memory as data to be monitored at step T118.

If it is determined at step T115 that the data from the gyro-sensor 402 has exceeded the reference value and the data from the inclinometer 403 is smaller than the reference value, it is determined at step T119 whether or not the acceleration value of the gyro-sensor 402 has exceeded the reference value. If it has not exceeded the reference value, it is determined at step T120 whether or not that the temperature data on the accumulated snow layer from the thermometer 408 has exceeded the reference value. If it has not exceeded the reference value, it is judged at step T121 that a snowslide is less liable to take place, and the data to be monitored is entered and stored into the memory a step T122. If it is determined at step T120 that the temperature data on the accumulated snow layer from the thermometer 408 has exceeded the reference value, it is confirmed at step T123 that a snowslide is liable to take place, and a warning alarm is given at step T124.

Figure 45:
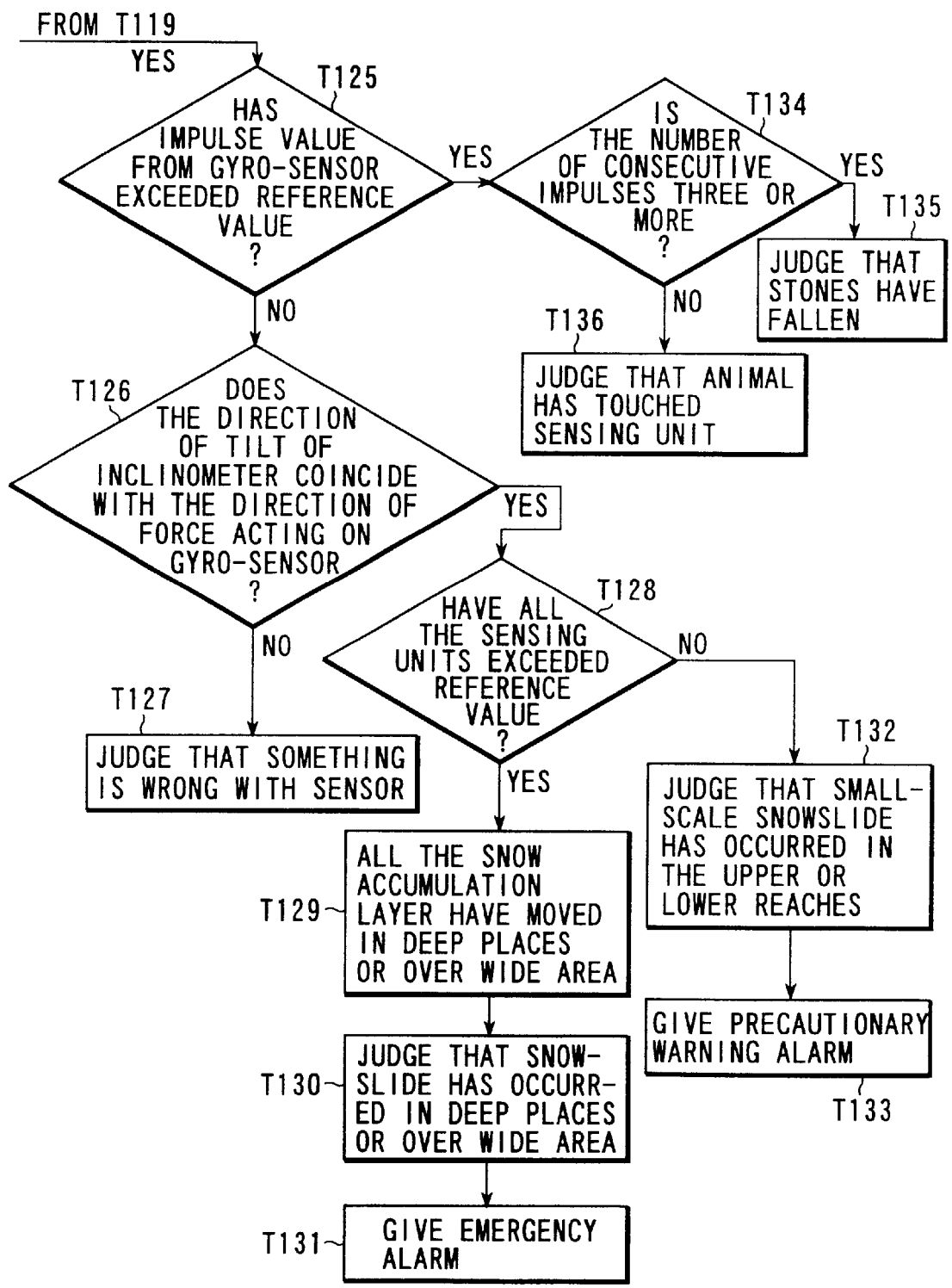
FIG. 45 is a flowchart to help explain a fourth judging process at the judging section.

If it is determined at step T119 that the acceleration value from the gyro-sensor 402 has exceeded the reference value, the judging section will pass control to a judging process as shown in FIG. 45.

In FIG. 45, it is determined at step T125 whether or not the impulse value from the gyro-sensor 402 has exceeded the reference value. If it has not exceeded the reference value, it is determined at step T126 whether or not the direction of inclination of the inclinometer 403 coincides with the direction of force of the gyro-sensor 402. If they do not coincide, it is judged that something is wrong with the sensor at step T127.

If it is determined at T126 that the direction of inclination of the inclinometer 403 coincides with the direction of force of the gyro-sensor 402, it is determined at step T128 whether or not all the sensing units 400 have exceeded the reference value.

If it is determined at step T128 that all the sensing units 400 have exceeded the reference value, it is confirmed at step T129 that all of the accumulated snow layer has moved in the deep layers or a wide area, and it is judged at step T130 that a snowslide has occurred in the deep layers or a wide area and a warning alarm is given at step T131.

If it is not determined at step T128 that all the sensing units 400 have exceeded the reference value, it is judged at step T132 that a middle-scale snowslide has taken place in upper or lower reaches, and a precautionary warning alarm is given at step T133.

Furthermore, if it is determined at step T125 that the impulse value from the gyro-sensor 402 has exceeded the reference value, it is determined at step T134 whether or not the number of consecutive impulses is three or more. If it is determined that the number of consecutive impulses is three or more, it is judged at step T135 that stones have fallen. If it is not determined that the number of consecutive impulses is three or more, it is judged at step T136 that an animal or the like has touched the sensing unit 400.

As described above, in the seventh embodiment, a sensing unit 400 includes the gyro-sensor 402 for sensing the displacement, acceleration, and impulse force, the two-axis inclinometer 403 for sensing the tilt angles of two axes crossing at right angles and the direction of tilt, the thermometer 408 for sensing temperature in the accumulated snow layer and temperature above ground, the computing section 406 for calculating the angle value of the gyro-sensor 402 on the basis of the acceleration value corrected according to the angle value of the inclinometer 403, the data from the inclinometer 403, and the temperature data, and the battery 405 using the solar battery 410 as a driving power supply. Sensing units of this type are buried in a slope in a snowy mountainous region. Each of the data items sensed by the sensing units 400 is transmitted to a base station. In the base station, the data processing section 413 processes the received data in real time. For the data items that have exceeded the reference acceleration value for each measuring point, the processing section 413 determines a tilt angle from the direction in which the force has been exerted and the acceleration value. It also determines the data items that have exceeded the reference tilt angle and the data items that have exceeded the reference temperature. On the basis of the data items processed at the data processing section 413, the judging section 414 performs various judging processes. This enables the occurrence of a snowslide to be monitored by giving a suitable alarm or displaying a suitable message according to the cause and size of a snowslide.

Consequently, the displacement of an accumulated snow layer can be sensed exactly, regardless of the places of installed sensing units 400, and the occurrence of disaster due to a snowslide can be predicted.

Figure 46A:
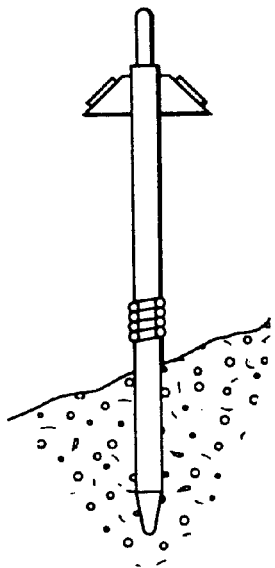
FIGS. 46A to 46C are diagrams to help explain the operation of the sensing unit in the seventh embodiment.
Figure 46B:
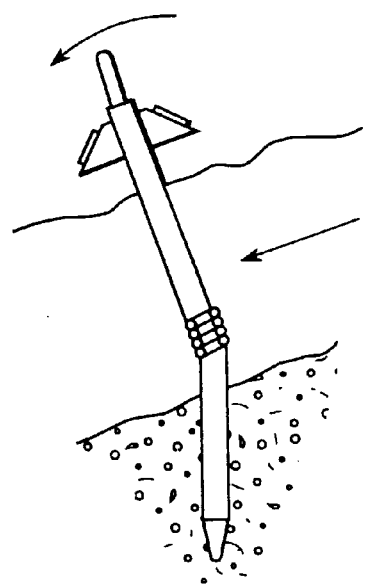
Figure 46C:
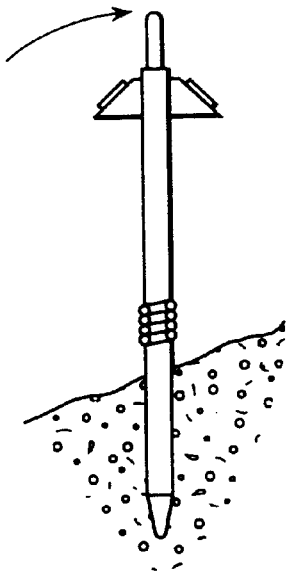

In the seventh embodiment, each sensing unit 400 has the cylindrical member 401 divided into two. The two divisions are connected integrally with the spring joint 401a. The sensing units 400 are buried in the ground beforehand in such a manner that their spring joints are located above ground as shown in FIG. 46A. When the movement of the accumulated snow layer imposes a load on the cylindrical member 401, bending force acts on the spring joint 401a, which therefore bends under the pressure as shown in FIG. 46B. Even in this situation, when the accumulated snow layer has melted, the spring joint will return to its original state by the power of recovering the figure or elasticity as shown in FIG. 46C.

Therefore, even when the sensing unit 400 has bent under the weight of snow, it is not necessary for maintenance personnel to repair or replace it after the snow has melted. Accordingly, unlike the conventional equivalent, the sensing units 400 of the seventh embodiment need almost no maintenance.

Even if a snowslide has occurred, the cushion of the spring joint section will prevent the sensing units 400 from being carried down by the snow.

Furthermore, because each sensing unit 400 is provided with a solar battery as a driving power supply, it consumes less power, has an indefinite service life, and requires almost no maintenance.

[Eighth Embodiment]

An example of the configuration of a sensing unit 400 used in a snowslide monitoring apparatus according to an eighth embodiment of the present invention will be explained.

Figure 47:
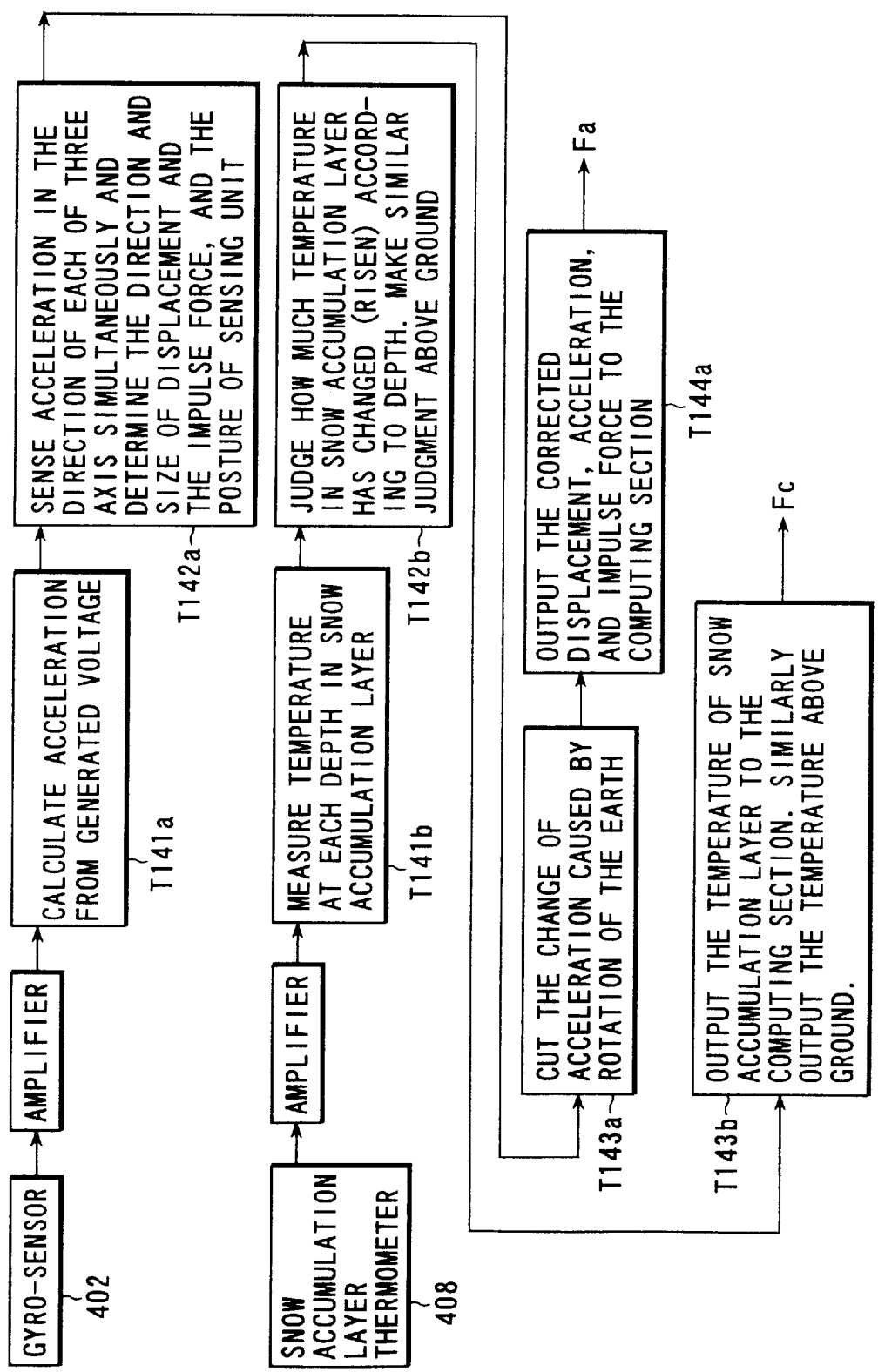
FIG. 47 is a block diagram to help explain the function of processing the signals from a gyro-sensor and a thermometer provided in a sensing unit used in a snowslide monitoring apparatus according to an eighth embodiment of the present invention.
Figure 48:
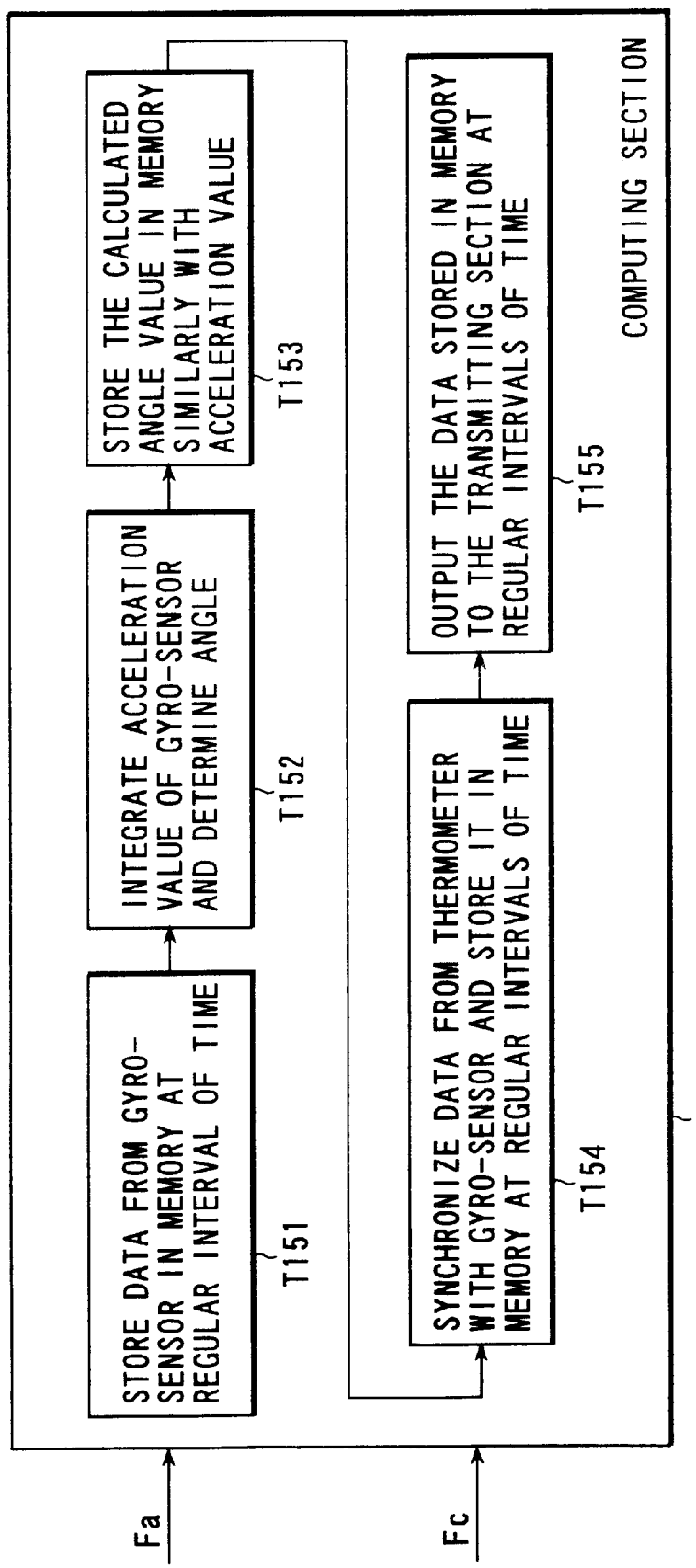
FIG. 48 is a block diagram to help explain the signal processing function of the computing section in the sensing unit of the eighth embodiment.

FIGS. 47 and 48 show the function of a sensing unit 400 including a gyro-sensor and a thermometer. In FIG. 47, each piezoelectric element of the gyro-sensor 402 generates a voltage according to an acceleration of α. When the gyro-sensor 402 inputs the voltages, an amplifier amplifies the voltage signals to signal levels suitable to a computing process. At a section T141a, an acceleration is calculated from the voltage signals. Next, at a section T142a, the acceleration in the direction of each axis simultaneously sensed and the direction and magnitude of the displacement, the impulse force, and the posture of the sensing unit 400 are judged. At a section T143a, the acceleration caused by the rotation of the earth is judged. Next, at a section T144a, the displacement, acceleration, and impulse force are corrected and the resulting data items are outputted as output data Fa to the computing section 406.

Furthermore, an amplifier amplifies the temperature sense signal from the thermometer 408 to a signal level suitable for a computing process. At a section T141b, the temperature at each depth of the accumulated snow layer is measured from the value. Next, at a section T142b, it is judged how much the temperature have changed (risen) in the accumulated snow layer. At this section T142b, similar judgment of temperature above ground is also made. At a section T143b the temperature in the accumulated snow layer and that above ground are outputs as output data Fc to the computing section 406.

The output data items Fa and Fc of the gyro-sensor 402 and thermometer 408 are inputted to the computing section 406. In the computing section 406 of FIG. 48, at a section T151, the data item from the gyro-sensor 402 is stored in a memory for a specific period of time. Next, at a section T152, the acceleration value of the gyro-sensor is integrated from the data item to determine the angle. At a section T153, the angle value calculated is stored in the memory as it has stored the acceleration value.

At a section T154, the data from the thermometer is synchronized with the gyro-sensor and stored in the memory at regular intervals of time. Next, at a section T155, the data items stored in the memory are transmitted to the transmitting section at regular intervals of time.

When data on the displacement, acceleration, and impulse force sensed by each gyro-sensor 402 and data on the temperature at each depth in the accumulated snow layer sensed by the thermometer 408 are transmitted to the base station, the data processing section in the base station processes the sense data for each measuring point in real time, finds the data items that have exceeded the reference acceleration value, the data items that have exceeded the reference temperature, or the data items that have exceeded the reference temperature and data on the temperature above ground. The judging section carries out various judgments on the basis of the data items processed at the data processing means. Then, according to the cause and size of a snowslide, a suitable alarm is given or a suitable message is displayed, which enables the state of the ground to be monitored effectively.

As described above, even when sensing units 400 are each composed of a gyro-sensor 402 and thermometer 408, the occurrence of a snowslide and its size can be predicted, regardless of the places of installed sensing units 400.

As described above, with the seventh and eighth embodiments of the invention, it is possible to provide a snowslide monitoring apparatus capable of not only determining the place where a snowslide has occurred and its size but also automatically restoring the sensing units 400 to their original position after the snow has melted even when the sensing units 400 have been bent under the weight of snow or by the movement of snow.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ground monitoring system comprising:

a ground displacement sensing unit that is to be arranged at a point of ground to be monitored, said ground displacement sensing unit comprising:

a sensing section including means for, when an external force due to ground displacement is applied, sensing an acceleration to acquire at least one characteristic measurement selected from the group consisting of: a direction, a magnitude, and an impulse force of the ground displacement;

a computing section for executing calculations based on a result obtained by said sensing station; and a transmitting section for transmitting data obtained in said computing section to outside said ground displacement sensing unit;

data processing means, provided in a station that receives the data transmitted from the ground displacement sensing unit, for processing the received data in real time and comparing the received data with reference data; and determining means, provided in said station, for determining a ground state of the ground point to be monitored on the basis of a comparison result obtained in said data processing means, wherein said data processing means includes means for averaging ground movements at the point to be monitored and means for determining whether or not an averaged result exceeds a reference value.

2. The ground monitoring system according to claim 1, wherein said sensing section include means for acquiring tilt angles of two axes crossing at right angles.

3. The ground monitoring system according to claim 1, wherein said sensing section includes means for cutting an acceleration caused by rotation of earth from the sensed acceleration.

4. The ground monitoring system according to claim 1, wherein said ground displacement sensing unit further comprises a plurality of water sensors arranged at predetermined intervals in a longitudinal direction of a ground-buried portion of the ground displacement sensing unit, and each of said plurality of water sensors being capable of sensing water in a form of an electrical signal, wherein said computing section includes means for obtaining an underground water level on the basis of the electrical signals from said plurality of water sensors.

5. A ground monitoring system comprising:

a ground displacement sensing unit that is to be arranged at a point of ground to be monitored, said ground displacement sensing unit comprising:

a sensing section including means for, when an external force due to ground displacement is applied, sensing an acceleration to acquire at least one characteristic measurement selected from the group consisting of: a direction, a magnitude, and an impulse force of the ground displacement;

a computing section for executing calculations based on a result obtained by said sensing station; and a transmitting section for transmitting data obtained in said computing section to outside said ground displacement sensing unit;

data processing means, provided in a station that receives the data transmitted from the ground displacement sensing unit, for processing the received data in real time and comparing the received data with reference data; and determining means, provided in said station, for determining a ground state of the ground point to be monitored on the basis of a comparison result obtained in said data processing means, wherein said data processing means includes means to acquiring magnitude and direction of ground displacement on the basis of movement at the point of ground to be monitored, means for performing a vector process on the basis of said acquired magnitude and direction, and means for outputting a signal for displaying equimovement lines on the basis of a vector obtained from said vector process.

6. The ground monitoring system according to claim 5, wherein said data processing means includes means for performing a mapping process on the basis of the equimovement lines and the acquired magnitude and direction of ground displacement.

7. The ground monitoring system according to claim 5, wherein said sensing section includes means for acquiring tilt angles of two axes crossing at right angles.

8. The ground monitoring system according to claim 5, wherein said sensing section includes means for cutting an acceleration caused by rotation of earth from the sensed acceleration.

9. The ground monitoring system according to claim 5, wherein said ground displacement sensing unit further comprises a plurality of water sensors arranged at predetermined intervals in a longitudinal direction of a ground-buried portion of said ground displacement sensing unit, and each of said plurality of water sensors being capable of sensing presence of water in a form of an electrical signal, wherein said computing section include means for obtaining an underground water level data processing means, provided in a station that receives the data transmitted from the ground displacement sensing unit, for processing the received data in real time and comparing the received data with reference data; and determining means, provided in said station, for determining a ground state of the ground point to be monitored on the basis of a comparison result obtained in said data processing means.

* * * * *